United States Patent
Abramovitz et al.

(10) Patent No.: US 12,058,025 B2
(45) Date of Patent: Aug. 6, 2024

(54) HIERARCHICAL RESOURCE CONSTRAINED NETWORK

(71) Applicant: Essence Security International (E.S.I.) Ltd., Herzliya Pituach (IL)

(72) Inventors: Assi Abramovitz, Netanya (IL); Assaf Schuster, Herzliya Pituach (IL); Hanan Ben Nun, Ramat Gan (IL)

(73) Assignee: Essence Security International (E.S.I.) Ltd., Herzliya Pituach (IL)

( * ) Notice: Subject to any disclaimer, the term of this patent is extended or adjusted under 35 U.S.C. 154(b) by 0 days.

(21) Appl. No.: 17/789,718

(22) PCT Filed: Jan. 5, 2021

(86) PCT No.: PCT/IL2021/050014
§ 371 (c)(1),
(2) Date: Jun. 28, 2022

(87) PCT Pub. No.: WO2021/140505
PCT Pub. Date: Jul. 15, 2021

(65) Prior Publication Data
US 2023/0055091 A1    Feb. 23, 2023

Related U.S. Application Data

(60) Provisional application No. 62/957,396, filed on Jan. 6, 2020.

(51) Int. Cl.
*G06F 15/173*     (2006.01)
*G06F 16/245*     (2019.01)
(Continued)

(52) U.S. Cl.
CPC ............ *H04L 45/04* (2013.01); *G06F 16/245* (2019.01); *H04L 45/42* (2013.01); *H04L 45/64* (2013.01);
(Continued)

(58) Field of Classification Search
CPC .......... H04L 45/74; H04L 45/04; H04L 45/42
(Continued)

(56) References Cited

U.S. PATENT DOCUMENTS

| 8,149,736 B2 * | 4/2012 | Smith ..................... H04L 45/54 370/255 |
| 8,391,296 B2 | 3/2013 | Sailhan et al. |

(Continued)

FOREIGN PATENT DOCUMENTS

| CN | 101399743 A | 4/2009 |
| CN | 103729461 | 2/2017 |

(Continued)

OTHER PUBLICATIONS

Distributed Hash Table Based Routing Algorithm for Wireless Sensor Networks Chen Yan 2014 Fifth International Conference on Intelligent Systems Design and Engineering Applications Year: 2014 | Conference Paper | Publisher: IEEE (Year: 2014).*
(Continued)

*Primary Examiner* — Richard G Keehn
(74) *Attorney, Agent, or Firm* — Schwegman Lundberg & Woessner, P.A.

(57) ABSTRACT

System and techniques for a hierarchical resource constrained networks are described herein. Device participating in the network are divided into groups. These groups correspond to vertices in a routing graph. A leader is selected amongst the devices in each group to function as a routing node connecting to other vertices of the routing graph. Client devices attach to leaf vertices in the routing graph. To reduce overhead in placing devices into the routing pools, a distributed hash table (DHT) can be used. Here, the routing pools can be given DHT IDs based on, for example, a structure of the routing graph. Device DHT IDs are used to assign them to the routing pools based on a distance metric.

(Continued)

Routing, in this arrangement, can use the DHT IDs to efficiently compute routing pool hops when routing messages. This arrangement works well for publication-subscription (pub-sub) services.

52 Claims, 17 Drawing Sheets

(51) Int. Cl.
    *H04L 45/02*     (2022.01)
    *H04L 45/42*     (2022.01)
    *H04L 45/64*     (2022.01)
    *H04L 45/74*     (2022.01)
    *H04L 45/7453*   (2022.01)
    *H04L 47/125*   (2022.01)
    *H04L 49/15*     (2022.01)
    *H04L 67/104*   (2022.01)
    *H04L 67/1061*   (2022.01)

(52) U.S. Cl.
    CPC .......... *H04L 45/74* (2013.01); *H04L 45/7453* (2013.01); *H04L 47/125* (2013.01); *H04L 49/1569* (2013.01); *H04L 67/1046* (2013.01); *H04L 67/1065* (2013.01)

(58) Field of Classification Search
    USPC ........................................................ 709/238
    See application file for complete search history.

(56) References Cited

U.S. PATENT DOCUMENTS

| | | | |
|---|---|---|---|
| 2010/0049869 A1 | 2/2010 | Jayaram et al. | |
| 2012/0271895 A1 | 10/2012 | Maeenpaeae et al. | |
| 2016/0197831 A1 | 7/2016 | De Foy et al. | |
| 2017/0366416 A1 | 12/2017 | Beecham et al. | |
| 2018/0295546 A1* | 10/2018 | Crawford | H04L 67/148 |
| 2019/0087445 A1* | 3/2019 | Zhu | H04L 67/1097 |
| 2019/0349733 A1* | 11/2019 | Nolan | H04W 4/08 |

FOREIGN PATENT DOCUMENTS

| | | | |
|---|---|---|---|
| EP | 2091272 | 8/2009 | |
| WO | WO-2013188816 A1 * | 12/2013 | H04L 45/50 |
| WO | WO-2021140505 A1 | 7/2021 | |

OTHER PUBLICATIONS

"International Application Serial No. PCT/IL2021/050014 International Search Report mailed May 24, 2021", 2 pgs.

"International Application Serial No. PCT/IL2021/050014, Written Opinion mailed May 24, 2021", 5 pgs.

Nibandhe, et al., "Algorithms for Energy Efficient Routing of Mobile & Wireless Sensor Networks", IJSSBT vol. 5 No. 1 [Online]. Retrieved from the Internet: <URL: https://www.ijssbt.org/volume5/pdf/3.pdf>, (Dec. 2016).

"Leader election", [Online]. Retrieved from the Internet: URL: https: web.archive.org web 20190924040715 https: en.wikipedia.org wiki Leader_election, (Sep. 24, 2019), 9 pgs.

"European Application Serial No. 21738930.3, Extended European Search Report mailed Mar. 16, 2023", 8 pgs.

Dash, Priyabrata, "Kademlia", (Aug. 24, 2018), 19 pgs.

"European Application Serial No. 21738930.3, Communication pursuant to Rule 70(2) and 70a(2) EPC mailed Apr. 4, 2023", 1 page.

"European Application Serial No. 21738930.3, Response filed Oct. 3, 2023 to Communication pursuant to Rule 70(2) and 70a(2) EPC mailed Apr. 4, 2023", 84 pgs.

"European Application Serial No. 21738930.3, Communication Pursuant to Article 94(3) EPC mailed Jan. 26, 2024", 6 pgs.

* cited by examiner

HIERARCHICAL RESOURCE CONSTRAINED NETWORK

RELATED APPLICATION

This application is a U.S. National Stage Application under 35 U.S.C. 371 from International Application No. PCT/IL2021/050014, filed Jan. 5, 2021, and published as WO/2021/140505 on Jul. 15, 2021, which claims the benefit of priority of U.S. Provisional Application No. 62/957,396 filed on 6 Jan. 2020, the contents of which are incorporated herein by reference in their entirety.

TECHNICAL FIELD

Embodiments described herein generally relate to computer networking and more specifically to a network for resource constrained devices.

BACKGROUND

Large-scale deployments of resource constrained devices are becoming common. Generally, these devices are sensors or actuators deployed throughout an environment to physical monitor or interact with that environment. A security infrastructure is an example of such a deployment. For example, a proximity sensor at a door can detect when a person approaches the door. An identification sensor, such as a camera, can identify the person and notify a verification service to determine where the person is allowed to pass through the door. If the person is allowed, a door-lock actuator is activated to release a lock on the door and enable the person to pass through the door. Other examples of such deployments can include monitoring shoppers in a retail location, a production line in a factory, etc.

The devices are usually resource constrained to reduce power use because many rely on battery power. Even when these devices are connected to mains power, the great number of devices can impose a significant power burden on an operator. Accordingly, these devices often have computational capabilities sized to match the intended applications to reduce their power use. These computational capabilities generally refer to processing (e.g., a central processing unit (CPU), coprocessors, etc.), working memory (e.g., random access memory (RAM)), or storage (e.g., solid state memory, non-volatile RAM, etc.). These devices can employ power-saving techniques, such as frequently entering a reduced power state, to further reduce their power use.

Computer networking generally involves hardware techniques to connect devices and protocols to package, address, route, and deliver messages (e.g., packets, streams, etc.) between devices. This organization is often split into several layers, such as a physical layer, data link layer, transport layer, session layer, and application layer. A popular technique, the transmission control protocol (TCP) over the internet protocol (IP) is a stateful network connection between devices. Maintaining such a connection generally imposes some resource use on the participating devices to maintain the connection state even when data is not being transmitted. This resource use over a stateless connection technique, however, can provide benefits, such as provisions to verify data delivery and retransmit lost data, to monitor that a recipient is available, etc. Resource constrained devices with individually routable addressing, such as an IP address, can be referred to as Internet of Things (IoT) devices, or edge devices.

Publication-subscription (pub-sub) protocols are generally a messaging protocol at a higher layer of the network, such as at the application layer. Pub-sub techniques often enable asynchronous communication between device through a message delivery broker system. The pub-sub network often defines an addressable unit, such as a topic. A device interested in the topic subscribes to the topic by notifying a broker that hosts the topic. A device that produces information pertinent to the topic publishes new data to the broker in a message. The broker then distributes the message to subscribers. If a subscriber is not available when the message is published, the broker can hold the message until the subscriber is available. This asynchronous communication can be beneficial for resource constrained devices that can, for example, often in a low-power state to conserve energy. There are many different pub-sub implementations, such as Message Queueing Telemetry Transport (MQTT), that have different broker structures, message structures, etc.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
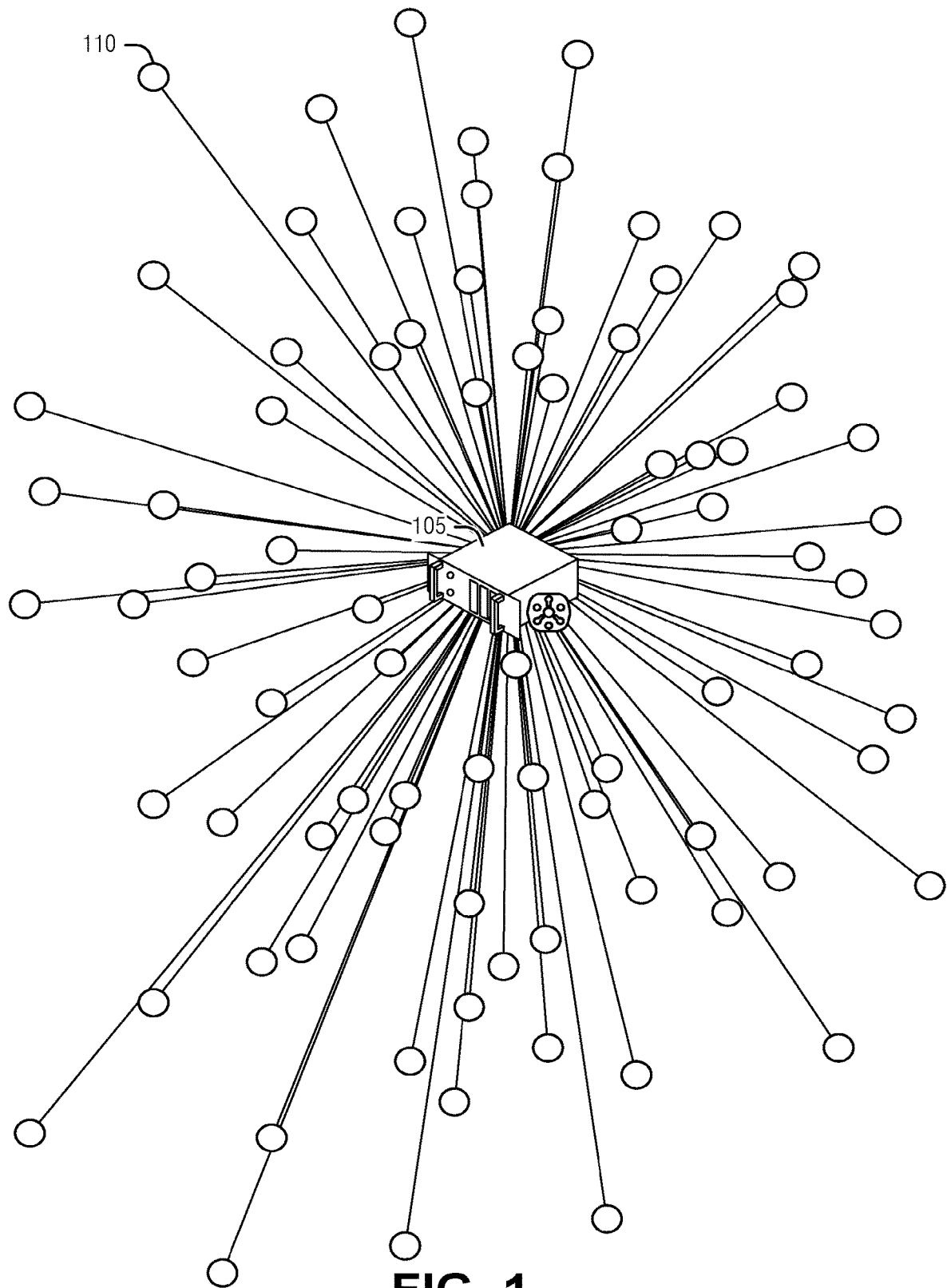
FIG. 1 illustrates a large-scale resource constrained device deployment connected to a single pub-sub broker on a server, according to an embodiment.

FIG. 1 illustrates a large-scale resource constrained device deployment connected to a single pub-sub broker on a server 105, according to an embodiment. Generally, each node (the devices such as device 110 and the server 105) has a unique identifier (ID) (e.g., a binary ID). In an example, the unique IDs are in an ID space that can be larger than the number of nodes. The nodes connect to each other using a lower-level networking protocol, such as TCP/IP. Accordingly, the nodes usually have an IP address, or the like, for such communication. The unique ID can be used to communicate between the nodes using a pub-sub network.

An aspect of this infrastructure of resource constrained (e.g., computational weak) devices, such as device 110, and a relatively powerful (e.g., computationally strong) server 105 can include changing device population over time. Devices can fail, sometime arbitrarily (e.g., without warning). These devices can be temporarily absent from the network when they recover, or permanently absent if the device 110 does not recover. Moreover, devices can be added to the network. In some cases, the device 110 is not pre-provisioned by the server 105, for example, and thus the network needs to address arbitrary additions.

Pub-sub networks can support a variety of connection models, such as one-to-one (single publisher to single subscriber), one-to-M (where M is greater than one), M-to-one, and M-to-M. Often in large deployments, a significant fraction of nodes are matched in pairs. Such pairs can include a door lock actuator and an access service node or the like. Here, communication frequently appears between nodes belonging to the same pair. In the single broker server 105 model illustrated in FIG. 1, a pub-sub message is not sent directly between nodes. Rather, a message is sent by the sender node to the server 105. The server 105 then propagates the message to the receiver node. A similar technique is used in one-to-M connections, except the server 105 propagates the message to the M subscribing (e.g., receiving) nodes.

Because the server 105 is involved in each of these message deliveries, a problem with the server 105 can lead to a failure of the deployment. In large deployments, a problem can arise simply from the server 105 maintaining open connections to devices to support the pub-sub broker. Consider a power-saving connection design where devices maintain open connections to brokers to receive or provide pub-sub messages and open and close ad-hoc connections for larger data transfers. An example of this device behavior in a one-to-one pub-sub arrangement can include a device 110 with a motion sensor and a camera positioned to observe approaches to a secured door. The camera can be in a low-power state with only the motion sensor active. When motion is detected, the camera can publish a message to a security topic in a centrally located broker which then delivers the message to a subscribing service. The service determines that video should be captured and publishes a message to a topic specific to the camera. The camera receives the message to capture video from the broker and starts capturing video. The camera can stream the video to the service using an ad hoc connection more suitable for the transmission than a message in the pub-sub network. This scenario, when the number of devices becomes large, can expose problems with the single broker hosted on a single server 105 model.

To provide successful deployments, the single server 105 model can be weak with respect to scalability and robustness. With respect to scalability, the server 105 can experience resource starvation when the number of devices N (e.g., users) of the pub-sub broker (e.g., service) grow into the thousands or millions. Further, with respect to robustness, the server 105 is a single point of access and failure. Thus, as new nodes join the network, the server 105 must accept the new devices. This process can produce significant state information that can be difficult to maintain in real-time to support, for example, a failover or recovery server. Further, as a single point of failure, server 105 interruptions effectively bring the pub-sub network to a halt.

Figure 2:
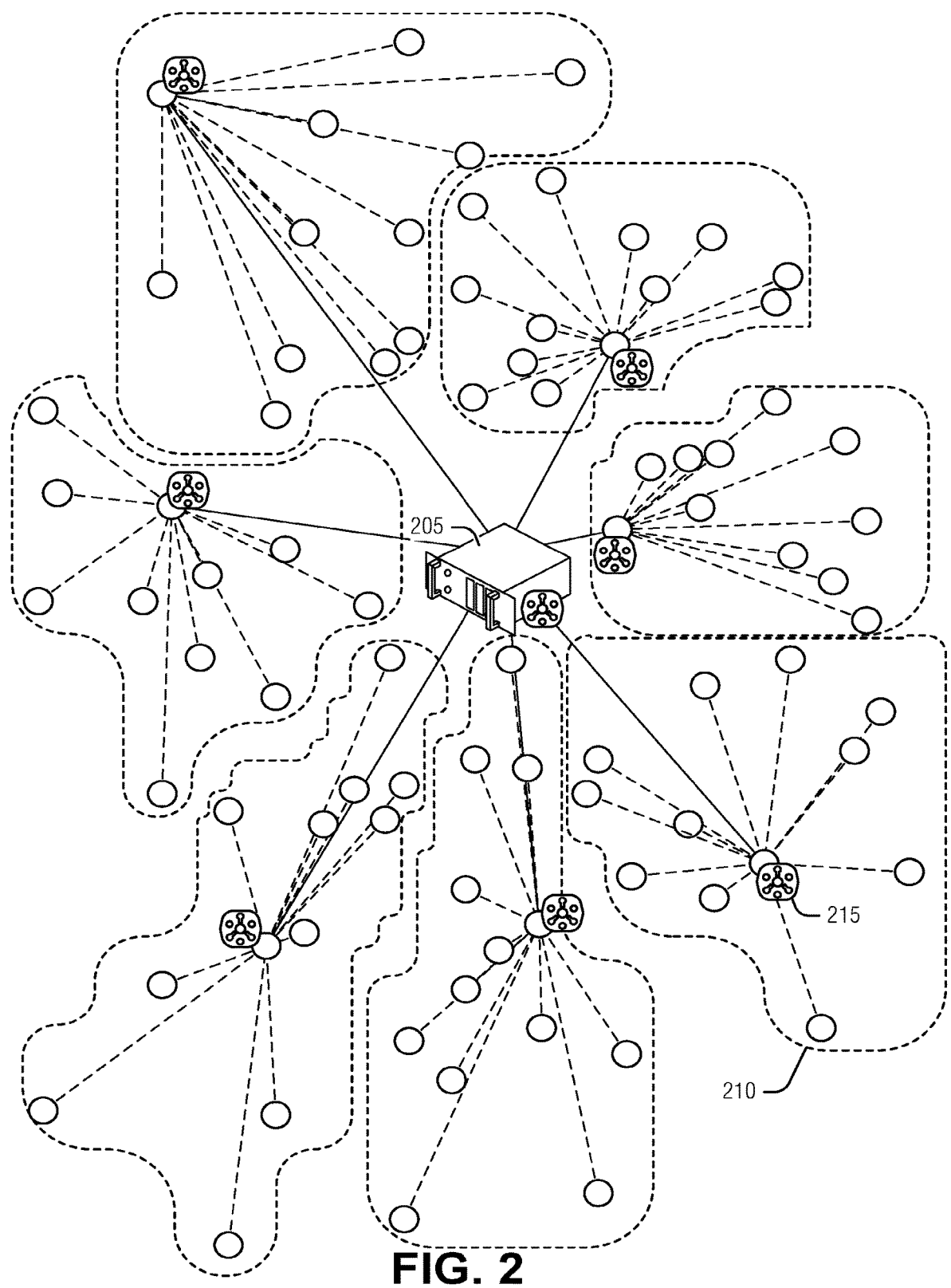
FIG. 2 illustrates a large-scale resource constrained device deployment connected to a hierarchy of pub-sub brokers, according to an embodiment.

To address these issues, a hierarchy of connections can be introduced into the network. Here, instead of connecting directly to the server 105, devices connect to intermediate routing nodes. This hierarchy can also divide the central broker in the server 105 and distribute the broker amongst the routing nodes. FIG. 2 illustrates just such an example. This design spreads the open connection burden among several devices. This design also spreads the broker burden among these several devices. Some considerations in the hierarchy can provide a more successful deployment. For example, open connection bounding can be implemented to manage resource dedication to the pub-sub network. Here, connections are bounded to be less than or equal to a limit L. L can be based on device capabilities, or other factors.

Another consideration can include path lengths between the server 105 and the device 110. Here, the path length is the number of nodes between the device 110 and the server 105 (e.g., intermediate routing nodes or hops). If L is an upper bound on the number of open connections at any node and N is the number of devices in the pub-sub network, then there is a minimum path length of $\log_L N$. Generally, to reduce message latency, paths lengths as close to $\log_L N$ are desired.

Another consideration can include reconnection latency. For example, when the device 110 is disconnected, reconnecting it takes time. During this time, the device 110 is not available to perform its function, compromising the deployment. In addition to reconnecting, reducing connection complexity or enabling simpler connection techniques can also be beneficial. The following description and referenced figures provide a variety of details and examples to implement a hierarchical resource constrained network.

FIG. 2 illustrates a large-scale resource constrained device deployment connected to a hierarchy of pub-sub brokers, according to an embodiment. In contrast to the single broker and server 105 of FIG. 1, the nodes are divided into groups (illustrated with dashed lines such as group 210). Each group includes a portion of the broker hosted by a routing node (e.g., device 215). The routing node 215 maintains an open connection with a parent node, which is the server 205, and may also maintain open connections with the one of more nodes in its group, as illustrated in FIG. 2. While the number of open connections maintained by most of the devices has not changed, it is evident when comparing the connections to the server 105 and server 205 that these connections are drastically reduced. The routing nodes, however, have increased the number of open connections that they maintain, increasing the computing resources devoted to communication for the routing nodes. Further, the broker portions hosted by these routing nodes also increases the computing resources devoted to communication. To enable these routing nodes, and the server 205 to operate successfully, the number of open connections to any given node can be bounded (e.g., less than or equal to a bound L). Here, a connection is said to be open between nodes Y and Z if resources are allocated in both Y and Z for messages to be sent between them. While L designates the upper bound of open connections, different values of L can be applied to different levels of the hierarchy, between nodes and the server 205, and even per node. Thus, L1 can be an open connection limit to the server 205 and L2 can be a different open connection limit to the routing node 215.

In the structure illustrated in FIG. 2, it is clear that an extra hop, or intervening node, exists between a publishing device and the server 205. Passing the message through the routing node 215 imposes some additional latency between the device and the server 205, and back down again to a subscribing node. As the depth, or height, of the hierarchy grows, so does this latency. Accordingly, when creating the groups 210, the depth of the tree is considered. Specifically, the depth is minimized to the extent possible while maintain the open connection bounding.

Figure 15:
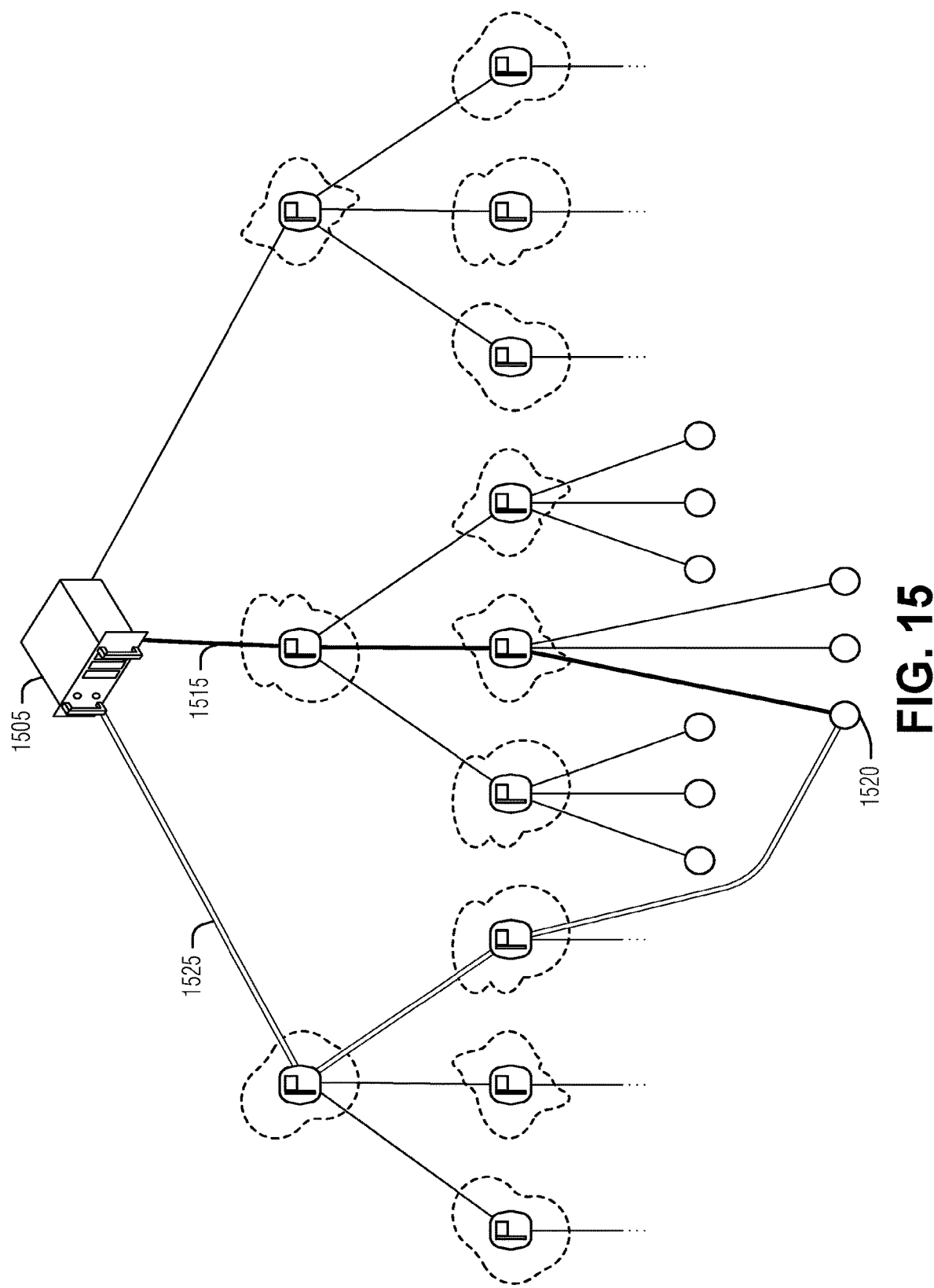
FIG. 15 illustrates redundant pathing for a client, according to an embodiment.

Without connection redundancy, if the routing node 215 fails, the nodes in the group 210 can be disconnected from the pub-sub network. In such cases, re-establishing the connection takes time can prevent timely delivery of a message. This reconnection can be reduced by, for example, maintaining multiple routes between devices and the server 205. In an example, to maximize the chances that there is always a route in the construction which survives failures, the multiple routes can have a constraint that they are they do not share a common link. In an example, to minimize the overhead resulting from these multiple routes, route redundancy may be limited to two. In examples where message delivery is more critical, the number of routes maintained can be higher than two. FIG. 15 illustrates an example of these redundant routes.

Figure 3:
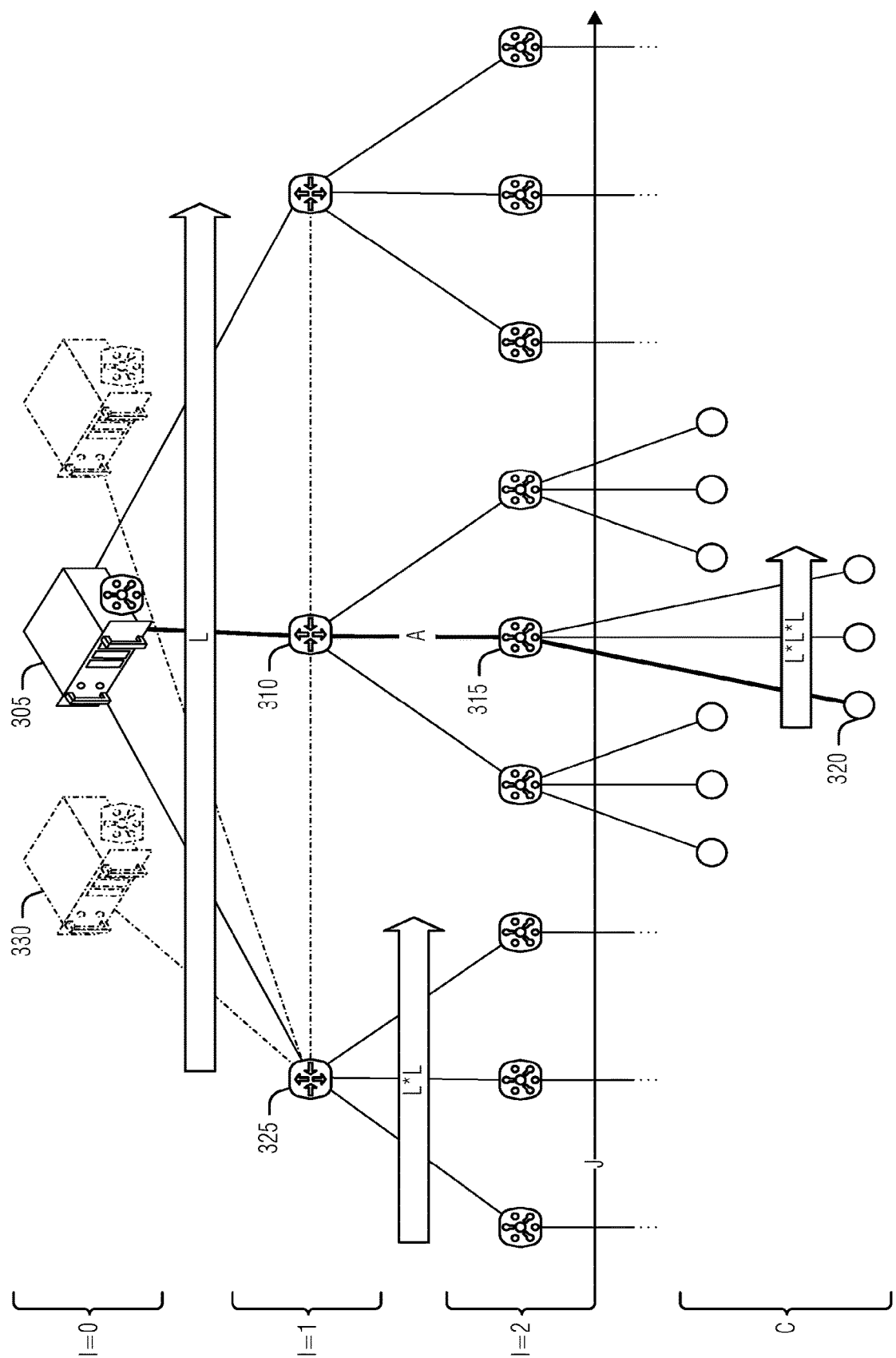
FIG. 3 illustrates a balanced tree implementation of a hierarchical pub-sub network, according to an embodiment.

FIG. 3 illustrates a balanced tree implementation of a hierarchical pub-sub network, according to an embodiment. FIG. 2 illustrated a top-down division of the devices of FIG. 1 into a hierarchy of pub-sub messaging. FIG. 3 illustrates a deeper perspective of the hierarchical model of FIG. 2. Here, the hierarchy is a balanced tree with the sever 305 sitting at the root of the tree although the hierarchy can be implemented using other graph structures. Because the nodes in the hierarchy route messages—between client devices (e.g., client device 320) and the server 305 through the routing node 315 and routing node 310 on the bolded path A—the hierarchy is also referred to herein as a routing graph and the routing nodes as vertexes in the routing graph.

The tree has a depth and a width. The depth is the number of levels (e.g., layers) between the root and the leaves of the tree. The width is the number of vertices within a layer. As used herein, a given layer is referred to by the index I, a vertex within that layer referred to by the index J. Accordingly, any given vertex can be expressed as an [I,J] tuple. For example, routing node 325 can be expressed as a tuple of [1,0], routing node 310 can be expressed as the tuple [1,1], and routing node 315 can be expressed as the tuple [2,4].

The tree layer with no children (e.g., farthest from the root) represent leaves of the tree. As illustrated, vertices in layer 2 (e.g., I=2), such as routing node 315, are leaves. Although the client devices in C are not part of the tree, but rather attach to leaf vertices, such as client device 320 attaching to routing node 315.

The large horizontal arrows indicate the open connection bounding parameter L. The total number of nodes supported increases as a power of L as the tree becomes deeper. Thus, for example, if the leaf layer was I=5, the total number of client devices that could attach is $L^5$. In pub-sub implementations, the leaf nodes can host brokers. These brokers generally service a portion of a topic, or message, space. Thus, these brokers can be referred to as broker portions, micro-brokers, nano-brokers, or the like. In an example, the leaf node brokers provide message delivery to subscribing client devices. In an example, the leaf brokers route messages on behalf of connected client device to, for example, publish messages to the server 305 or others. In this example, all publication messages are delivered to the server 305 for distribution to a leaf node that hosts the topic referenced in the publication message.

In an example, the leaf broker 315 determines whether it hosts the topic in a publication message received from the client device 320. If the leaf node 315 does host the topic, the leaf node 315 will deliver it to subscribed client devices directly. In an example, this is performed without notifying the server 305 that the message was published. In an example, the server 305 is notified regardless of the delivery by the leaf node 315. This can enable the server 305 to track message traffic, monitor the client device 320, or provide alternate routes or other failover services if, for example, the node 315 ceases functioning.

Intermediate routing nodes, such as routing node 310 and routing node 325 do not host a broker in the illustrated embodiment but can in other embodiments. As noted above, the hierarchy can be a more generalized graph than a tree. The dashed lines indicate additional connections in such a graph. For example, routing node 325 can have a direct connection to routing node 310. This can be used to implement routing of publication messages without server 305 involvement. In an example, additional servers, such as server 330, can be used to provide backup, load sharing, or other facilities to the routing graph. The dashed lines between routing node 325 and 330 illustrate redundant or failover connections between the routing node 325 and the additional server 330.

The tree illustrated in FIG. 3 and other routing graph elements described here provide context for the following discussions. By introducing the open-connection constrained architecture illustrated here, robust support for a great number of resource constrained devices is supported.

Figure 4:
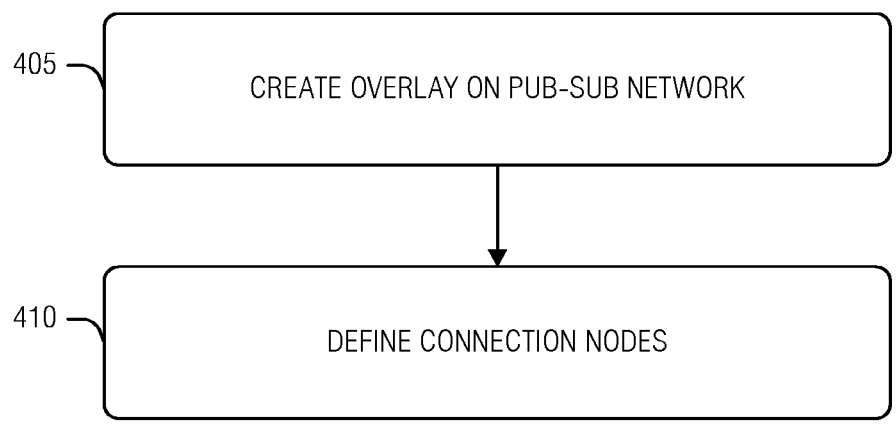
FIG. 4 illustrates a flow diagram of a method to create a hierarchical overlay on a pub-sub network, according to an embodiment.

FIG. 4 illustrates a flow diagram of a method 400 to create a hierarchical overlay on a pub-sub network, according to an embodiment. The operations of the method 400 are implemented in computer hardware, such as processing circuitry. The computer hardware can exist in a device, such as a server, routing graph organizer, or other maintainer of a routing graph.

At operation 405 an overlay to the pub-sub network is created. The overlay has a structure in which child connections to a node are limited by a threshold. The overlay is a type of routing graph. The underlying pub-sub network is a broker-based message passing network in which connections between devices are implemented using a lower-level technique, such as TCP/IP. The child connection limitation refers to open TCP/IP connections used to support messaging protocols of the pub-sub network.

At operation 410, a set of nodes in the overlay are defined as connection nodes. The connection nodes are vertices in a routing graph of the overlay. In an example, a connection node is a device that hosts a nano-broker for the pub-sub network. As noted above, a nano-broker is a broker that hosts less than all of a message space for the pub-sub network. Thus, if the message space is divided by topic names, topic families, etc., then the nano-broker distributes messages to subscribers for a proper subset of the topic names for example.

Clients can attach directly to the connection node to subscribe to the message space serviced by the nano-broker. In an example, connection nodes are directly calculable by a client device based on the structure of the overlay. This feature reduces network load when client devices attach. For example, consider the tree illustrated in FIG. 3. If the tree is balanced, it can be assumed that the leaf layer (e.g., I=2 in FIG. 3) is full. Thus, any valid J within I=2 is a leaf node to which a client device can connect. The I and valid J's for the leaf nodes can be determined from two variables, a tree height h and the open connection bound L. Generally, the height h is equal to the maximum value of the I index as illustrated in FIG. 3. Thus, the height (h) of the tree in FIG. 3 is two. The valid J for a given height is a set with a cardinality of $L^h$. Thus, when L=3, h=2, as illustrated in FIG. 3, and J is indexed by integers starting at zero, then a valid J is any of [0, 8]. Here, the client device can calculate valid leaf nodes from input parameters indicating a depth of the tree (e.g., h) and the open connection bounding value (e.g., L). By enabling the device to calculate the connection nodes, other nodes in the network do not have to use computational resources to onboard a new client device. This enables an efficient solution for dynamic onboarding of a great many client devices during the network operation.

In an example, nodes in the overlay that are not connection nodes include a routing table for topics. By using the routing table, these nodes can pass messages to other portions of the routing graph. Using FIG. 3 for illustration, such a routing table can enable a message route between routing nodes 310 and 325.

In an example, a server of the pub-sub network creates the overlay. Server 305 is an example of such a server. In an example, the server is not part of the overlay. For this example, if the overlay is a routing graph, the server is not a vertex of the graph. Thus, the server can be considered an organizer of the overlay. In this role, the server generally does not participate in message routing beyond defining or monitoring the overlay.

In an example, the server maintains next-hop routes to connection nodes. Here, the server is maintaining routes to certain connections nodes adjacent to the server in the overlay. For example, given the tree in FIG. 3, the server 305 maintains routes to routing nodes in level one (e.g., I=1) of the tree, including routing node 325 and routing node 310. Thus, if a message for client device 320—which will be brokered by routing node 315—reaches the server 305, the server 305 has a route to routing node 310 to forward the message.

The organizer (e.g., server) managing the overlay structure can monitor the overlay with respect to the overlay goals of keeping open connections at or below a threshold (e.g., L) and minimizing the routing links from publishers to subscribers (e.g., minimizing tree depth). While these goals are generally met during the initial overlay construction, the addition or subtraction of new client devices, or connection node failures, can cause a current overlay to be less efficient than desired. Accordingly, in an example, the organizer can detect that growth in child connections are approaching the threshold (e.g., L) and growing the overlay by contacting connection nodes to select additional connection nodes and establish a new level in the overlay. By delegating the growth to the connection nodes, the organizer does not have to expend computing resources to contact every node.

In an example, the overlay is based on a topic structure of the pub-sub-network. Here, the topic structure refers to any structure given to message addressing in the pub-sub network. An example of such a structure involves topic names or IDs organized into topic families. In a one-to-one communication example, a topic name can comprise a serial number for a device. If the device is a security device, the topic family can be 'security'. Whatever the topic structure, the overlay can conform to the structure such that awareness of the topic structure enables identification of a connection node to subscribe to a topic. Thus, in an example, the connection nodes are directly calculable by the client device given a topic family or a topic ID. In an example, the connection nodes are directly calculable by the client device using only the topic family and the topic ID. In an example, the topic identifier is unique to the client device. In an example, the topic ID is a serial number of the client device.

Figure 5:
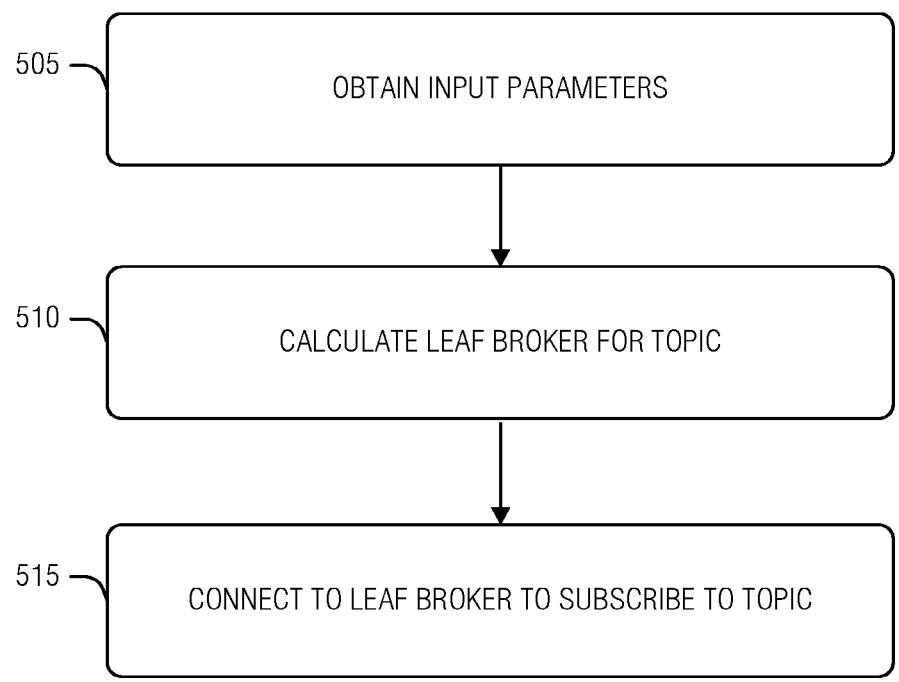
FIG. 5 illustrates a flow diagram of a method for client attachment to a hierarchical pub-sub network, according to an embodiment.

FIG. 5 illustrates a flow diagram of a method 500 for client attachment to a hierarchical pub-sub network, according to an embodiment. The operations of the method 500 are implemented in computer hardware, such as processing circuitry. The computer hardware can exist in a client device seeking to attach to a pub-sub network to exchange messages. The operations of the method 500 operate in a context similar to that of method 400 and illustrate a client device approaching the overlay to attach to a connection node. Here, for clarity, the connection nodes to which the client device is attempting to attach are called leaf nodes even if the overlay is not in the form of a tree. These leaf nodes host broker portions, or leaf brokers, for the pub-sub network.

At operation 505, input parameters are obtained. Here, the input parameters include a topic name and a topic identifier for a topic in the pub-sub network. The input parameters can be given to the client device during manufacturing, an onboarding procedure (e.g., during setup), or other technique such that the client device possess the input parameters without communicating with a node in the pub-sub network. In an example, the input parameters are retrieved from a server or other organizer of the pub-sub network. Here, the client device can be given an address to the organizer during a setup procedure. In an example, the client device can obtain the input parameters from other devices in the pub-sub network, for example, via a discovery broadcast. In this example, the multitude of other devices with the input parameters can quickly and efficiently deliver the input parameters to the client device.

At operation 510, calculating a leaf broker that hosts the topic using the input parameters and a structure of the overlay. The structure of the overlay, like the input parameters, can be given to the client device as part of provisioning, or can be obtained by the client device. In an example, part of the overlay structure can be provided as part of the input parameters. For example, the client device can be given the tree structure of an overlay as part of provisioning. Then, a depth of the tree, number of devices attached to the tree, etc., can be provided to the client device in the input parameters. These overlay input parameters enable the client device to determine the current state of the overlay when combined with the underlying structural rules used by the overlay.

In an example, the client device has a record of a subset of leaf brokers. Here, an entry for a given leaf broker in the record includes a network address and an overlay ID. The overlay ID is specific to the overlay and can be in addition to another ID of the leaf broker, such as a serial number. In an example, the client device calculates the leaf broker by hashing the input parameters to locate an overlay identifier in an entry for the leaf broker and connects to the leaf broker using a corresponding address in the entry. In an example, given w leaf brokers in the subset of leaf brokers, hashing the input parameters includes applying modulo w to a result of the hashing to locate the overlay identifier. The hashing referred to here can be a distributed hash table (DHT) type hashing. DHT hashing and operations are described below with respect to FIG. 6.

At operation 515, the client device attempts to connect to the leaf broker to subscribe to the topic. In an example, when the leaf broker rejects the connection, the client device calculates a second leaf broker using a different hash function for the hashing. In an example, hash functions used to calculate leaf brokers are stored in both the server and the client device. Thus, the two different hash functions results in the same overlay ID whether performed by the server or the client without the server having to communicate with the client device. Such a situation enables an efficient technique for the server to route messages to the client device based solely on the input parameters even when leaf brokers fail or are otherwise unable to serve the client device. In an example, the second hash is performed on a result of the first hash. Here, the two hash functions can be the same hash function or different hash functions. In an example, the client device notifies the server when a leaf broker calculation failed to result in a connection to a leaf broker. Such notifications can be used by the server to adjust the overlay, maintain routes to client devices, or take other actions to preserve efficient operation of the pub-sub network. For example, when the client device fails to connect to the first leaf node, it can be termed an exception. The server can store an exception list of these exceptions. Thus, when attempting to find the leaf node of the client, the server can consult the exceptions list. If the client device is not on the exceptions list, the server performs the first hash calculation to locate the client leaf node. If the client device is on the exceptions list, then the server can follow the exception in the list (e.g., use a second hash, third hash, etc. specified in the list) to reach the leaf node of the client device.

Mitigating message delay during connection nodes failures can be achieved by maintaining redundant routes through the overlay. To be truly redundant, the multiple paths do not share any common link, although they can terminate at the same point, such as at the server. Thus, in an example, the client device calculates a second leaf broker that has a second path to the server that does not share a link with a first path to the server of the leaf broker. The client device can then attempt to connect to the second leaf broker while connected to the leaf broker. In an example, to calculate the second leaf broker, the client device adds a value p to a number of leaves of each sub-hierarchy (e.g., a subordinate hierarchy such as a sub-tree from the root) of the overlay. Here, p is not equal to the number of sub-hierarchies of the overlay nor to an integer multiple thereof.

The examples described above generally involve applying an overlay structure to an underlying pub-sub network to reduce open connections to support the pub-sub network. Many implementations to select which nodes are selected as routing nodes between client devices and a server can be used. The discussion below discusses implementations based on using a DHT to group devices into routing pools. These routing pools, which can contain one or more devices, are logical vertices in the overlay. Within each routing pool, a device is selected as a leader. The leader operates as the physical manifestation of the routing pool. Other nodes in the routing pool are candidates for leader or support the functions of the leader. For example, each non-leader node in the routing pool can store a network address (e.g., IP address) of the current leader. If a device is searching for the leader to open a connection, finding any other member of the routing pool will generally result in the retrieval of the leader's address. Searching uses DHT conventions as noted below. It is possible for a routing pool to have a single member device. In this case, the member device is the routing node for the routing pool.

Figure 6:
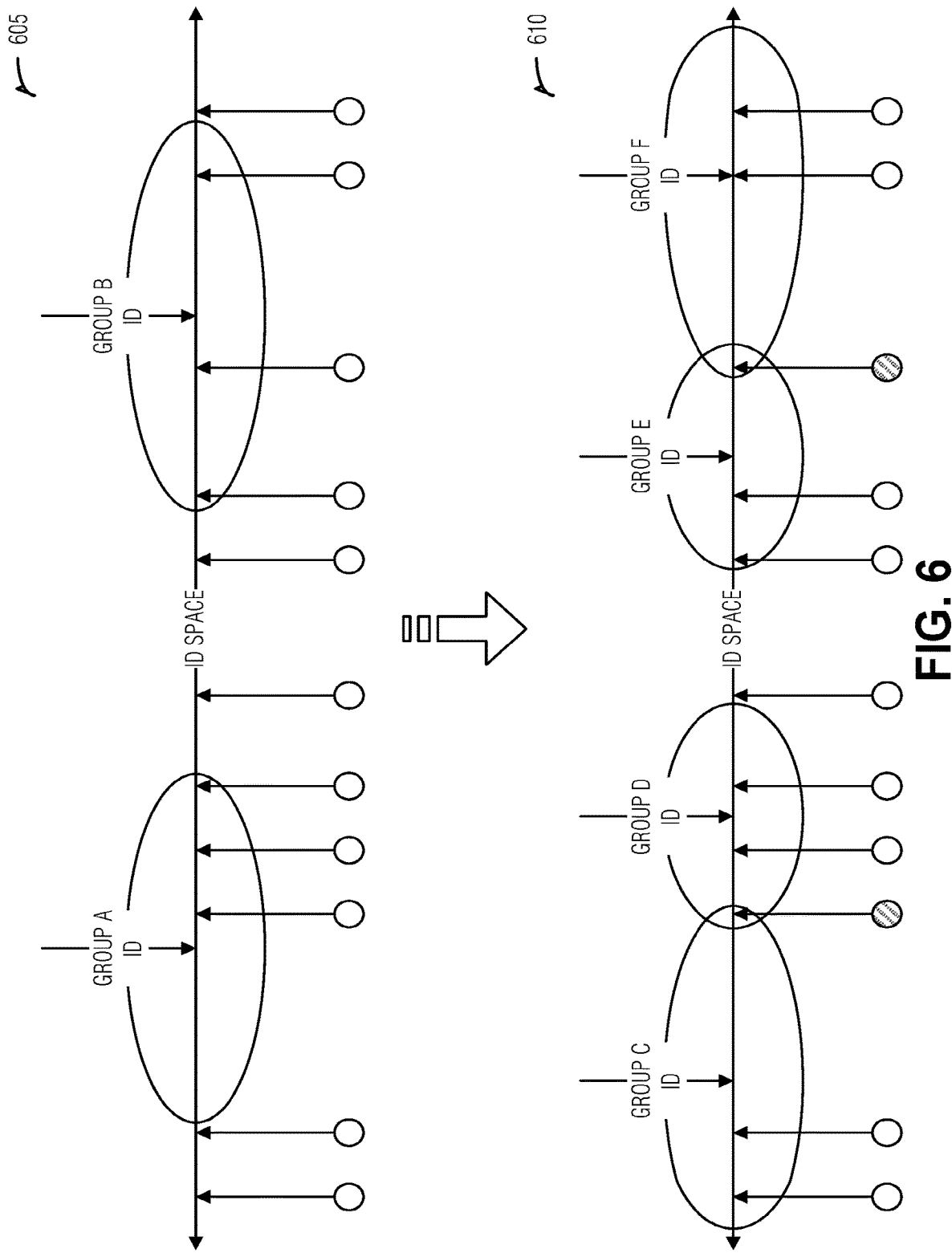
FIG. 6 illustrates using a distributed hash table (DHT) to group nodes, according to an embodiment.

FIG. 6 illustrates using a DHT to group nodes, according to an embodiment. DHTs are a technique to organize elements in an ID space. Like other hash tables, DHTs employ a hashing function to generate IDs from keys that correspond to values and allocate the key-value elements into buckets. In contrast with most hash tables, the hash function maps the keys into an ID space that is not defined by the number of buckets or groupings. This ID space is then allocated into groups based on a distance metric in the ID space. If the number of groups is changed, because element allocation to groups is based on a distance of the element key to the group position in the ID space, only elements in groups neighboring the added or removed group are redistributed. This is advantageous when, for example, the groups represent physical entities, such as servers, resulting in a minimization of the number of servers that transfer data when a new server is added or removed.

A variety of hash techniques can be used to generate IDs in a DHT. Examples can include consistent hashing, rendezvous hashing, or locality preserving hashing on known inputs (e.g., a key in a key-value pair). Often, in the context of groups being assigned to servers or other physical entities, a DHT overlay network can be used to search for key-value pairs stored in the physical entities. This overlay implements several DHT functions, such as search or discovery. Generally, each DHT node maintains a set of links to other DHT nodes. Here, a link can refer to an open connection, or simply connection criteria that enables the opening of a connection. When looking for a value from a key-value pair, the DHT node hashes the key to create a DHT ID and determines if a DHT ID for any DHT node it has a reference to closer to the DHT ID of the key than the DHT node itself. If the DHT node is closer to the key, then that DHT node is contacted to determine whether it has the value. If the DHT node does have the value, the value, or an indication that the value is on the DHT node, is returned. In the later case, an additional call, such as getData( ), can be made to retrieve the value.

In an example, if the DHT node does not have the value, it returns a list of other DHT nodes that are closer to the key than itself. In this example, the original DHT node expands its contact list, and queries a closer DHT node until it gets the answer or can't find any closer DHT nodes. In another example, the query is forwarded to a closer DHT node, relieving the originating node from having to make additional connections during the search. Here, the process repeats until an answer is returned or the receiving node does not have the answer and has no links closer to the key. In this last scenario, the query simply ends.

The DHT concepts noted above can be used to group devices. Here, devices can be given DHT IDs, such as by using the individual device serial numbers as a key. Thus, as illustrated in FIG. 6, ID space can be a DHT ID space and the circles below the ID space line indicate devices that are hashed to that location in the ID space. Here, the group IDs are hashes of data that represents the groups, such as group keys. Devices are allocated to the groups based on a distance, in the ID space, from the group IDs, the ovals indicating which devices are in group A, group B, group C, group D, group E, and group F.

The bottom of FIG. 6 illustrates the reallocation of devices when group A and group B are replaced with groups C-F. Note that the devices generally stay together within groups. Thus, for example, if group A were not replaced with groups C and D, none of the devices allocated to group A would need to change groups if group B was replaced with groups E and F. The group allocation technique used here involves allocating K devices to each group. Thus, the oval expands until it encompasses K devices. This expansion leads to the inclusion of the shaded devices into multiple groups. Another group allocation can include any device with a set distance from the group ID in the ID space.

Communication for DHT maintenance is generally small. Often, DHTs achieve near quiescence after construction of the DHT converges. Also, DHT tasks are often implemented using a light-weight protocol, such as User Datagram Protocol (UDP) messages, which do not use many resources to maintain open connections. Accordingly, the majority of the communication load is dependent upon the application and not for using or maintaining the DHT. These factors make DHT type allocations efficient to use for the overlay structures described above.

The following are some general DHT features in the context of this document. Device connections using DHT where the devices locally implement a DHT layer. Here, each device has an ID. For example, the ID can be the output of SHA-1 of 160 bits. In an example, the DHT distance metric between IDs is a binary number represented by a bitwise XOR vector. The distance between devices is the XOR of their IDs, interpreted as a binary number. Thus, for example, XOR(x,y)=0b101 means the distance between x and y is five. Using this distance metric, there exists a single DHT ID, and at most a single node, at every distance from every device. When the DHT ID of a device is known, other devices can search for it using standard DHT mechanisms. The search result is a network address, such as an IP address, for the sought-after device. The searching device can then use this network address to connect to the sought-after device.

Generally, when a device joins the network, the device is unaware of the structure of the DHT overlay, such as which devices are active, what the DHT IDs of those devices are, etc. The device begins by performing search operations to gather information about other active devices. Such a search can include randomly selecting DHT IDs that are near or far from the new device to build the DHT node link database. As other devices are encountered, these other device's links can be provided to the new device to facilitate building the searching device's link database. Often, within a brief period after joining the network, the device is likely to have learned of other DHT nodes spread across the DHT ID space that will enable efficient searching for keys across the ID space.

The following provides some additional context with an Example. Consider the DHT ID X="01011". Here, "01010" is the only DHT ID that is a distance of one from X, and "01001" is the only DHT ID that is a distance two from X, and both "01010" and "01001" belong to X's group if "01010" and "01001" correspond to devices. Additional devices, up to the size of the group, that are closest to X belong to its group regardless of whether a device with DHT ID "01011" actually exists. When a device searches for X="01011" it is likely to find nodes in X's group.

When these DHT concepts are extended to a resource constrained network, groupings (e.g., K-neighborhoods) represent a routing pool in an overlay of devices. The DHT ID, and thus the key, of the group is static and represents the group as an entity without regard as to which devices belong to the group. When the group key is searched, the value returned is an address of a device in the group that is tasked with being a router (e.g., a routing node). Thus, in contrast to a standard DHT key-value pair, the key stays the same while the value can change if the routing node for the group changes. As noted above with respect to FIG. 5, the client device can calculate the key of the leaf broker, and thus perform a DHT search for this key to retrieve an address of the leaf broker's routing node. In this context, such a calculation involves determining the key based on details of the overlay and opening a connection to the routing node. This open connection is maintained to route messages to and from the attaching device.

DHT functions to support the constrained device network include H(key). H is a hash function which maps a key to a DHT ID from the address space of node IDs and returns a node ID. SHA-1 over keys of 160 bits is an example for H.

Search (key) is the search function. If the device whose ID=key exists and is known to some of its neighbors, and the search encounters these neighbors, the search returns the node identity, which includes a network address for the device. Otherwise, the search returns a list of one or more device identities that are closer to the key if they exist. Thus, as the search progresses, it comes closer to the group of devices (e.g., the key's neighbors) that know the value that corresponds to the key.

Neighborhood(key) is a function to acquire the devices belonging to the group of the key. The result returns the group without regard to whether or not there exists a device whose DHT ID maps to the key. In an example, the function Neighborhood(key) also notifies all devices in the returned list that they now belong to group for the key. This last functionality can be useful when, for example, an organizer of the overlay creates the groups. Thus, the organizer can select the keys for the routing pools and perform the Neighborhood(key) function on each key. This will return the devices in the routing pool as well as inform those devices as to which routing pool they belong.

Refresh (key, Group) is function that operates as Neighborhood(key) with the addition that devices no longer part of the group are notified that they are removed from the group. Thus, refresh(key) confirms the current list of DHT IDs in key's group or otherwise returns a new list of DHT IDs in the group.

Leader-Election (key, group) is a function that initiates a distributed leader election process in key's group. The leader-election function returns the DHT ID of the device elected to be leader. In the routing pool context, the leader is a routing node for the routing pool. The leader-election can involve comparing several factors specified in the leader-election function to select the leader among the devices available in the group. For example, which device has the most computational power, which device has the most computational excess (e.g., unused computational power), which device has the highest network throughput (e.g., considering bandwidth, latency, etc.), among others.

In general, there are many different techniques that can be used for leader election. For example, some techniques form a ring and vote out a loser (based on the factor comparison) between pairs of ring-consecutive nodes until a single node remains to be the leader. Many of these techniques are complicated by the assumption that there is no central organizer that is aware of all the devices that can participate in the election. This inefficiency can be mitigated via a parent device that maintains awareness of the devices in a given group. In an example, the parent device can choose a leader itself, avoiding a complicated leader election process between the group devices. The factors considered by the parent device can be the same as those considered in the intra-group election process, such as bandwidth, latency, power source (e.g., battery power, mains power, etc.), or computational power among others.

A device's possible inclusion in multiple groups (as illustrated by the shaded circles in FIG. 6) can raise some complications. Generally, once elected to lead one group, the device will not be used as a leader in another group. Doing so would likely overburden the device. Also, when the open-connection bound L is considered, such dual leadership likely violates L.

Figure 7:
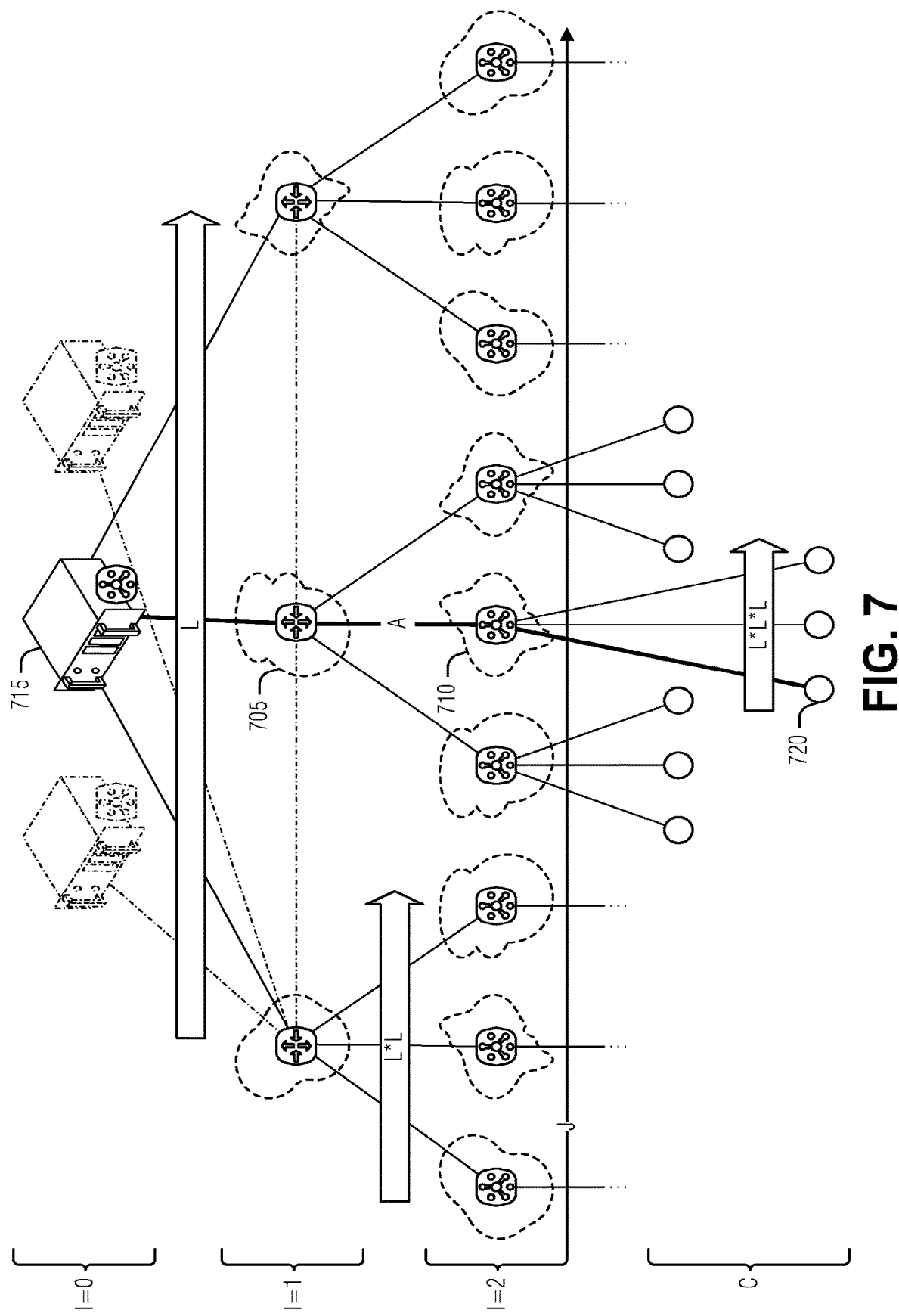
FIG. 7 illustrates a balanced tree of routing pools to implement a hierarchical pub-sub network, according to an embodiment.

FIG. 7 illustrates a balanced tree of routing pools to implement a hierarchical pub-sub network, according to an embodiment. The illustration in FIG. 7 mirrors that of FIG. 3 except that the routing nodes in the hierarchy are replaced with routing pools, such as routing pool 705 and routing pool 710. Leader election within the routing pools designates a device in each pool as a routing node. Once the routing nodes are discovered—e.g., using the DHT techniques described with respect to FIG. 6—connections to the routing nodes are made. At this point, the operation of the illustrated hierarchy can proceed in much the same manner as that described above with respect to FIGS. 2-5 in a pub-sub context. Accordingly, the illustrated tree can be considered a broker tree.

Within the context of FIG. 7, the client devices in C connect to the routing graph to communicate application messages. However, the client devices can also participate in a routing pool, or even be a routing node in a routing pool. For example, the client device 720 connects to the routing node in routing pool 710 to, for example, receive messages to a topic to which the client device is subscribed. The client device 720 can also be grouped into routing pool 705 because a DHT ID of the client device is close to the DHT ID of the routing pool 705. Here, the client device 720 wears two hats: one supports the routing graph as a participant in the routing pool 705, and the other is as a client device connecting to the routing graph to support application-layer message routing.

The illustrated broker tree is a logical balanced broker tree where vertices are routing pools. A leader election operation in every routing pool elects a device as the routing node. The routing node maintains open connections with a parent device and child devices. As illustrated, a parent is in an I−1 level from the routing node and child devices are in an I+1 level from the routing node.

In an example, the root of the tree is special case where the server 715 is the parent to routing nodes in the first level of the tree. In routing pools that are leaves, the routing node child connections are client devices of the pub-sub network. In an example, devices in a routing pool support the routing node by returning the routing node's identity (e.g., network address) for DHT searches. Other support for the routing node can include, for example, monitoring the routing node's health, providing failover services.

The following examples assume that the DHT ID of the server 715 is known to all devices. ServiceKey is a key representing a pub-sub service that is also known. Thus, for example, ServiceKey=H("11pubsub"), or ServiceKey=HEX ("11pubsub"). An offset value, ServiceSeed provides differentiation between providers of the same service. In an example, ServiceSeed is greater than the number of nodes in the tree. In this example, the ServiceSeed can be called AtLeastMaximumTreeSize. In an example, ServiceSeed is greater than the number of nodes in the largest layer (the leaf layer) of the tree. Again, the ServiceSeed value is known among participating devices. L (the open connection bound) and N (the number of tree vertices) are also known. With a balanced broker tree, these assumptions imply that h, the height of the tree, is also known because L is the arity of the balanced tree $h = \log_L N$, where $\log_L N$ denotes log to the basis L of N, rounded upwards.

A feature of the tree construction using routing pools as described above, is the simple computation of any key of any broker tree vertex. For example, routing pools in layer I can be indexed as J=1 to MaxNodes(I)−1, Let Key(I,J) denote the key of broker tree vertex J in layer I of the tree. Key(I,J) is fixed to H(ServiceKey+(I−1)*ServiceSeed+J). Thus, Key(I,J) is directly computed by any device in the system. Because the ServiceSeed is larger than any layer in the tree, the number on which H is computed is unique for every pair (I,J). Thus, the Key(I,J) is not likely to collide with Key(I',J') where at least one of I' and J' are respectively different than I and J.

To contact a broker tree vertex (e.g., a routing node in a routing pool that is the vertex) a device computes the vertex's key and searches for that key using the DHT search function. Similarly, broker tree vertices may easily compute the keys for their child and parent vertices. For example, the child keys of the server 715, at the root of the broker tree, are Key(1, 0) . . . Key(1,L−1). When the broker tree vertex Key(I,J) is not a leaf, the keys of its children are Key(I+1, J*L), Key(I+1,J*L+1), . . . , Key(I+1,J*L+L−1). The key of the parent of a broker tree vertex whose key is Key(I,J) is the server if I=1. Otherwise the parent key is Key(I−1, DIV(I, L)), where DIV(J,L) is J divided by L with no modulo (e.g., the remainder is rounded to zero.

Generally, the number of tree vertices in layer I of the tree, denoted by MaxNodes(I), is 1 for the root (layer 0 or I−1 in FIG. 7), L for layer 1, $L^2$ for layer 2, etc. If $h = \log_L N$ is the height of the broker tree, then MaxNodes(h) is $L^h \cong$ DIV(N, L). Similarly, MaxNodes(h−1) DIV(N, $L^2$). In general, the number of tree nodes in level I is MaxNodes(I)=$L^I \cong$ DIV(N,$L^{h-I+1}$).

In an example, construction of the broker tree is initiated by the server 715. The server 715 searches for Key(1,0) and contacts one of the nodes in the vertex (e.g., routing pool) of that key. If the vertex of Key(1,0) is not yet established, then server 715 can execute the Neighborhood (key(1,0)) function to create the vertex and to notify its member devices. The sever 715 can then initiate leader selection in the vertex, by, for example, executing the leader-election(key, Group) function. Once informed of the identity of the elected leader (e.g., the routing node), the server 715 opens a connection with the leader, establishing the first connection of the broker tree. This process continues to establish the rest of the connections with leaders of vertices whose keys are Key(1, 1), . . . , Key(1,L−1).

While the server 715 establishes its child vertices in the broker tree, leaders of these child vertices can also create their own child vertices and connections to these child vertices. In this manner, the construction of the broker tree proceeds recursively until h layers of the tree are created. In an example, server 715 requests that tree leaf vertices notify the sever when tree construction is completed. Once all leaves provide the notification, the branch of the tree to which the vertices belong is complete. The entire broker tree construction is complete when all branches are complete.

When a client device, such as client device 720, wants to join the broker tree, the client device calculates a leaf vertex, such as routing pool 710, to which it will connect (e.g., the routing node of routing pool 710). In an example, the client device can randomly select a leaf vertex. Thus, the client device randomly selects a value from Key(h,0), . . . , Key(h,MaxNodes(h)−1). The client device then uses the DHT search operation to look for the chosen key. In response, the client device receives an address of a device in the routing pool. This device is then queried for the identity of the routing node. The client device then attempts to attach (e.g., maintain an open connection with) the leader. If the leader has enough capacity, the leader accepts the attachment and opens a connection with the client device. Otherwise—for example, the leader has already committed to L other client devices—the leader denies the attachment and refused to keep a connection open to the client device. At this point, the client device can perform the random selection process again until attachment is successful.

In an example, h is set to provide enough capacity (e.g., slackness) in the leaf vertices to enable fast convergence for client device searches of an accepting vertex. This can be accomplished in many ways. For example, h can be chosen according to estimated N so that at least a fraction (e.g., 50%) of the leaves have resources to allocate more connections. Such an estimation can be done dynamically. For example, the server 715 can add one to h and initiate tree expansion whenever the fraction of full leaf vertices crosses a threshold (e.g., 0.5). The process can also be performed on demand, such as when one or more client devices provide reports indicating that it took too long (e.g., a timeout) to find an accepting leaf.

In general, the minimum number of leaves in the broker tree, assuming two leaf connections per client device, is $$\frac{2N}{L}.$$

However, a full tree might have many more leaves at layer h than necessary. In fact, the number of tree leaves may grow larger than the number of client devices. Such a high number of leaves is not desirable because creation and maintenance of many redundant leaves in terms of refresh or leader elections impose a non-productive burden on the participating devices. Lleav is a parameter for the number of leaves connected to every broker tree vertex of level h−1. Lleav is an integral number. To support N client devices, the total number of leaves should be no less than $$\frac{2N}{L}$$

assuming two leaf connections per client device. Thus, Lleav is at least $$\frac{\frac{2N}{L}}{Lserv*L^{h-1}}.$$

As long as h does not change, Lleav≤L. Accordingly, for a given h, Lleav can be shifted in the range $$ROUNDUP\left[\frac{2N}{Lserv*L^h}\right] \le Lleav \le L.$$

To make leaf selection faster, Lleav is increased. To reduce overhead, Lleav is decreased.

To enable vertex indexing by all devices, the server 715 publishes a quadruple [N,L,Lserv,Lleav]. As before, when a client device attempts to connect to the pub-sub network, the client device receives the quadruple from the server 715 (or from a caching DHT node). The client device computes the key of a random existing leaf by performing H(ServiceKey+ (h−1)*ServiceSeed+l*L+k), where l is a random leaf parent in the range of 1 . . . Lserv*$L^{h-2}$ and k is a random integral number in the range of 0 . . . Lleav−1. A different way to do the same would be to compute Key(h,m)=H(ServiceKey+ (h−1)*ServiceSeed+m), where m is a random number in the range 0 . . . Lserv*$L^{h-1}$−1. Here, m is a random leaf in the leaves layer l+1, and m is chosen such that MOD(m,L) is in the range 0 to Lleav−1, where MOD is the modulo operation.

Suppose Lleav<L and the server 715 prepares to scale the broker tree for larger N. Before h is incremented as previously described, Lleav is grown until it meets the bound L. In some instances, h need not be incremented, but rather simply incrementing Lleav is sufficient. To grow Lleav, the server 715 instructs all parents of leaves at level h−1 to create the additional vertexes for the missing leaves and to perform leader election. The leaves are considered missing due to the ability to add them following the incrementing of Lleay. Thus, the keys for the missing leaves at vertex n of broker tree level h−1 are all leaves whose keys are in the range Key(h,(n−1)*L+oldLleav) to Key(h,(n−1)*L+newLleav−1. Once additional leaves have been created by all vertices at level h−1, the server 715 can change the published quadruple to show the newly-supported Lleay.

In general, routing nodes in the leaves of the tree are the least loaded of all routing nodes. Thus, routing nodes in leaves might be able to handle connections to a number of client devices larger than L. Enabling this greater number of client devices connections can lower the number of vertices, which can result in a lower the path length by lowering h. Luser is a term that represents this different number of connections than L.

Devices can attach and detach from the tree at various times. To help maintain the tree, the client device can specify a set of tasks as part of its detaching. This set of tasks can be referred to as a last will. Once the client device detaches (e.g., dies), the server 715 can be notified (e.g., by the client device or by a routing node to which the client device is attached). Once notified, the server 715 can execute the tasks in the last will for the client device. Such tasks can include freeing resources, removing topics, or updating routing tables.

The following is an example of computing a broker tree:

| N = max #client devices | Conn's/ client device | Min #leaves | Lserv | L | Mid layer | Lleav | Luser | h | Path len | #leaves | Leave waste factor |
|---|---|---|---|---|---|---|---|---|---|---|---|
| $10^6$ | 2 | $2*10^5$ | $10^3$ | 10 | 2 | 10 | 10 | 4 | 5 | $10^6$ | 5 |
| $10^6$ | 2 | $2*10^5$ | $10^3$ | 10 | 2 | 5 | 10 | 4 | 5 | $5*10^5$ | 2.5 |
| $10^6$ | 2 | $2*10^5$ | $10^3$ | 10 | 2 | 2 | 10 | 4 | 5 | $2*10^5$ | 1 |
| $10^6$ | 2 | $10^5$ | $10^3$ | 10 | 1 | 10 | 20 | 3 | 4 | $10^5$ | 1 |
| $5*10^6$ | 2 | $5*10^5$ | $10^3$ | 10 | 2 | 5 | 20 | 4 | 5 | $5*10^5$ | 1 |
| $10^6$ | 2 | $8*10^4$ | $10^2$ | 10 | 2 | 8 | 25 | 4 | 5 | $8*10^4$ | 1 |
| $10^6$ | 2 | $4*10^4$ | $10^3$ | 5 | 2 | 2 | 50 | 4 | 5 | $5*10^4$ | 1.25 |
| $10^6$ | 2 | $2*10^5$ | $10^3$ | 5 | 3 | 2 | 10 | 5 | 6 | $2.5*10^5$ | 1.25 |
| $5*10^5$ | 2 | $5*10^4$ | $10^3$ | 10 | 1 | 5 | 20 | 3 | 4 | $10^5$ | 2 |
| $5*10^5$ | 2 | $4*10^4$ | $10^3$ | 10 | 1 | 4 | 25 | 3 | 4 | $4*10^4$ | 1 |
| $5*10^5$ | 3 | $10^5$ | 250 | 10 | 2 | 4 | 15 | 4 | 5 | $10^5$ | 1 |
| $5*10^5$ | 3 | $10^5$ | $10^3$ | 10 | 1 | 10 | 15 | 3 | 4 | $10^5$ | 1 |
| $5*10^5$ | 4 | $10^5$ | $10^3$ | 10 | 1 | 10 | 20 | 3 | 4 | $10^5$ | 1 |
| $10^5$ | 2 | 5000 | $10^3$ | 10 | 0 | 5 | 40 | 2 | 3 | 5000 | 1 |
| $10^5$ | 2 | $2*10^4$ | $10^3$ | 10 | 1 | 2 | 10 | 3 | 4 | $2*10^4$ | 1 |
| $10^5$ | 2 | 2000 | $10^2$ | 10 | 1 | 2 | 100 | 3 | 4 | 2000 | 1 |
| $10^5$ | 2 | 2000 | $10^3$ | 10 | 0 | 2 | 100 | 2 | 3 | 2000 | 1 |
| $10^5$ | 2 | 1000 | $10^3$ | 10 | 0 | 0* | 200 | 1 | 2 | 1000 | 1 |

Where:
N—# client devices
Conn's/client device—number of connections to different leaves for every client device
Min #leaves—minimal # of leaves possible for construction
leaves—actual # of leaves in construction
Leave waste factor—fraction of #leaves to min #leaves
Lserv—number of connections server can maintain to level 1 broker nodes
Mid layer—# of layers with max connection L
Lleav—# of leaves who are offspring of a broker node in level h−1
Luser—number of connections to client devices from broker leaf
Path len—path length between server to client devices
*Lleav=0 means h=1, namely, leaves are server's offspring Computing the table above is done as follows: multiply the number of client devices by the number of connections per client device. This results in the total number of connections needed in the leaf layer. Divide this result by the number of per broker leaf to get the minimum number of leaves to support the client devices. A mid layer is chosen such that $Lserv*L^{\{mid\ layer\}}*Lleav$ exceeds the minimum number of leaves. If this number is much larger than the minimum number of leaves, then Lleav can be reduced below its maximal value. Now, h follows from the mid layer and so does path length. Also, the leave waste factor can be computed by dividing the number of leaves by the minimum number of leaves.

The examples above assume a single broker tree. There are, however, motivations for growing many different broker trees. For example, suppose a large broker tree MBT, whose server is S, is serving 1-1 pub-sub topics and several other one-to-M, M-to-one, and M-to-M pub-sub topics. Suppose a requirement to construct a service for another topic having topic-title T is imposed on the system and suppose also that T has a designated server of ID=S' that must be involved in all of T's publication activity. Then, it can be beneficial to make server S' the root of a newly-grown broker tree to ensure that messages traverse shortest paths from publishers to server to subscribers. Furthermore, because hash functions are imperfect and can lead to congestion, there can be imbalance issues with certain subtrees which get worse as the number of different services of different pub-sub families are implemented using the same broker tree.

Indexing multiple broker trees in a pub-sub implementation does not generally pose an issue because indexing is often service specific. As described above, Key(I,J):=H (ServiceKey+(I−1)*ServiceSeed+J). When ServiceKey is derived from a service-title, the indexing is different for different services and there is no need to change anything in the indexing computation.

Choosing vertices can have an impact upon multiple broker trees over the same population of devices. Generally, it is beneficial, and in some cases required, that vertex leaders are unique to broker trees. Thus, it can be important that different trees do not use the same leaders. In an example, this constraint can be implemented by preventing the intersection of vertices from different trees by instructing nodes grouped into one vertex from joining a second vertex. For example, when looking for a key, responding nodes can respond with the answer to the query as well as a list of vertices or trees they are already serving. Thus, the entity (e.g., server 715 or parent device) that assigns devices to a particular vertex do not assign a device to a second vertex. The resulting vertices may have to include devices nodes whose DHT IDs are a bit farther from the searched key than for a single broker tree. However, this does not seem to negatively impact broker tree construction.

In an example, a somewhat larger K can be chosen for vertex groups (e.g., routing pools) having devices that serve in more than a single vertex. However, if a device is known to have already been chosen as a leader of one vertex, it will not be chosen to also be the leader of another. Once again, this restriction can involve making K to be somewhat larger than in the case where every node participates in only one vertex. In an example, with this relaxation, there can be a limit imposed on the number E vertices to which a device can belong.

Figure 8:
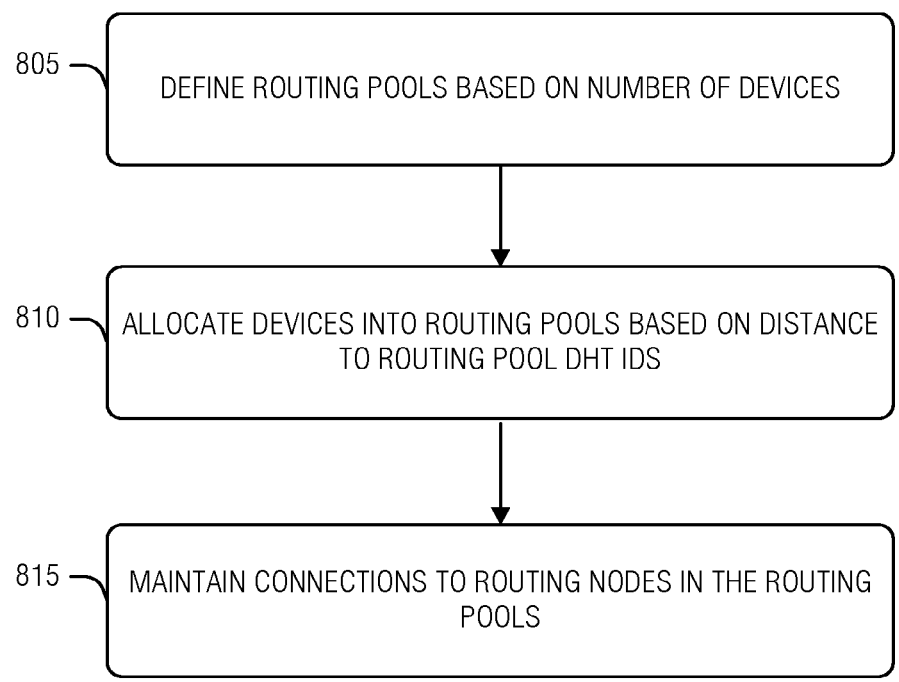
FIG. 8 illustrates a flow diagram of a method to create a hierarchy of routing pools to implement a pub-sub network, according to an embodiment.

FIG. 8 illustrates a flow diagram of a method 800 to create a hierarchy of routing pools to implement a pub-sub network, according to an embodiment. The operations of the method 800 are implemented in computer hardware, such as processing circuitry. The computer hardware can exist in a device, such as a server, routing graph organizer, or other maintainer of a routing graph. Although FIG. 7 illustrates some pub-sub implementation details, the structure illustrated in FIG. 7 is applicable to more general implementations of hierarchical resource constrained networks. Accordingly, the vertices of FIG. 7 are referred to as routing pools to facilitate connectivity while maintaining the limited open connection bound L on the network.

At operation 805, a number of routing pools are defined based on a number of devices. Here, each routing pool is assigned a distributed hash table (DHT) identifier (ID). The discussion above illustrates how to select the number of routing pools given N devices. Also, the DHT assignment to the routing pool is generally accomplished by selecting a key for the routing pool and then mapping the key to the DHT ID by using H(Key).

At operation 810, devices are allocated into the routing pools based on a distance of DHT IDs of the attached devices and respective DHT IDs of the routing pools until a cardinality parameter of the routing pools is met. Here, the cardinality parameter is K from above. In an example, the devices are notified as to which routing pool they are allocated. The Neighborhood(key) function described above can be used to allocate the devices into the routing pools, as well as notify the devices of their allocation. Here, the function is run with each respective key corresponding to the routing pools.

At operation 815, connections to routing nodes in the routing pools are maintained. Here, each routing pool has at least one routing node, although several routing nodes can exist in a single routing pool. In an example, an attached device in a routing pool is selected to be the routing node for the routing pool. Attached device refers to a device that is already participating in the routing graph of the network, and thus is available to perform as a routing node. In this example, the parent device, such as a server, is appointing the routing node (e.g., the leader).

In an example, information that an increase in attached devices is approaching a threshold is obtained. This can include monitoring reports from devices as they attach, reports from leaf nodes, or other report indicating the number of attached devices. The threshold is based on the structure of the overlay. Thus, in a balanced tree, the threshold can be computed from the height of the tree as described above.

In response to the increase in attached devices, new routing pools are defined to maintain the maximum open connection metric (e.g., L). These new routing pool affiliations can be promulgated to the attached devices. This can be accomplished, as with constructing the overlay, using the Neighborhood(key) function. After devices are allocated to a routing pool, leader election or appointment can occur to select a routing node for the routing pool. A connection to the routing node in the new routing pool is then opened and connections to routing nodes in the previous routing pools are dropped. Here, connections to the old routing nodes are maintained to ensure connectivity during the creation of the new routing pools.

Once the routing graph is established, devices in the routing pools can be used to ensure the integrity of the routing graph. Thus, in an example, one or more nodes in a routing pool are assigned to continually check to determine whether the routing node is operational. This can be a heartbeat monitor, simply monitoring the open network connection, or the like to determine whether the routing node is functional. In an example, one or more of the routing pool nodes are assigned to maintain a copy of routing state for the routing node. The routing state refers to any or all information that could be used to replicate the operational state of the routing node in case it failed. Thus, if the routing node maintains a routing table, the routing state can include the routing table. Other information can include metrics on attached devices, such as attachment failures, etc. Where the routing node implements a broker for a pub-sub network, the routing state can include records about topics served, subscriptions, messages to deliver, etc.

In an example, the routing graph is used for a pub-sub network. Here, the server can maintain a repository of pub-sub subscriptions of client devices attaching to the routing graph. This can be used to, for example, determine load on the routing graph to determine whether or not to grow or shrink the routing graph. In an example, the repository is used by the server to route messages to appropriate routing nodes for delivery to the client device. In an example, the repository is built by notifications from client devices after successful attachment to a routing node in a routing pool.

In an example, publication messages are published to the server. Thus, the server can receive or generate a publication message to a topic name and route the publication message to a leaf corresponding to the topic name, which then forwards the message to the client device(s) subscribed to the topic name. In an example, this topic name is specific to a particular client device, so the client only needs to connect to one leaf. However, in another example, the topic name is not specific to one client device, and/or client devices may connect to various leaves simultaneously, depending on the various topic names. In any case, a broker hosted on the relevant leaf delivers the message to the subscribed device. The route is based on a DHT ID of a routing pool corresponding to the topic name. The server calculates the parent DHT ID of the routing pool up the routing graph until the parent routing pool is a child of the server and delivers the message to this child routing pool.

In an example, the server can receive the key of the routing pool to which the client device is attached in response to the client device attaching to a routing node of the routing pool.

In an example, the routing graph is structured based on topic IDs. In this case, the route can be calculated from the publication message itself. In this scenario, the server can calculate a routing pool DHT ID from the topic ID and route the publication message to a routing node that corresponds to the routing pool of the routing pool DHT ID.

Figure 9:
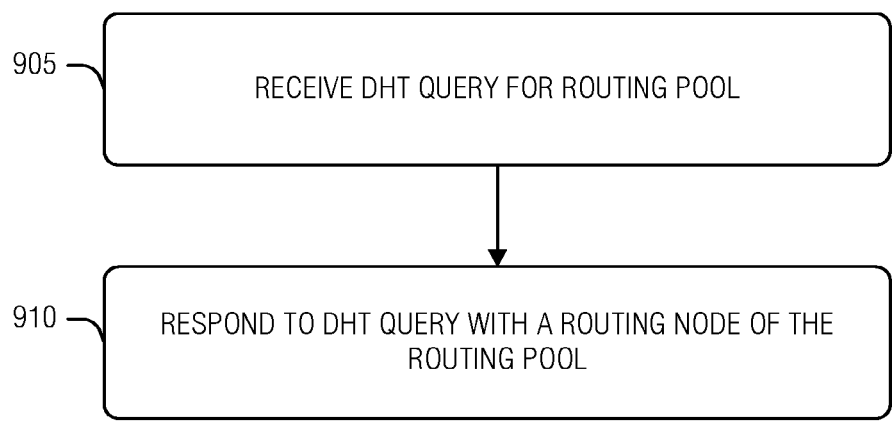
FIG. 9 illustrates a flow diagram of a method for node operation within a routing-pool hierarchy implementing a pub-sub network, according to an embodiment.

FIG. 9 illustrates a flow diagram of a method 900 for node operation within a routing-pool hierarchy implementing a pub-sub network, according to an embodiment. The operations of the method 900 are performed by a node, or device, operating as a node in a routing graph. Here, the node is implemented in computer hardware (e.g., processing circuitry).

At operation 905, the node receives a DHT query for a routing pool. Here, the query includes a DHT ID for the routing pool. Also, the routing pool is a vertex in the routing graph. As it is assumed that the routing graph is already constructed, the routing pool includes one or more nodes selected to be in the routing pool based on a distance between the DHT ID of the routing pool and respective DHT IDs of the nodes in the routing pool.

At operation 910, the node responds to the query with a result. Here, the result corresponds to a network address (e.g., IP address) for a routing node of the routing pool. In an example, responding to the query includes determining whether the node is in the routing pool. In an example, when the node is in the routing pool, the node responds with the address for the routing node taken from a local store of the node. Here, the routing pool nodes support the routing node by maintaining the routing node's address. Thus, any query comes to a device in the routing pool will provide the routing node's address. In an example, the node is the routing node for the routing pool.

In any case, the routing node maintains a parent connection and a set of child connections. Generally, the parent connection is to a routing node further up a hierarchy of the routing graph or to a server at a root of the routing graph. Child connections are downward in a routing graph hierarchy and can include client devices that are not part of the routing graph.

In an example, the node was selected to be the routing node from the one or more nodes of the routing pool based on a performance metric. In an example, the performance metric includes at least one of a connectivity metric, security metric, power consumption metric, compute metric, storage metric, or maximum open connections. Here, the selection can arise from a leader-election among nodes in the routing pool or by appointment from a parent of the routing pool. Thus, in an example, the node was selected to be the routing node by the one or more nodes of the routing pool. In an example, the node was selected to be the routing by an organizer of the routing graph. The term "organizer" is again used to denote a maintainer of the routing graph that does not necessarily otherwise participate in the routing graph's use. Thus, the organizer defines the routing pools, determines when to grow or shrink the routing graph, but does not necessarily participate in actually routing messages.

In an example, the node receives a notification that it is selected as a routing node for another routing pool to which the node belongs. Thus, here the node is in multiple routing pools and in an example in which the node is already a leader of a routing pool, the selection as a routing node for an additional routing pool would result in it being a leader in more than one routing pool. Therefore, in an example, the node responds to the notification with a rejection of the selection. This rejection can be in response to a determination that performance of the routing node will degrade beyond a threshold. Refusing to accept the role of leader in a routing pool generally results in a new leader selection with the node being excluded.

In an example, the routing pool of the node is a leaf of the routing graph. Thus, client device attachment requests are received by the node that is the routing node of the routing pool. In an example, the routing node receives an attachment request from a client device that initiated the query for the routing pool. In an example, the node refuses the attachment request in response to a size of the set of child connections being beyond a threshold (such as the open connection bound L). The node can refuse the attachment request based on other metrics, such as insufficient computing capabilities to handle the additional workload. Generally, however, the open connection threshold can serve as a proxy for whether the node can handle routing for the client device. If the node does not refuse the attachment request, the node adds the client device to the set of child connections. In an example, the node notifies the routing graph organizer that the client device is attached to the node.

In the following examples, the node is not in the routing pool sought after by the query of operation 905. In an example, the node maintains a local cache of nodes in the routing graph. This local cache includes entries for these nodes and each entry contains addresses and DHT IDs. In an example, the node's response to the query is a set of nodes from the local cache. This set of nodes is selected based on a distance from the DHT ID in the query. Thus, the recipient of the response can reach out to a node that has a DHT ID closer to the routing pool's DHT ID. In an example, the node sorts nodes in the local cache based on distance to the DHT ID in the query of operation 905. The set of nodes can be selected from the local cache to minimize the distance to the DHT ID in the query. Thus, the set of nodes are the closest to the DHT ID in the query. The node can then forward the query to each node in the set of nodes. Once a response from one of the set of nodes is received, the node can extract a routing node address and construct a result for the query that includes the routing node address. This set of examples illustrate a forward passing of the query and a chained response back to the query originator. Thus, the originator contacts a node once, and subsequent nodes continue to forward the query until it dies or a response to achieved.

In an example, the local cache of nodes is maintained via a DHT discovery procedure. In an example, the DHT discovery procedure involves a local search for nodes in the routing pool and a branch search for nodes in other routing pools corresponding to other vertices of the routing graph. In general, the DHT search techniques described above with respect to FIG. 6 and elsewhere can be used to maintain the local cache for the node.

As noted above, some nodes can participate in maintaining the health of the routing pool by helping the local routing node. Thus, in an example, the node continually checks to determine whether the routing node is operational. In an example, continually checking to determine whether the routing node is operational includes a transfer of state from the routing node to the node. As noted with respect to FIG. 8, the state includes data of a current operational state of routing activities on the routing node to enable recovery from the routing node in case of failure. In an example, the state is a subset of all of the current operational state of routing activities on the routing node. Here, the node can be a part of several nodes participating in maintaining the routing node's state. Such a division of labor can help when, for example, the node is a resource constrained device. In an example, one or more organizers of the routing graph determined which subset of the state would be transferred to the node. In an example, a parent node of the routing node determined the subset transferred to the node.

In an example, continually checking to determine whether the routing node is operational includes participating in a heartbeat confirmation with the routing node. The heartbeat is a simple message passing between the node and the routing node. Generally, the heartbeat does not require an open connection, but can instead use a simple protocol, such as UDP. In an example, the node initiates routing node recovery in response to a failure of the continual checking. Thus, if the heartbeat fails, or other monitoring indicates distress or absence by the routing node, the node can start a recovery procedure for the routing node. In an example, the routing node recovery includes initiating an election procedure with other nodes in the routing pool. In an example, routing node recovery includes alerting an organizer of the routing graph that the routing node failed. Other examples can include the assumption of the routing state transferred to the node, transfer of the state to a new routing node, etc.

The discussion above does not assume a structure of the routing graph beyond being a graph. In an example, the routing graph is a tree. Here, the client devices, when attaching to the routing graph, connect directly to routing nodes in routing pools that correspond to leaf vertices of the tree. In an example, routing nodes in routing pools that correspond to non-leaf routing pools route for other routing nodes. Thus, in the tree structure, leaf layers service client devices for a service and intermediate layers support routing nodes in lower layers. In an example, the root of the tree is a server node that does not belong to a routing pool. Here, the server node provides a service to client devices through the routing graph. In an example, the server node is an organizer of the routing graph. As noted above, the organizer defines operating parameters of the routing graph.

As the number of attached devices grow, it can be useful to grow the tree to support the additional devices. Thus, in an example, the node can receive an expansion command from the organizer, or a parent node, when the node is the routing node. Once the expansion command is received, the node can divide its child connections into a number of additional routing pools as defined by the organizer. The node then adds connections to additional routing nodes selected for the additional routing pools. The node then drops the child connections to complete transition of the routing pool to a parent of a new layer of the routing pool. Generally, growth occurs at the leaf layer of the tree.

Some trees result in an overprovisioning of routing nodes given a current attached device workload. In these cases, pruning the tree can increase productive use of the participating device's resources. Thus, in an example, the node receives a contraction command from the organizer when the routing pool is a non-leaf vertex. The node then notifies child routing node connections to terminate and accepts direct client device connections as child connections to transition the routing pool to a leaf vertex.

When the tree is a balanced tree, it is possible to set routing pool DHT IDs based on the structure of the tree. In an example, the DHT IDs for routing pools are based on a row and column of a corresponding vertex in the tree. In an example, the DHT ID of a given routing pool is determine by Key(J). In an example, Here, Key(J)=DHTHash(ServiceKey+AtLeastMaximumTreeSize+J), J=routing pool index in a tree layer, ServiceKey=an identifier unique to a service enabled by the routing graph, and AtLeastMaximumTreeSize=a value that is greater than or equal to the number of devices in support by the tree. In an example, the AtLeastMaximumTreeSize value is a ServiceSeed. In an example, the service is a topic family. In an example, the ServiceSeed differentiates between different providers of the topic family. In an example, the query received by the node is generated by a client device to attach to a routing node. In this example, the DHT ID of the query can be selected randomly by the client device from DHT IDs of routing pools that correspond to leaf vertices of the tree.

A service that can be implemented on the routing graph is a pub-sub network. Thus, in an example, the routing graph corresponds to a set of services of a pub-sub framework. In an example, DHT IDs are computed from topic names in the set of services. In this example, the structure of the routing graph can support the application layer connection structure of the pub-sub services through the DHT IDs.

To further support the pub-sub network, the node, as a routing node in a leaf routing pool, can serve as a broker for the pub-sub framework for clients serviced by the routing node. As a broker, the node maintains messages for subscribers until their messages can be delivered. In an example, the routing pool corresponds to topic names in the set of services. Here, client devices attach to the routing node of the routing pool in order to subscribe to a topic name to which the routing pool corresponds. Thus, client devices attach to brokers servicing their subscription. In an example, a repository of subscriptions for the routing pool is maintained. In an example, the repository of subscriptions is maintained at an organizer of the routing graph. This subscription repository can be useful when, for example, the client device attaches to a different routing pool because the routing pool with a broker corresponding to the client device's subscription refused the client device's attachment request. In this case, an explicit route to the client device can be used.

On the topic of routing, several options can be used. In an example, the node publishes a message for a topic name. The node can then obtain a route to a second broker node to which a subscribing device is possibly attached and transmit the publish message to the second broker node for delivery to the subscribing device. Generally, because routing nodes act as connection concatenators for upwards bound messages, a routing node will forward the message to a parent node as part of obtaining the route. This continues until the organizer, or other root of the tree, is reached. Thus, in an example, the node receives the publish message for a topic name from the client device and transmits the message to the organizer through the parent connection. The root can then forward the message back down the appropriate branch of the tree until it arrives at a broker to which the recipient is attached.

In an example, when the publish message originated from a client device, obtaining the route can include querying an organizer of the routing graph for a routing pool to which the subscribing device is attached. In this example, the organizer keeps the routing for the client devices. Here, the node can obtain a second routing node for the routing pool to which the subscribing device is attached and route the publish message to the second routing node. This sort of lateral routing can be used when, for example, there is a failure in the organizer. In general, however, it can increase the complexity of the routing graph and thus resource use by participants of the routing graph.

In an example, obtaining the route includes calculating a routing pool DHT ID to which the subscribing device is attached from topic name specified in the publish message. This assumes that the routing graph is organized in accordance with the pub-sub layer. Here, the node can locate a second routing node for the routing pool to which the subscribing device is attached using the calculated routing pool DHT ID and route the publish message to the second routing node. This routing need not be lateral but can instead pass the message up the tree until an ancestor (e.g., parent, grandparent, etc.) of the calculated routing pool DHT ID is found. At this point, the parent can be considered the root of a sub-tree and deliver the publish message. In an example, locating the second routing node includes performing a DHT search for the second routing node using the calculated routing pool DHT ID.

It is possible that collisions or other circumstances interfere with routing graph operation when tied to an application layer framework. For example, if a leaf node is specific to a topic name, but a client device trying to subscribe to the topic name can't attach to the broker in the leaf node, then the route to the client device cannot be directly calculated. As mention above, the organizer or other entity could maintain an explicit route to the client device, but this would entail some additional overhead. In contrast, several hashes can be used to define a set of routing pools for a single topic name. Thus, in an example, calculating the routing pool DHT ID to which the subscribing device is attached includes calculating respective routing pool DHT IDs for the topic name using a set of hashes defined for the routing graph. The node can then obtain respective routing nodes for routing pools with the respective routing pool DHT IDs and route the publish message to a respective routing node. In an example, calculating the respective routing pool DHT IDs for the topic name using the set of hashes includes calculating, obtaining a route, and routing the publish message for each hash until a positive response to routing the publish message is received, refraining from calculating any additional results once the positive response is received.

FIGS. 10-16 provide some additional details and context to the discussion above. Accordingly, the following examples can be combined with the operations of, for example, method 800 or method 900.

Figure 10:
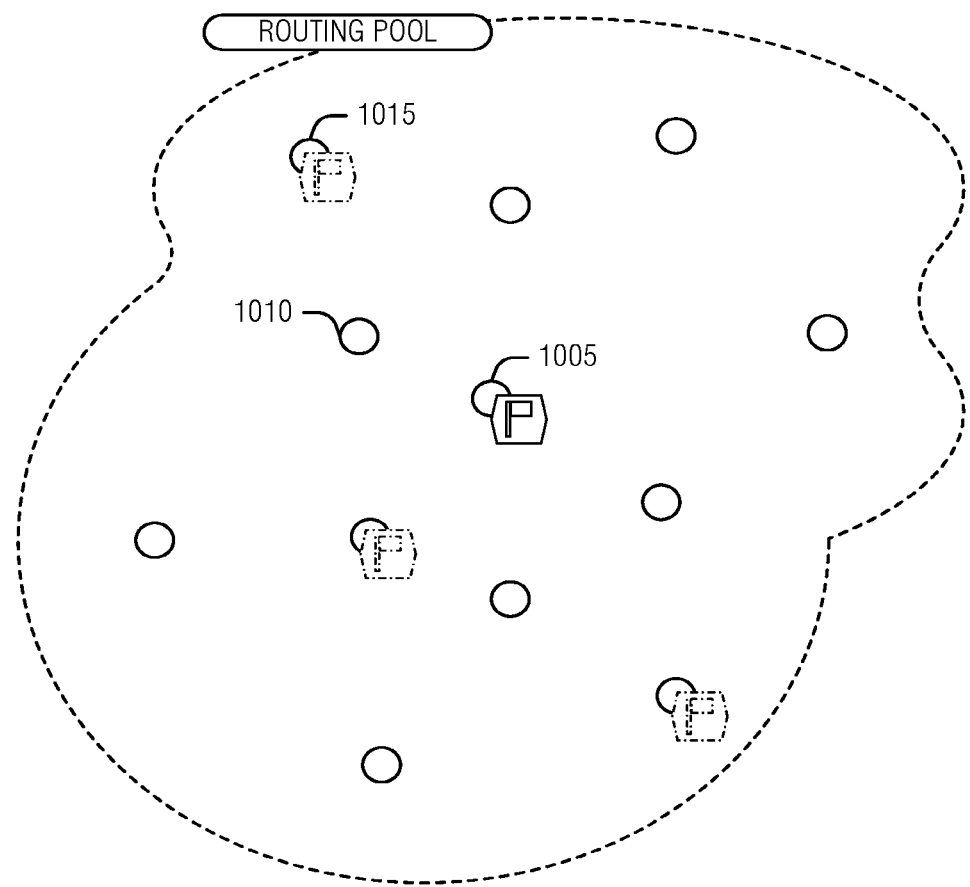
FIG. 10 illustrates a routing pool, according to an embodiment.

FIG. 10 illustrates a routing pool, according to an embodiment. The routing pool includes several devices, such as device 1005, 1010, and 1015. In accordance with the description above, device 1005 is the leader. Thus, if the routing pool were a vertex in a routing graph, the device 1005 would be a routing node for the routing pool. In an example, the devices in the routing pool support the routing node 1005 by, for example, maintaining the identity of the routing node 1005. Thus, a query that reaches device 1010, for example, for the routing node 1005, can be answered by the device 1010. The dashed leader badges, such as is present on device 1015, indicates that these devices provide additional support to the routing node 1005. This additional support can include health checks on the routing node (e.g., a heartbeat) or maintaining some state of the routine node 1005 to provide a backup, or failover, for the routing node 1005.

Generally, the devices in the routing pool are not attached to the routing node. That is, these devices do not rely on the routing node to route for them. In an example, the devices, such as device 1010, attach to a different routing node in a different routing pool for routing services. This situation recognizes that the devices can have a variety of topics to which they subscribe, for example, while still being the closest devices (e.g., via a DHT ID distance metric) to a DHT ID for the routing pool.

Figure 11:
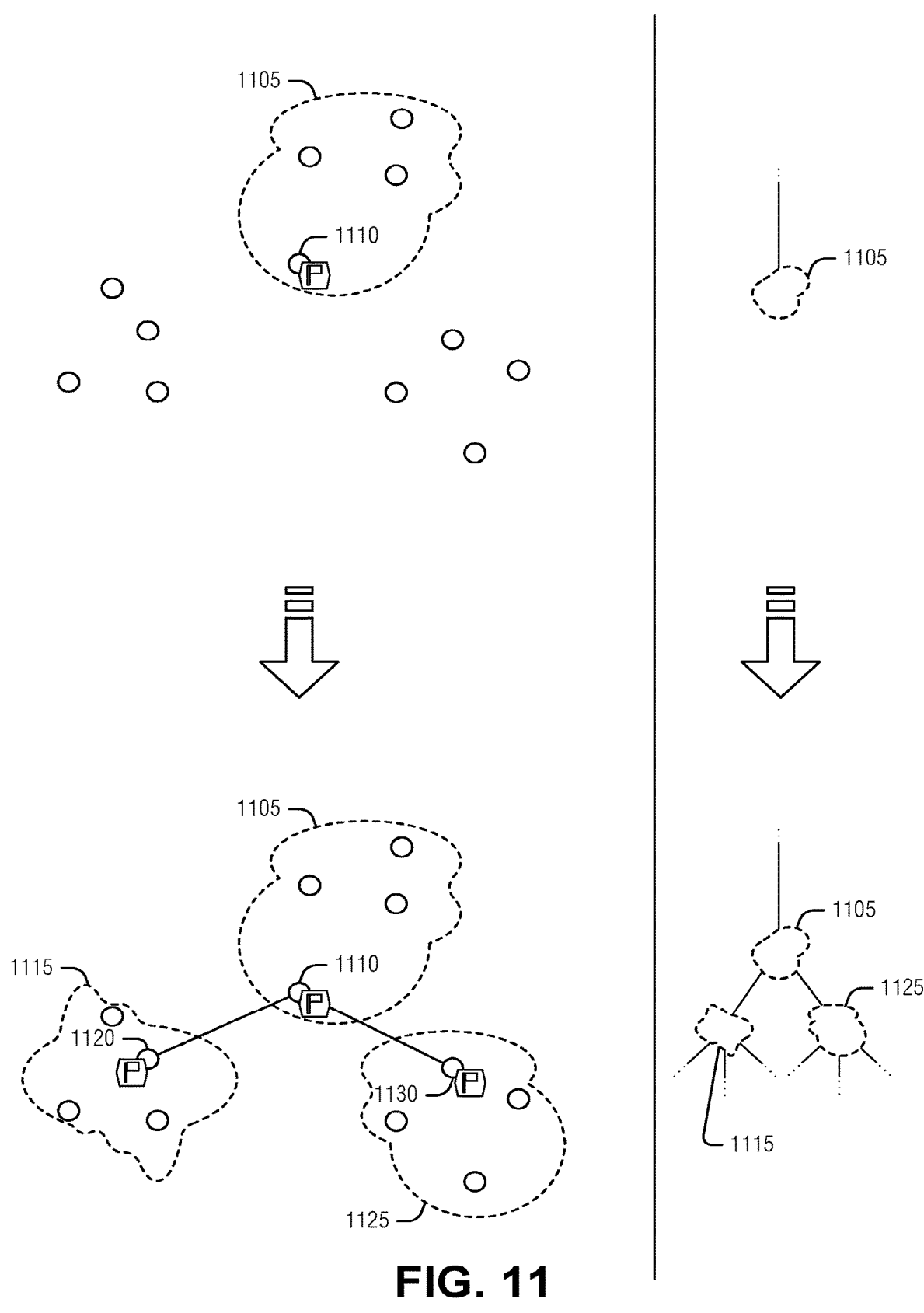
FIG. 11 illustrates splitting a routing pool to increase depth of a hierarchy, according to an embodiment.

FIG. 11 illustrates splitting a routing pool to increase depth of a hierarchy, according to an embodiment. Thus, if the routing pool 1105 is part of a broker tree, this technique can enable the broker tree to grow while minimizing routing service interruption. Generally, growth occurs at the leaf layer (e.g., I=h). It is often beneficial to grow the tree this when the layer h is not yet fully loaded—e.g., already has a maximum number of client device attached because newly joining client devices can struggle to find leaf vertices capable of accepting them. Tree growth involves a subtree-by-subtree approach. When the organizer has Lserv subtrees, the server attempts to grow them one by one. This enables the organizer to keep the service working during the growth. To grow a subtree, the organizer notifies the leaders of leaf vertices. Each leader of a leaf now follows a procedure similar to that performed during the original recursive tree construction. This procedure includes an attempt to prepare the routing pools of the new leaves (e.g., would-be child connections) and their leaders. In an example, only after all child vertices and respective leaders are in place, does the old leaf connects to them.

As illustrated in FIG. 11, the leader 1110 receives the instruction to grow. The leader 1110 creates the new routing pools 1115 and 1125. The new routing polls can be created, for example, by creating keys for them (e.g., Key(h+1, 0) and Key(h+1, 1)) and performing the Neighborhood(key) for each to allocate devices to the routing pools. The leader 1110 then invokes election or preforms appointment of the respective leaders 1120 and 1130. Once leaders 1120 and 1130 are established, the leader 1110 connects to these leaders and expands the tree. After the leaders 1120 and 1130 are connected to the leader 1110, leader 1110 terminates its child connections to client devices. This prompts the client devices to start a reconnection procedure to determine which routing pool to which to attach. At this point, routing pool 1105 is no longer a leaf node of the routing graph.

In an example, instead of using a reconnection procedure akin to an original connection, client devices can reconnect to the new leaves (e.g., routing pools 1115 and 1125) now connected to the old leaf (e.g., routing pool 1105). If there is a routing table (e.g., at an organizer of the routing graph), it is updated in accordance with the changed client device attachment points. By selecting a new child of the client device's previous leaf, the time a client device is disconnected is minimized because the reconnection operation is not dependent on any other routing pool creation during the tree growth.

When the growth is limited to a subtree-by-subtree, disconnection can be eliminated when client device's maintain redundant paths (e.g., spare connections) as illustrated in FIG. 15. Here, when one client device connection is disconnected and reconnected again, the client devices other connections can be used.

When N is not fixed, h is also not known to new client devices. If h is unknown, then the client device cannot directly compute the set {Key(h,*)}, for example, to perform the random leaf selection for attachment. Providing a current N or h to client devices can be accomplished in several ways. For example, N and h can be kept at the organizer of the routing graph, available to any device that queries the organizer. In an example, DHT mechanisms that automatically and efficiently cache popular variables at increasing numbers of different nodes can be used to answer queries to the organizer. This ensures that new client devices can get this information using a caching process which dynamically scales according to demand.

When using a caching infrastructure to deliver h to new and reconnecting client devices, consideration is given to the correctness of the cached h value at every point during the tree growth. To enable fast convergence of a random choice, it can be beneficial, given the currently published h, that at least a fraction (e.g., half) of the leaves in level h are not full (e.g., they are accepting connections). To achieve these goals, an organizer can track the number of non-full leaves at every subtree. The organizer then attempts to first grow the subtrees with highest number of full leaves. If w is the number of leaves at level h of the tree before the growth begins, and w' is the number of leaves at level h+1 after the growth complete, then, as long as the number of non-full leaves in the not-yet-grown subtrees is greater than $$\frac{w}{2},$$

the organizer continues the old h. Once the growth procedure reaches the point that less than $$\frac{w}{2}$$

non-full leaves exist at level h, this means that more than $$\frac{w'}{2}$$

new leaves already exist at level h+1. Accordingly, at this point, the organizer can switch to publishing h+1.

While the growing operations are underway, it is possible that, despite knowing the correct h, client devices can attempt to attach to old leaves that are now already internal vertices or attach to prospective new leaves that have not yet joined the routing graph. In these cases, the attachment requests are refused. Such refusal will prompt the client device to try again to find a suitable leaf. Generally, the likelihood that the client device is able to attach is high because many (e.g., half) of the leaf nodes in the routing graph remain available even if the growth processes has not completed by the time the client device attempts to reconnect.

As noted above with respect to FIG. 7, consideration for overlapping routing pools can have beneficial effects during tree growth. While hash functions can generate close to random distributions they may sometimes collide. Also, if two routing pools have somewhat similar keys, then devices in these routing pools can belong to both. Electing the same node as leader of more than a single routing pool might consume too much of that device's resources. Thus, in an example, once a device is elected as the leader of one routing pool, the leader election process refrains from selecting that device as the leader of a second routing pool. Alternatively, preventing overlapping membership in multiple routing pools by devices removes the multiple leader election issue altogether.

A consequence from growing a full, balanced tree is that the first layer (e.g., children of the root) carries all the load (in terms of the number of messages it needs to relay) of the lower layers and the client devices connected to the leaf layer routing pools. To reduce the relaying load, it can be beneficial to make this layer as wide as possible (e.g., including as many vertices as possible). However, adding vertices to this layer involves opening additional connections to the root device. This, however, is often possible because, which the devices supporting the routing graph are generally resource constrained devices, the root is typically a server machine that can open one or two orders of magnitude more connections than the limit for the other devices in the infrastructure. To give a sense of magnitude, the nodes may be able to open around ten connections or less while the server may open a thousand or more.

For example, let Lserv be the number of connections the server can open. Layer 1 can be constructed to have approximately Lserv vertices. An approximate value is used to address server scalability as described below. Layer 2 has Lserv*L vertices, and so forth. Using this structure, the height of the tree h needed to host N client devices is reduced to $$1 + \log_L\left(\frac{N}{Lserv}\right)$$

and so does the optimal path length between client devices and the server.

Message propagation load on each vertex in layer 1 is aggregated from $$\frac{N}{Lserv}$$

client devices. If analysis or empirical evaluation indicates that this load is still too high on layer 1 vertices, the server can be upgraded to handle additional connections and the number of vertices in layer 1 grown. In this way, relay load can be linearly reduced.

To scale and to provide failover, the server can be implemented using more than a single machine. In this case the server machines can be interconnected to share status, load, data, or information. Because the number of machines in the server implementation usually does not exceed three, four, or any other number that is much lower than Lserv, it is relatively easy to connect all nodes in layer 1 to all server machines. A partial illustration of this is given by the dashed lines connecting vertex 325 with the servers 305 and 330 in FIG. 3, the image of which is recreated in FIG. 7. This arrangement can reduce the number of open connections to supportable by each tree vertex in layer 1, because some open connection capability is devoted to connecting to the additional server machines to enable the server machines to share the load in a symmetric way.

When a routing table is used, each server machine can host a replica of the routing table. When a vertex in layer 1 receives an update to the routing table—such as when a client device connects or disconnects from a leaf—the vertex notifies the server machines. However, in an example, if a request is received from a client device, it can be sent to only one of the server machines after considering their load or any other considerations. In general, the full connectivity between the server and layer 1 and the resulting symmetry between the server machines enables flexibility in policy implementation.

Figure 12:
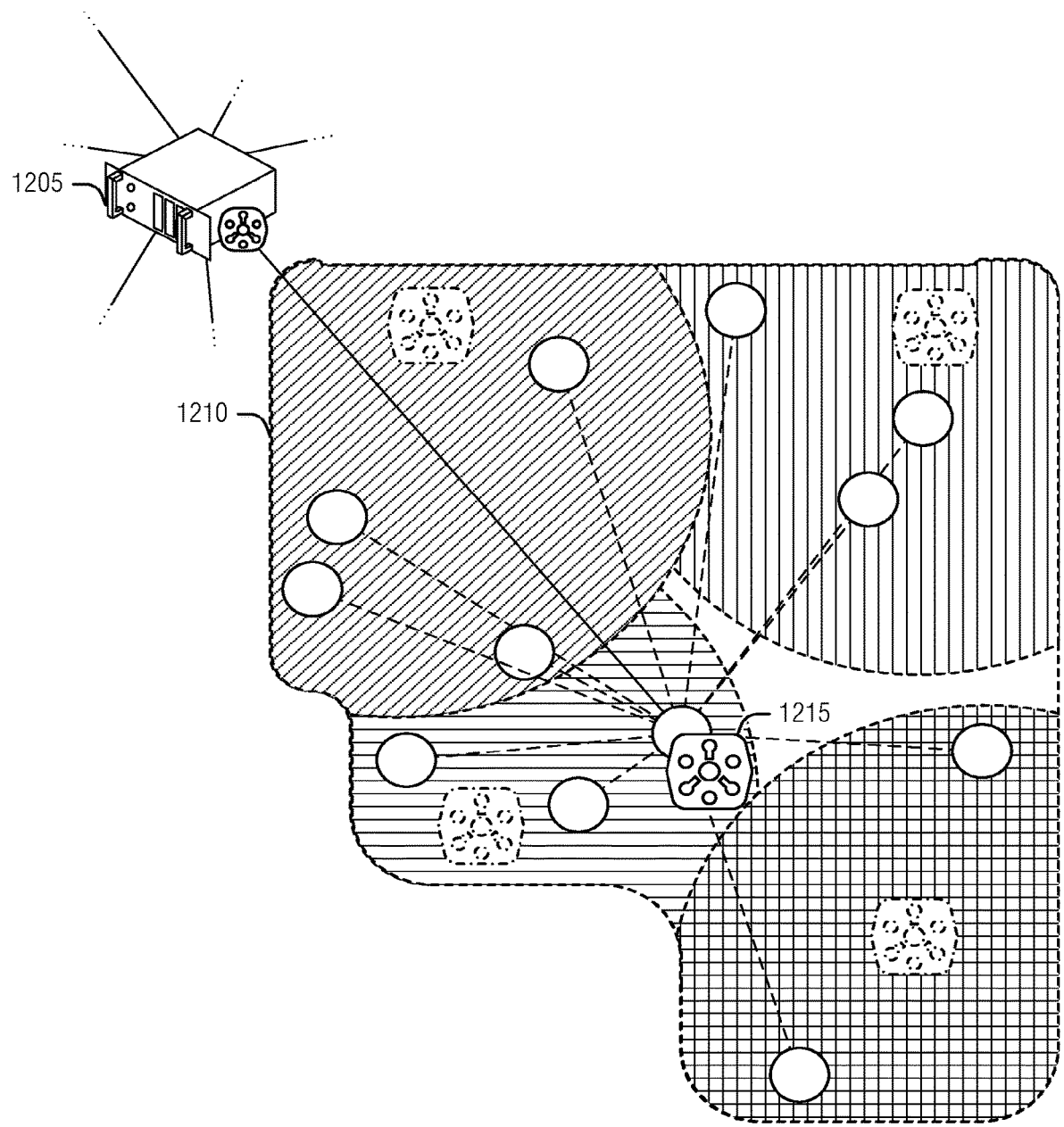
FIG. 12 illustrates hierarchy reduction of routing pools, according to an embodiment.

FIG. 12 illustrates hierarchy reduction of routing pools, according to an embodiment. Tree reduction, or pruning, addresses a situation in which the tree is larger than necessary to service the number of attached client devices. As with tree growth, pruning should have a minimal impact on message routing during the process.

Tree reduction can be implemented by removing the leaves from layer h in a subtree-by-subtree manner, similar to growing the tree. This process can leave some of the leaves on every subtree—such as subtrees of the subtree, as previously described with respect to a partially full layer h—as only partially removed or, for a steep reduction, all of them at once. To reduce interruption for client devices, the leaves to be deleted are notified (e.g., by a routing graph organizer) when the process begins. The leaves, in turn, notify the connected client devices about the process and then disconnect them. The disconnected client devices then perform a connection (e.g., reconnection) to the routing graph as described above with respect to tree growth. Again, if used, routing tables, or routing topic tables in a pub-sub implementation, can be modified accordingly.

The illustration of FIG. 12 is the result after the tree pruning is complete. The shaded elements within the new leaf 1210 represent the previous leaves, with the client devices represented as white circles. After the pruning, these client devices connect to the routing node 1215, which directly connects to the server 1205.

Figure 13:
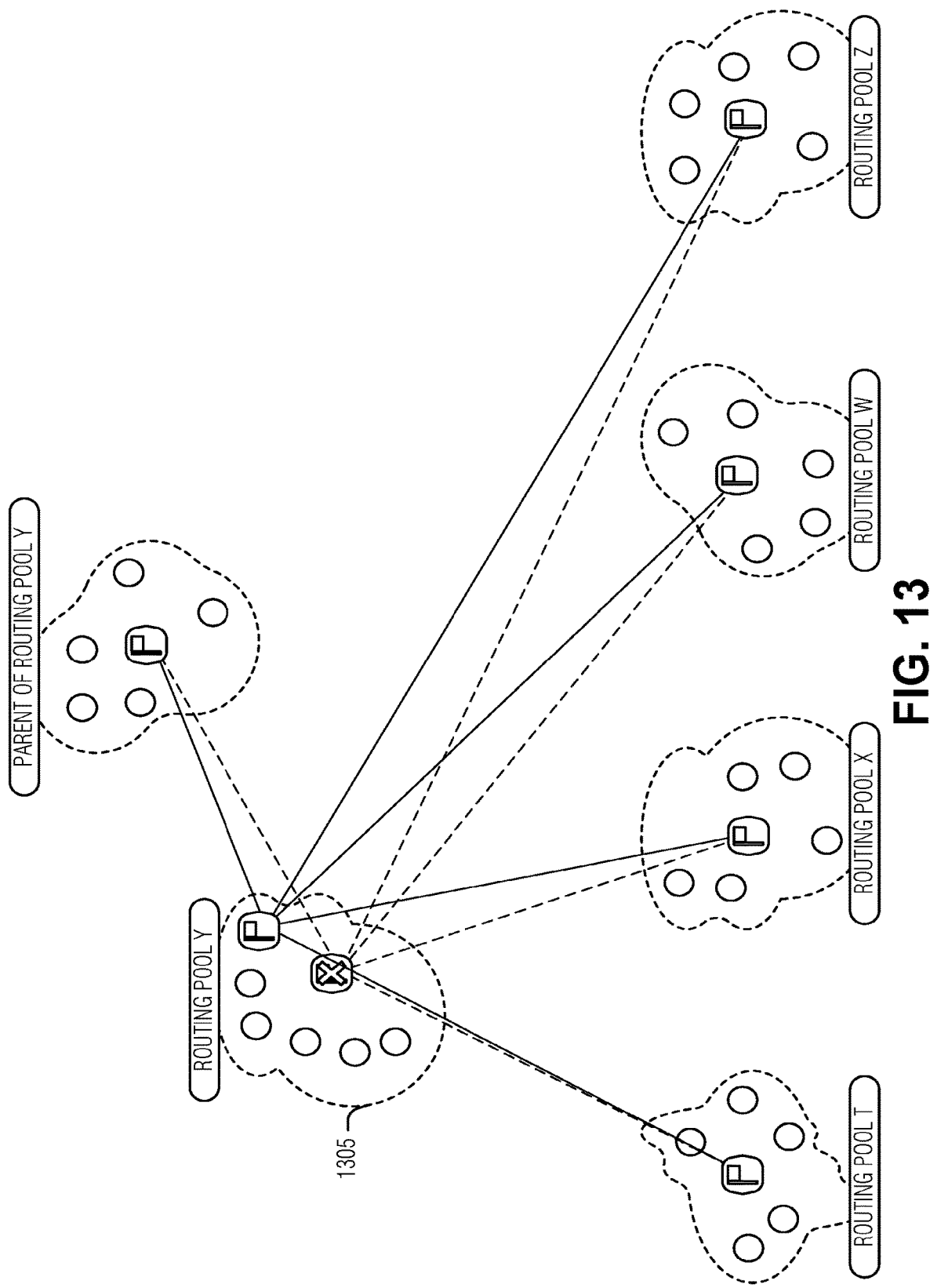
FIG. 13 illustrates routing node connections between routing pools during failover, according to an embodiment.

FIG. 13 illustrates routing node connections between routing pools during failover, according to an embodiment. Such a failover can be caused by routing node failures. As illustrated, the routing node in routing pool Y 1305 failed (indicated by the 'X' over the routing node). An additional routing node is selected. The routing nodes of the children routing pools T, X, W, and Z, and the routing node in the parent of routing pool Y, drop their connections to the failed routing node (illustrated as dashed lines) and establish connections to the new routing node of the routing pool Y 1305.

In an example, devices within a routing pool monitor for routing node failures. For example, the routing node can periodically send "I-am-alive" messages to other devices in the routing pool. The frequency of these messages can be set based on an application's sensitivity to message latency. Thus, a shorter period between message can be used for more sensitive application, and a longer period for less sensitive applications. If, as illustrated in FIG. 15, a redundant path exists for client devices, then the chance that a single failed routing node increases message latency is low.

A device in the routing pool that does not receive I-am-alive message from the routing node after a waiting period has elapsed, can notify the parent routing node (e.g., the routing node of the parent of routing pool Y) that the routing node (e.g., of routing pool Y 1305) failed. In an example, after the parent routing node verifies that the routing node is not responding—e.g., by attempting to contact the routing node or by waiting to receive more notifications from other devices in the routing pool of the failing routing node—triggers the procedure to replace the failed routing node with another device in the routing pool. In an example, the replacement procedure uses a DHT refresh function on the routing pool followed by election or selection of a new leader. It is not always necessary to perform a refresh, which can be expensive in terms of time and resources. Often, it is sufficient to elect another device from the routing pool.

After the new leader is chosen, the new leader opens a connection with its parent routing node; the parent routing node closing its connection with the failed routing node. Then, the new leader also opens connections with all child devices, whether other routing nodes or client devices. With the newly opened connections, the new routing node requests that the children devices close connections with the failed routing node. If it is a non-leaf node, the routing node can find the child nodes an initiate routing node election or appoint them to be routing nodes. If it is a leaf node, then it awaits for client devices to reconnect. In an example, after the new routing node is installed and the failed routing node removed, the organizer of the routing graph can be notified to, for example, update its routing table.

A feature of this procedure is that it is localized to the routing pool with the failed leader and devices directly connected to the failed leader, with the exception of any notifications to an organizer. Locality is enabled by the DHT computation of the routing graph vertices, as well as the support provided by devices within the routing pools.

Figure 14:
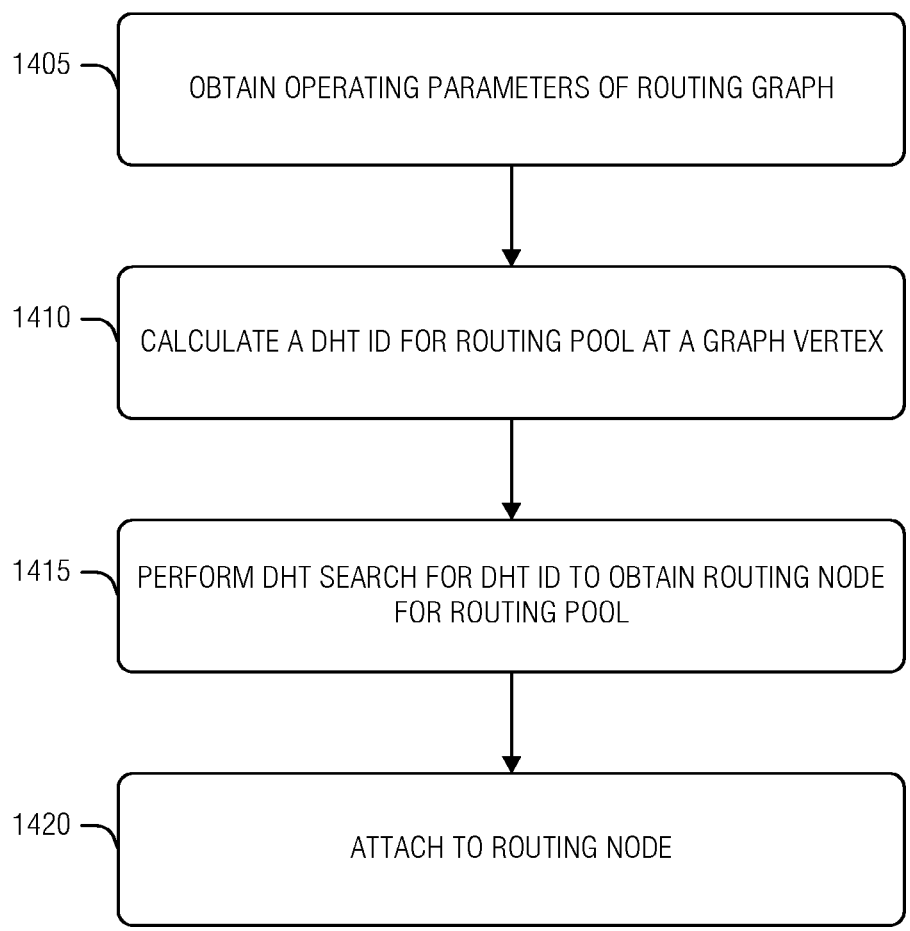
FIG. 14 illustrates a flow diagram of a method for client attachment to a routing node in a routing pool hierarchy implementing a pub-sub network, according to an embodiment.

FIG. 14 illustrates a flow diagram of a method 1400 for client attachment to a routing node in a routing pool hierarchy implementing a pub-sub network, according to an embodiment. The operations of the method 1400 are implemented by computer hardware (e.g., processing circuitry) on a client device.

At operation 1405, the client device obtains operating parameters of a routing graph. Obtaining these operating parameters can include receiving the operating parameters as part of an initialization process. In an example, obtaining the operating parameters can include querying an organizer of the routing graph. In an example, the operating parameters can be provided from a cache at a device in the routing graph in response to the query to the organizer.

At operation 1410, a DHT ID for a vertex of the routing graph is calculated using the operating parameters. Here, the vertex is a routing pool containing one or more nodes.

At operation 1415, a DHT search for the DHT ID is performed to locate a node in the routing pool to return an address for a routing node of the routing pool.

At operation 1420, the client device attempts to attach to the routing node. In an example, the attempted attachment includes sending a request to the routing node. In an example, when the routing graph is organized as a balanced tree, and when client devices attach to routing nodes in routing pools that correspond to leaf vertices of the tree, the parameters of the routing graph include a height of the tree. The height of the tree is used to calculate DHT IDs for leaf vertices of the tree. In an example, calculating the DHT ID includes randomly selecting a leaf vertex. In this example, the client device can notify the organizer which routing pool the client device attached. With a random leaf selection, there is no way to calculate to which leaf the client device attached. Thus, the client device notification, or a notification by the routing node in the routing pool, to the organizer enables the organizer to update its routing table.

In an example, when the routing graph corresponds to a set of services in a pub-sub framework, topic names within the set of services can be transformed into (e.g., mapped to) DHT IDs for routing pools that support the topic names. In an example, the client device has a DHT ID computed from a topic name to which the client device will subscribe. Here, calculating the DHT ID includes selecting a routing pool with a DHT ID that is closest to the client device DHT ID. This scenario can occur when the pub-sub network is implementing a one-to-one messaging model. Here, the topic name usually corresponds to the one client device.

As mentioned above, some messaging interruptions, such as from tree growth or pruning, can be mitigated if the client device maintains multiple connections to the routing graph. Accordingly, in an example, the client device calculates a second DHT ID for a second routing pool. The client device can then search the routing graph for a node in a second routing pool that corresponds to the second DHT ID, receive a second routing node address in response and attach to the second routing node. In an example, to calculate the second DHT ID, the client device can establish a first path from the client device to a destination device (e.g., tree root, server, etc.) through the first routing node. A second path from the client device to the destination device is then established through a prospective routing node in a prospective routing pool corresponding to a prospective DHT ID. The client device selects the prospective DHT ID as the second DHT ID when the first path does not overlap with the second path. This is illustrated in FIG. 15. In order for the client device to have a connection when any one routing node fails, the two paths cannot share any routing nodes. This is achieved when the paths between the client device and the destination device starting at the first routing node and the prospective routing node share no common links.

Many resource constrained devices may subscribe to only a single topic because they are individually approached (e.g., in a one-to-one manner) or have limited capabilities and thus a narrow focus. However, a client device can subscribe to multiple topics. Thus, in an example, the client device subscribes to a second topic name by computing a DHT ID from the second topic name. Then the client device can attach to a second routing pool with a DHT ID that is closest to the second client device DHT ID.

FIG. 15 illustrates redundant pathing for a client, according to an embodiment. Although the procedure to grow the routing graph, shrink the routing graph, or replace a failed routing node is relatively simple and localized to the event, some time can be consumed during these events in which messaging is interrupted for a client device 1520. This time can be lengthened if rigorous leader election techniques are used to select new routing nodes. In some circumstances, the client device 1520 cannot operate correctly with the latency imposed by replacing a routing node. In these circumstances, it can be advantageous to spend additional connections resources to maintain multiple (e.g., two or more) separate and non-intersecting paths to a server 1505 or other destination entity. Thus, if a routing node along one path 1515 fails, the other path 125 is likely to persist and can be used as an alternative.

In an example, to ensure two non-intersecting routes when the routing graph is a tree, the client device 1520 chooses its second connection in the same way that the first connection was chosen. However, instead of selecting from all leaf nodes, the available leaf nodes (e.g., for random selection) are reduced to only those leaf nodes with a layer 1 component different than the layer 1 component from the first connection. Generally, a tree has L different big branches—a big branch starting with each vertex that directly connects with the root. Accordingly, as its second choice, the client device chooses from leaves belonging to the remaining L-1 branches. Thus, once again, given that layer h of the tree is not too full of client device connections, the random choice quickly converges.

Redundancy can also help in coping with unbalanced load. For example, if one part of the tree suddenly becomes very active and floods lower layers with messages, this load peaking can cause congestion, unwanted delays, or losses in message transfer. Using a light-weight monitoring technique or transfer acknowledgement mechanism, the client device 1520 or the sever 1505 can switch from the primary path 1515 to the alternate path 1525.

Redundant paths may function better with a larger h. The number of connections to layer h (the leaves) of the tree, grows faster than the number of client devices by the number of multiple connections maintained by the client devices. Thus, if the client devices maintain three redundant connections, the leaves will need to support three times the client of client devices N. Sizing h appropriately can increase path lengths, but the growth is likely small because increasing h by one result in L times more client device connection capacity.

Figure 16:
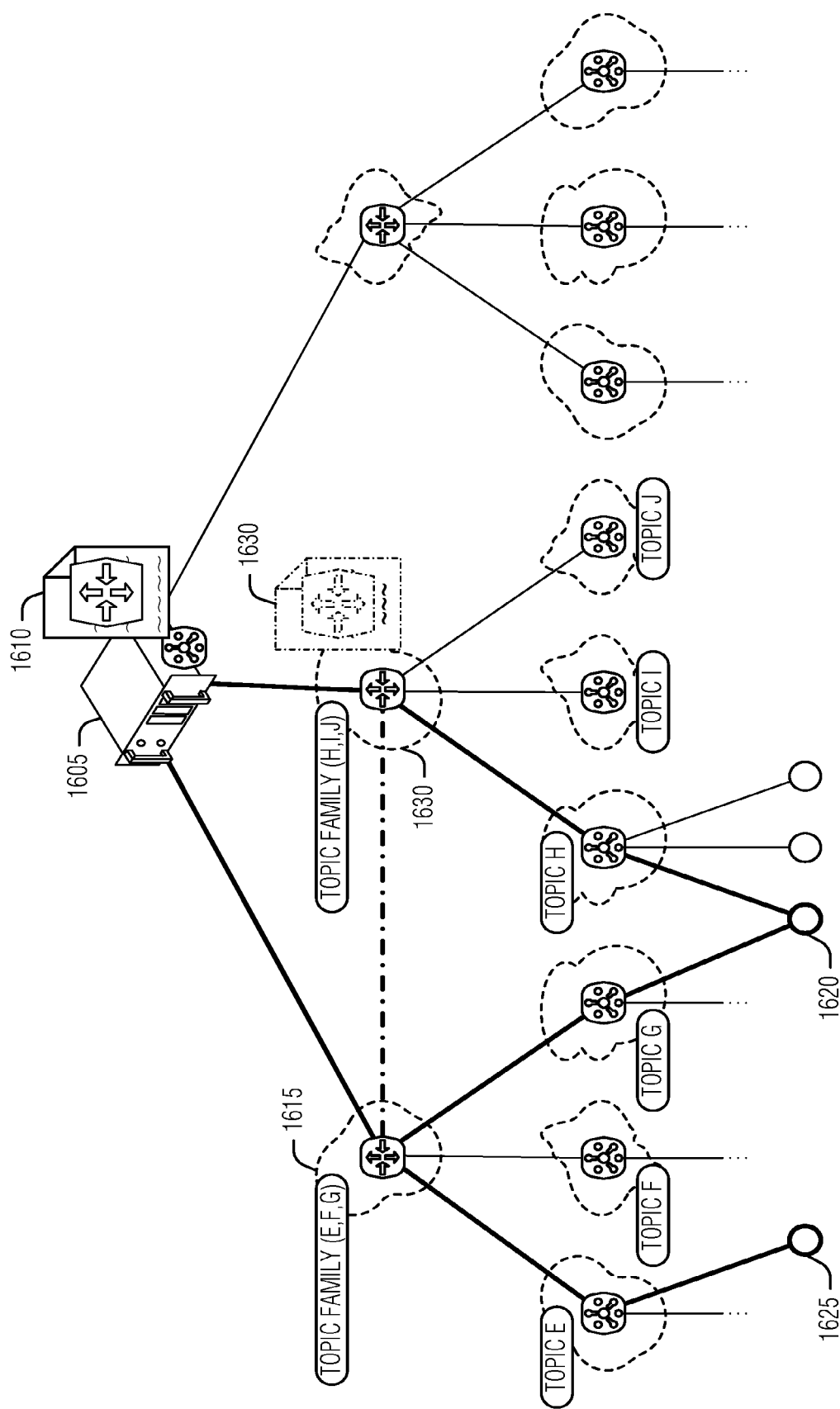
FIG. 16 illustrates routing for topic messages, according to an embodiment.

FIG. 16 illustrates routing for topic messages, according to an embodiment. The previous discussion largely focused on different routing graph structures, attaching to the routing graph by client devices, and composing routing graph vertices among other things. Here, some additional room is given to describe various aspects and embodiments to message routing beyond connecting vertices of the routing graph.

In the context of routing, two main flavors are described, one that uses routing tables, and one that uses the structure of the routing graph to calculate routes. The former is generally applicable to the client device attachment technique that randomly selects a leaf node as its attachment point. The latter is generally applicable when there is a semantic pairing of client devices and leaf nodes, such as when the leaf hosts a pub-sub topic to which the client device wants to subscribe.

Starting with the routing table techniques, when a new client device attempts to join the routing graph, the client device can follow the random leaf selection process. Because the actual leaf routing pool, and thus routing node, to which the client device attaches is random, routes to the client device cannot be predicted. Accordingly, a routing table is used. Thus, once a client device, such as client device 1620, connects to the routing graph, the client device 1620 registers the connection. This registration can be made to, for example, the server 1605. As illustrated, the server 1605 maintains a routing table 1610. The routing table 1610 is then used to forward messages to the client device 1620. In an example, messages are routed up the routing graph to the server 1605. The server then selects the downward route (e.g., via routing pool 1630) using the routing table 1610. In an example, the routing node (e.g., leaf broker) to which the client device 1620 attaches can provide the notification to the server 1605. Having the leaf routing node provide the notification can be more efficient because the routing node can aggregate several such notifications from multiple client devices.

When the routing graph is a balanced tree, and the vertices (e.g., the routing pools) have DHT IDs based on the I and J index values as described above, the routing table entry can be a client ID and the key (e.g., [I,J] tuple) or DHT ID of the leaf routing pool. For example, the topic H routing pool has an index of h=2 and I=4, making the routing entry be [client device ID, [2,4]]. Using this index structure, the server 1605 can compute the next hop of routing pool 1630 when sending a message to the client device 1620.

In an example, the routing table 1610 is the only state maintained by the server 1605 with respect to passing messages. In this example, the server 1605 can maintain some state as to the structure of the routing graph. This can be used to, for example, publish h to enable client devices to calculate routing pool indices, to grow or shrink the routing graph, etc. Although the server 1605 is illustrated as maintaining the routing table 1610, another entity can maintain the routing table 1610 as long as it is available to direct messages through the routing graph.

In an example, the routing table 1610 can be distributed among several devices. In an example, a copy 1630 of the routing table can be kept by a routing node as a backup. In an example, the routing table 1610 is replaced with a distributed database of {key*,value*} data items. Here, key* is the name of the client device 1620 and value* is the key (e.g., [I,J] tuple) for the leaf of the routing graph (e.g., topic H routing pool) with which the client device 1620 is connected. In an example, there can be multiple leaf keys (e.g., a key for the topic G routing pool and the topic H routing pool), depending on the number of leaves to which the client device 1620 is connected. In an example, the distributed database can be implemented with a DHT. Here, the DHT can store items with a redundancy factor K by using the K-group of key* (if key* belongs to a different address space then H(key*) can be used). Once stored in the group of key*, DHT standard search operations allow to search for key* and find a node in which the data item is stored and maintained (the distributed database over DHT is maintained by periodically refreshing to keep its validity over time and to update the group). Here, the DHT for the distributed database can be unconnected to the DHT-based techniques used to create the routing pools. However, as the routing pools already provide a group of devices, the routing pools themselves can be used as the groups in the DHT distributed routing table.

When organized as a tree, the server 1605, or other organizer of the routing graph, is responsible for connecting subtrees from the root. Here, the approximately Lserv subtrees with roots (e.g., routing pool 1615 and routing pool 1630) are vertices of layer 1 are connected to each other through the server 1605. If the server 1605 stops functioning (e.g., dies) there is no way to route between these subtrees. To resolve this weakness, an interconnection is to reuse the freed open connections of layer 1 nodes to form a network between themselves. For example, if the server 1605 fails, the routing node in the routing pool 1615 and in routing pool 1630 have freed the open connection slots used to connect to the server. These routing nodes rededicate this open connection slot to connect to each other. In the indexed routing pool arrangement, the layer 1 vertices need some information about the other vertices, such as their keys or routing node identities. In an example, the server 1605, while operational, provides updates to the layer 1 vertices with this information.

There are several techniques that can be used to interconnect layer 1 vertices. A constraint on the techniques can include the open connection bound L described above. If, for example, there are only two layer 1 vertices, then the freed server connections are sufficient. However, when the number of vertices grows, a naive implementation can consume many available open connection slots. If the number of connections is limited to one, then potential alternative topologies may be too restrictive, and the resulting construction may be complicated or unbalanced. This can be mitigated is, for example, a computationally strong device can open many connections and replace the server in a star-like topology. If the number of connections is two, the routing graph can change from a tree to a ring topology. Here, on average the messages, will make $$\frac{Lserv}{2}$$

hops before reaching the root of their subtree destination. In some circumstances, the ring can become the bottleneck through which all inter-subtree communication flows. If the number of connections is three, then the number of hops inside layer 1 can be reduced to $\log_2$ Lserv using skip list techniques. If the number of freed connections is four and Lserv is a power of two, then a butterfly-like network can be used to route in $\log_2$ Lserv hops inside layer 1 and the bandwidth can be kept to $$\frac{Lserv}{\log_2 Lserv}.$$

With the above context in mind, consider that the server 1605 fails while the client device 1620 attempts to send a message to client device 1625. The client device 1620 can look for leaves connected to client device 1625 by querying a distributed routing table (e.g., using a DHT search). After the routing pool for topic E is identified by this search, the client device 1620 can route the message to routing pool 1615, which is the layer 1 root of the subtree to which client device 1625 is attached. As illustrated, the client device 1620 could have the message routed directly to the routing pool 1615 through its alternate connection. However, if the client device 1620 is only connected to the topic H routing pool, then the message can be routed to the layer 1 routing pool 1630, which forwards the message within layer 1 to the routing pool 1615 for delivery to the client device 1625.

Although the routing table implementation described above provides the capability to route messages given a variety of connection techniques, such as the random leaf selection technique that can be employed by client devices, it is possible to do without the routing table given certain conditions. For example, if the server 1605 (or other entity) is able to compute the keys of the leaves to which client devices are connected, then the routing table 1610 would have become redundant.

A technique to compute routes uses an aspect of the client device 1620 to determine to which leaf node to attach. For example, the client device 1620 can compute H(client_device_serial_no) to produce a DHT key. In the balanced tree version of the routing graph, the client device 1620 can connect to the leaf node closest (e.g., by the DHT distance metric) to the computed DHT key. In fact, any device in the routing graph could perform the same calculation, if it is aware of the client device's serial number and arrive at the same answer, and thus the route. In general, the universally known entities in a pub-sub network are topics. Thus, here, the client-device_serial_no would likely be a topic in an X-to-one pub-sub network.

In a pub-sub application, a topic name to which the client device 1620 wishes to subscribe can be used as the client device aspect. In a one-to-one pub-sub application, such a topic name is akin to the serial number. In other pub-sub applications, the association of topic to leaf routing pools provides an efficient technique for routing messages in general. This is enhanced when, for example, the leaf routing pools host a broker for the pub-sub application that has those topic names.

If the topic is defined by a string containing the topic-title, then the string can be hashed to produce a DHT ID. A route, for example by the server 1605, follows the same computation when it needs to contact client devices of a specific topic. In an example, acknowledgments (ACKs) can introduce some overhead to ensure that subscribing client devices are actually attached to the computed routing pool. The ACKs are generally not necessary when a routing table 1610 is used, assuming that the routing table 1610 is current.

The following functions can be used to implement a topic-based computation to determine routes:

A set of hash functions that accept an ID and produce a second ID. A technique to produce an arbitrary number of these hash functions for the set of hash functions can include recursive hashing. Thus, given hash function $Hi(ID)$, $Hi^2(Id)=Hi(Hi(ID))$, $Hi^3(ID)=Hi(Hi^2(ID))$, and $Hi^n(ID)=Hi(Hi^{n-1}(ID))$.

A function Hg(ID, MaxNodes(h)) which takes an ID and produces a leaf number. In an example, the leaf number is an integral number in the range 0 . . . MaxNodes(h)−1. Recall that MaxNodes(h) is the maximal number of nodes in level h for the balanced tree. If ID is interpreted as an integral number, then Hg(ID, MaxNodes(h)) can be defined as MOD(ID,MaxNodes(h)).

A function Hg'(ID,MaxNodes(h)) which is similar to Hg and produces a leaf number in the range 0 . . . . MaxNodes(h) such that Hg(ID,MaxNodes(h)) and Hg'(ID,MaxNodes(h)) do not share connections on their path to the server 1605. For example, if there are m leaves in every subtree of the balanced tree, then, Hg'(ID,MaxNodes(h)) may be defined as MOD(H(ID,MaxNodes(h))+m,MaxNodes(h)).

Given the functions Hi, Hg, and Hg', the client device 1620 with an ID (e.g., generated from a topic name string) can join the tree by computing Hg(Hi(ID)) and Hg'(Hi(ID)) to find the leaves to which it can connect. Once the leaf is identified, connection proceeds as it would have under the random leaf selection process.

In this context, a collision occurs when one of the leaves Hg(Hi(ID)) or Hg'(Hi(ID)) refuses to connect to the client device—for example, because the routing node in the leaf has reached its maximum number of connections (e.g., it is already connected to Lleav client devices). In this case, the client device 1620 computes Hg(Hi$^2$(ID)) and Hg'(Hi$^2$(ID)) and attempts to connect to these leaves instead. The client device 1620 proceeds in this manner, using Hi$^3$, Hi$^4$, . . . . , until it is able to connect. In an example, the client device 1620 proceeds until it is able to connect to at least two leaves (or more, if needed). If the set of hash functions are good hash functions, the result of the attachment resembles a random distribution. Such a distribution generally results in a balanced load across the leaves. The parameters h and the leaf routing node loads (Lserv) interact to speed convergence (e.g., the number of attempts the client device 1620 need to make to successfully attach). Generally, the larger h is and the fewer client devices served by leaf routing nodes, the more quickly the client device 1620 is able to find an available leaf routing node.

In a computational routing scheme, the leaf routing nodes to which the client device 1620 connects do not notify the server 1605 because there is generally no reason to maintain the routing table 1610. Instead, when a device (such as the server 1605) attempts to route a message to the client device 1620—or more specifically to DHT ID corresponding to the client device 1620—the device computes id=Hg(Hi$^1$(ID)) and id'=Hg'(Hi$^1$(ID)) and then computes the leaves Key(h, id) and Key(h, id') to which the client device 1620 is connected.

The computation is based on routing graph vertices (e.g., routing pool DHT IDs) and not on specific devices (e.g., routing node identities within the routing pools). For example, starting with the server 1605, the server 1605 generally does not know the routing node to which the client device is connected. Rather, the routing node is generally known by members of the routing pool and a routing node in a parent routing pool. Here, when the server 1605 sends a message to the client device, the server 1605 computes the sequence of keys of routing graph vertices on the path to the leaf, but not the sequence of routing nodes on that path. The sequence of routing nodes in the path is gradually revealed to the message as it propagates from one leader to its offspring leader along the path.

Although the process for resolving collisions from the client device side is relatively straightforward, it can introduce some difficulty for the server 1605 when computing the leaf node because the server 1605 is unaware which hash function in the set of hash functions was used. For example, the client device 1620 is not found in the leaves computed by the server 1605 using Hi$^1$(D), because that leaf resulted in a collision for the client device 1620. In this case the server 1605 can iteratively try Hi$^f$, increasing f each time until the leaves to which the client device 1620 is connected is found. Following a collision resolution process and upon finding a leaf to which the client device 1620 is connected, the leaf, together with the identity of its routing node, can be cached at the server 1605 in the routing table 1610 dedicated for resolving collisions. Thus, if there are few collisions, the collision routing table 1610 will be small. Because h governs collision likelihood, a reasonable approach would increment h once the collision table crosses a certain threshold of entries, or once a collision is reported for a relatively high Hi, such as a collision reported when Hi$^f$ is reached and f>2.

As noted previously, the chance of collisions entails a mechanism to ensure that delivery is successful in order to determine whether to route the message to a secondary leaf due to a collision. This ACK mechanism can require the server 1605 to wait for acknowledgement to know the message has been delivered. The ACK mechanism can introduce some delays. To mitigate these delays, several techniques can be applied. For example, h can be increased to reduce the chance of collisions. In an example, a collision cache can be kept by the server 1605 to avoid repeated overhead penalty when the client device 1620 with a collision is regularly connected by the server 1605. This is a form of the collision routing table 1610. In an example, the server 1605 can send the message to some or all of the Hi computed leaves simultaneously. While this will generally increase the message traffic, it will reduce delay in message delivery. In an example, a frequently interacted-with client device 1620 that experience a collision can be swapped with another client device 1625 that receives fewer messages.

Routing table and non-routing table techniques can be combined in a single implementation. For example, nodes that know they are connecting to a non-standard location, can inform the server through the same notification mechanism used in the routing table case. Here, the routing table can be populated both from notifications and from cached special locations (e.g., from the iterative hashing process). Thus, in any case, the server checks the cache, and if an entry exists in the table, it is used. This enables intermediate nodes to act as clients and not be connected to leaf brokers.

The computed routes can also be used in a serverless, or organizer absent, environment. In fact, computed routing removes the need for maintaining a distributed database containing the routing table 1610, resulting in a more efficient implementation. Keeping track of collisions and managing h can be performed by electing a leader of level 1 vertices to perform these generally light-weight tasks.

Some aspects of the previous discussion assume a one-to-one pub-sub communication technique. Thus, the topic names will generally have a one-to-one correspondence with the client devices. The following discussion covers some additional pub-sub relationships, such as one-to-M, M-to-one, and M-to-M. For this description, the following definitions can be applicable. A topic family is a set of topics, usually sharing some basic characteristics which are global to the family (e.g. a prefix). A topic-title is a string containing the name of the topic.

An M-to-one pub-sub service is a pub-sub service where the number of publishers for every topic is bounded by M and there is a single subscriber. A one-to-M service has a single published and the number of subscribers for that topic is bounded by M. An M-to-M service has up to M publishers and up to M subscribers for each topic. Generally, any publication to the topic by any publisher must be delivered to all subscribers.

A service is an implementation of a topic family that commonly involves sharing data structures and resources to implement the full family more efficiently. Sharing helps to mitigate per-topic overhead. Some services may even share data structures and resources with several topic families. Such implementations are more efficient by reducing the total overhead of the topic family, even though a single topic can often be implemented with less overhead without being in a topic family. For example, for a system-wide balanced tree, around $\log_L N$ hops are made traverse the routing graph through the server to the destination client device in a topic family. In contrast. a single one-to-M topic can be implemented using about $\log_L M$ hops, a much smaller number. In practice, however, $\log_L N$ is unlikely to exceed five or six, and so the introduced overhead is not very high. However, the advantage of scaling up the number of topics while controlling and bounding the used resources at participating devices can sometimes be substantial.

With these definitions, consider an implementation of a one-to-M pub-sub service where the server 1605 is a subscriber or a publisher and there are up to M corresponding publisher or subscriber device. Here, the server 1605 can be a representative of all subscribers so that every publication is first sent to the server 1605 (one-to-M pub-sub scenario with M publishers). Then the server 1605 can broadcast the publication to all subscribers (one-to-M pub-sub scenario with M subscribers).

Consider the computed routing (e.g., no routing table 1610 required) arrangement for the routing graph. A similar technique can enable all client devices of a one-to-M topic to connect to the same broker leaves by using Hg(H(topic-title),MaxNodes(h)) and Hg'(H(topic-title),MaxNodes(h)). This enables broker leaves serving a topic-title to be found using only the topic-title. Thus, it is now possible to extend the same broker tree data structure to support a family of one-to-M topics.

In a scenario with one publisher and M subscribers, three cases can be considered: a small M, a moderate M, and a large M. For a small number of subscribers (e.g., small M), if M is not larger than Lleav and the leaves are not already too busy serving other topics, then all M subscribers can connect to the leaves Hg(H(topic-title),MaxNodes(h)) and Hg'(H(topic-title),MaxNodes(h)) of the broker tree. In this case, to publish, the server 1605 can send messages to Hg(H(topic-title),MaxNodes(h)) or Hg'(H(topic-title),MaxNodes(h)), and these leaves can distribute the publication (e.g., publish message) to the subscribers of the topic. If collisions occur while the topic subscribers try to connect—e.g., either of the leaves do not have any resources left—the subscriber can use $H^2$, then $H^3$, etc., until it finds the appropriate leaves that are available for a connection. In general, all subsequent subscribers to the same topic-title will go through this process, attempting connections to the same leaves. Thus, subscribers joining this topic will all be connecting to the same few broker leaves, which makes the service implementation of that topic more efficient.

Every newly connected subscriber to the topic opens a new path to the server 1605 which the server 1605 uses, in the reverse direction, when publishing to that topic. If all subscribers listen on the same two leaves, for example, then all paths from server 1605 to subscribers entirely overlap. In this case, the server 1605 publications can use two paths only in the routing graph. Accordingly, minimal overhead is inflicted. However, additional latency can occur to traverse the paths to the leaves, which equals h−1 connection hops).

If collisions occur at some point or another, then the subscribers connect to different leaves of the routing graph. A way for the publication to keep account of all paths on which publications should be forwarded involves keeping a topic-routing-table (e.g., a topic-table) at every vertex (e.g., routing node in a corresponding routing pool) of the routing graph. The topic-table at a vertex can include topic-titles whose subscribers connect to leaves that are descendants of the vertex. For every topic-title, the topic-table can include a list of the child vertices to which publications on that topic are forwarded. At the leaves, the topic-table contains, for every topic-title, a list of the client devices connected to the leaf and are subscribed to the topic.

In an example, the tables in the vertices are populated when subscribers subscribe to the topic. The subscription information can be recorded in the path that begins with the subscriber propagates up through the leaves to the server 1605. As the subscription propagates up the routing graph, topic-tables at traversed vertices are updated to include the new subscription. If, at some point, the propagation meets a vertex whose table already contains the topic-title, then the propagation can stop because the tables in the rest of the path to the server 1605. Accordingly, populating the topic-tables generally involves very little overhead. For example, if no client device unsubscribes, the overhead it is bounded by O(1) updates per topic for every vertex. A similar process to update topic tables can be used when a client device unsubscribes to a topic. Here, a topic-title can be removed from a topic-table when there are no longer children that subscribe to the topic or when there are no longer children whose topic-tables contain the topic-title.

In an example, the topic-tables can be maintained by a routing node in a routing pool and replicated or backed up by devices in the routing pool. Here, the topic-table will be preserved if, for example, the routing node fails. When replicating, the topic-table modification processes can wait for acknowledgement that all replication has succeeded before considering the topic-table to be up-to-date.

The size of the topic-tables tends to grow the closer a vertex is to the root (e.g., server 1605). In a worst case, the size can be the global number of topic-titles times L, or times Lserv at the server 1605, or times Lleav at the leaves. However, the enroll process makes all subscribers of a specific topic-title follow a sequential process trying to connect at the same leaves. This ensures that, for a topic with relatively low number of subscribers (say, up to some constant times Lleav), the subscribers will be "dense" at few specific leaves. This causes the topic-tables to be compact and the publication process efficient.

In an example, when a topic is private—e.g., when publications must not be read by non-subscribed nodes—the published messages are encrypted. Thus, topic-routing-tables can be used for propagating encrypted publication messages after the respective decryption keys that are specific to the topic have been distributed to the subscribers.

If the number of subscribers is higher than what can be handled by a few leaves (e.g., moderate M), then it is ineffective to concentrate all subscriptions at specific leaves. In fact, attempting to enroll a large number of subscribers at few specific leaves is bound to congest (e.g., initiate many collisions at) these leaves, resulting in a poorly balanced load across the leaves. However, if the number is not too large, it is still beneficial to concentrate subscriptions at a single subtree of the server, attempting to preserve some of the associated benefits. Assume that M is known before the topic is implemented. Also note that it is possible to move dynamically between small and moderate Ms. With h, L, and Lleav known, the maximal number of subscribers connected to a server subtree is $L^{h-1}$*Lleav. Thus, whether a one-to-M topic can fit in a subtree depends on the following factors: existing and anticipated overhead from other topics on that subtree; the ratio of M to $L^{h-1}$*Lleav; and some slackness which is preserved due to uncertainty. To account for these factors, existing and anticipated load on subtrees can be monitored or calculated in advance.

If a single subtree is to implement a topic, then there are at least two alternatives for choosing the subtree: 1. the server 1605 centrally chooses the specific subtree for each topic to optimally balance the load of the topics among subtrees; or 2. a hash function is used. With respect to the first choice, a mechanism to notify subscribers of the topics for the specific trees chosen may be needed. For the second choice, a mechanism to resolve subtree overloading may be needed. Both of these needs can be efficiently met using the topic-tables to provide efficient multicasting of publications from the server 1605 to the subscribers. In an example, leaves in the subtree to which subscribers connect can be specified. This can be done by choosing from the vertices of the subtrees, either randomly or using a hash function on subscriber's ID and verifying that connected leaves in respective subtrees are not overloaded.

Once subscriptions go higher than a threshold—which depends on the height of the tree and the arities of the vertices within in it—collisions at all leaves of topic specific subtrees begins to destroy the balance of the routing graph. To address this issue, client device enrolment can continue either at random leaves or using hash functions on the IDs of the subscribers as described above. Here, the topic-tables, which would spread across all subtrees, will ensure that all subscribers will receive all publications. Publications sent from the server 1605 will still follow paths that are determined using the topic-tables, but random or hashed enrolment may result in a lower overlap of paths in the routing graph.

For a one subscriber and M publisher scenario, consider that the server 1605 is the only subscriber and there are up to M publishers for each topic. Here, there is little advantage coalesce publisher connections for the same topic on the same leaves or the same subtrees. However, suppose that all publishers for the same topic can connect to the same leaf. Now, the leaf can directly propagate publications for the topic to the subscriber, or perhaps even act on behalf. This can reduce latency of h−1 or h hops from publishers to subscriber.

Consider an M-to-M pub-sub topic with a small M that can be hosted by a single leaf broker. Here, directly connecting the leaf serving all subscribers to that which serves all publishers saves 2(h−1) hops in publication latency. This can also be implemented for larger M where all subscribers of one-to-M pub-sub service T connect to one subtree and all publishers of a M-to-one pub-sub service T' connect to another subtree. While, in general, leaf overload may prevent the installment of direct connections, it is often viable to maintain a few direct connections for especially important, intensive, or latency-sensitive message paths.

Such constructions can be more efficient when M subscribers and M publishers all use the same topic-title T. Here, all devices connect to the same leaves (in case 2M<L) or the same subtrees (in case M is not too large). Thus, direct connections for subtrees will not be used. If the server 1605 does not participate in the message passing, all publishers and subscribers can connect using paths fully contained in the hosting subtrees. Redundant connections create redundant paths which may be used in case of failure or congestion of the primary paths.

A subtree hosting a pub-sub service may be of any size. Thus, for example, the sub-tree can be smaller than those subtrees who are direct offspring of the server 1605. The hosting subtrees may even be leaves, depending on the value of M. Generally, the sub-tree size is based on a number of leaves to support 2M client device connections but not larger than that if possible because, the smaller the subtree, the shorter the paths.

In the case where a client device is also a routing node of the routing graph, the client device already has an open path of connections to the server 1605. Here, it is not efficient to open a new connection from that client device to a leaf. However, if the client device is a routing node and is registered for the topic in a computed routing graph, the server 1605 may be looking for that client device at specific leaves. For example, when the routing graph is full, the leaves supporting the topic are determined by Hg(H(topic-title),MaxNodes(h)) and Hg'(H(topic-title),MaxNodes(h)). Because the connection held by the client device is not at those leaves, if the server 1605 or other entity attempts to rout the message for the topic to one of these leaves, the client device will not receive the message.

To address this issue, the client device can notify the leaves that correspond to the topic the client device's subscription (e.g., client device ID, subscription, or location to those leaves where the server 1605 may be looking for it). Here, the topic specific leaves can register the location of that client device in case the server attempts 1605 to publish on the topic topic-title, in which case they notify the server 1605 the location of the client device. To avoid future redirections, the server can keep a cached routing table specifically for the subscribers that are also routing nodes.

If M is small, a similar treatment can be employed in the general pub-sub cases. If a routing node is a subscriber, the routing node can notify the leaves corresponding to the subscribed topic of the routing nodes ID, subscription, or location so that the server 1605 can cache this information in a dedicated routing table. For a large M, however, it can be more efficient to modify the topic-routing-tables so that publications are routed directly to routing nodes that are subscribers of the corresponding topics.

Figure 17:
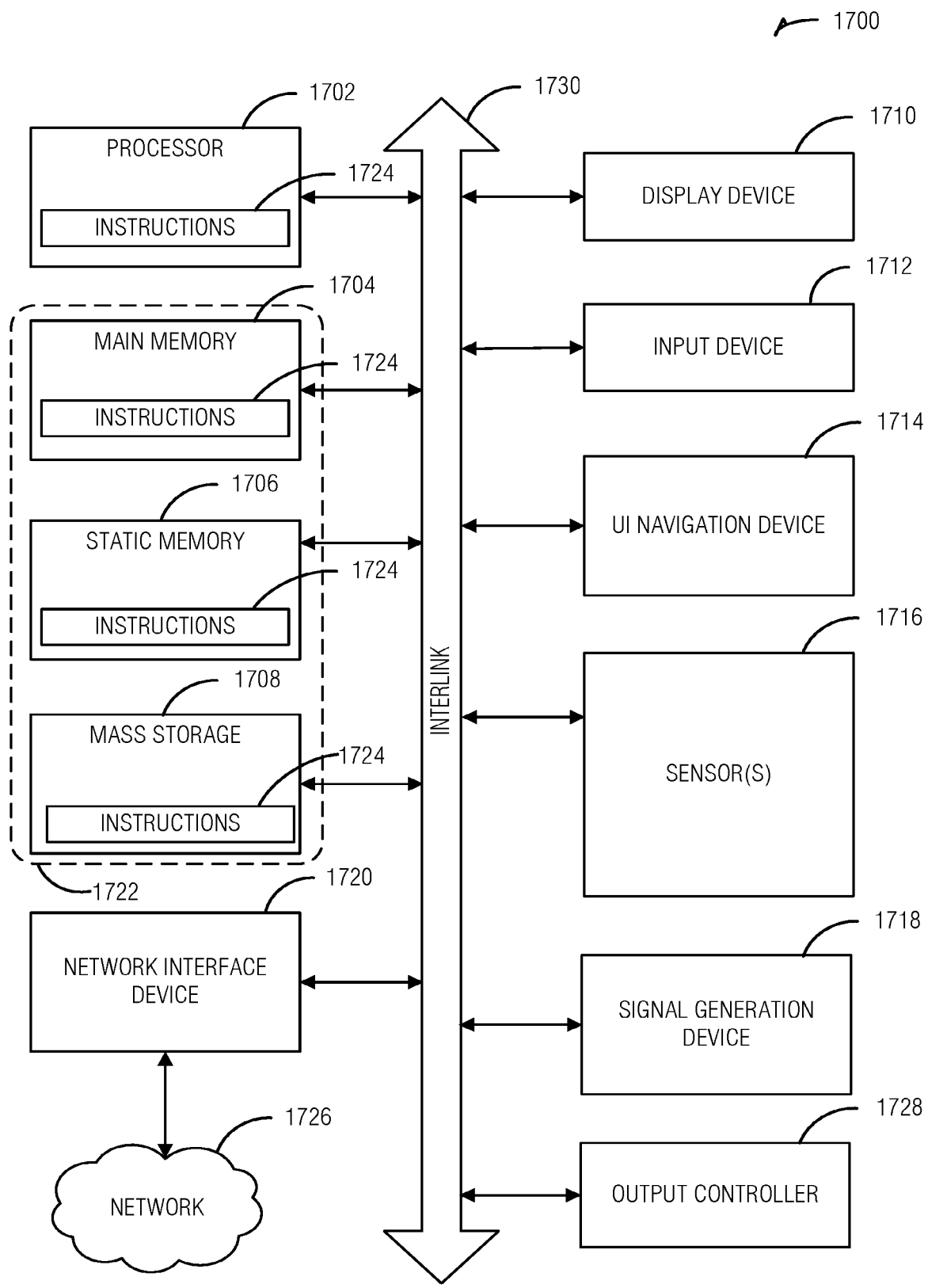
FIG. 17 is a block diagram illustrating an example of a machine upon which one or more embodiments may be implemented.

FIG. 17 illustrates a block diagram of an example machine 1700 upon which any one or more of the techniques (e.g., methodologies) discussed herein may perform. Examples, as described herein, may include, or may operate by, logic or a number of components, or mechanisms in the machine 1700. Circuitry (e.g., processing circuitry) is a collection of circuits implemented in tangible entities of the machine 1700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1700 follow.

In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1700 may include a hardware processor 1702 (e.g., a central processing unit (CPU), a graphics processing unit (GPU), a hardware processor core, or any combination thereof), a main memory 1704, a static memory (e.g., memory or storage for firmware, microcode, a basic-input-output (BIOS), unified extensible firmware interface (UEFI), etc.) 1706, and mass storage 1708 (e.g., hard drives, tape drives, flash storage, or other block devices) some or all of which may communicate with each other via an interlink (e.g., bus) 1730. The machine 1700 may further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1708, a signal generation device 1718 (e.g., a speaker), a network interface device 1720, and one or more sensors 1716, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1702, the main memory 1704, the static memory 1706, or the mass storage 1708 may be, or include, a machine readable medium 1722 on which is stored one or more sets of data structures or instructions 1724 (e.g., software) embodying or utilized by any one or more of the techniques or functions described herein. The instructions 1724 may also reside, completely or at least partially, within any of registers of the processor 1702, the main memory 1704, the static memory 1706, or the mass storage 1708 during execution thereof by the machine 1700. In an example, one or any combination of the hardware processor 1702, the main memory 1704, the static memory 1706, or the mass storage 1708 may constitute the machine readable media 1722. While the machine readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1722 may be representative of the instructions 1724, such as instructions 1724 themselves or a format from which the instructions 1724 may be derived. This format from which the instructions 1724 may be derived may include source code, encoded instructions (e.g., in compressed or encrypted form), packaged instructions (e.g., split into multiple packages), or the like. The information representative of the instructions 1724 in the machine readable medium 1722 may be processed by processing circuitry into the instructions to implement any of the operations discussed herein. For example, deriving the instructions 1724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1724.

In an example, the derivation of the instructions 1724 may include assembly, compilation, or interpretation of the information (e.g., by the processing circuitry) to create the instructions 1724 from some intermediate or preprocessed format provided by the machine readable medium 1722. The information, when provided in multiple parts, may be combined, unpacked, and modified to create the instructions 1724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1724 may be further transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1700, and includes digital or analog communications signals or other intangible medium to facilitate communication of such software. A transmission medium is a machine readable medium.

Additional Notes & Examples

Example 1 is a device for dynamic routing, the device performed by a node, the device wherein the operations comprise: a memory including instructions; and processing circuitry that, when in operation, is configured by the instructions to perform operations wherein the operations comprise: receiving, at a node, a distributed hash table (DHT) query for a routing pool, the query including a DHT identifier (ID) for the routing pool, the routing pool being a vertex in a routing graph, the routing pool including one or more nodes based on a distance between the DHT ID and respective DHT IDs of the nodes; and responding to the query with a result, the result corresponding to a network address for a routing node of the routing pool.

In Example 2, the subject matter of Example 1, wherein responding to the query includes determining whether the node is in the routing pool.

In Example 3, the subject matter of Example 2, wherein the node is in the routing pool, and wherein the result includes the address for the routing node taken from a local store of the node.

In Example 4, the subject matter of Example 3, wherein the node is the routing node for the routing pool, the node maintaining a parent connection and a set of child connections.

In Example 5, the subject matter of Example 4, wherein the operations comprise receiving an attachment request from a client device that initiated the query.

In Example 6, the subject matter of Example 5, wherein the operations comprise refusing the attachment request in response to a size of the set of child connections being beyond a threshold.

In Example 7, the subject matter of any of Examples 5-6, wherein the operations comprise adding the client device to the set of child connections.

In Example 8, the subject matter of Example 7, wherein the operations comprise notifying an organizer of the routing graph that the client device is attached to the node.

In Example 9, the subject matter of any of Examples 4-8, wherein the node was selected to be the routing node from the one or more nodes of the routing pool based on a performance metric.

In Example 10, the subject matter of Example 9, wherein the performance metric includes at least one of a connectivity metric, security metric, power consumption metric, compute metric, storage metric, or maximum open connections.

In Example 11, the subject matter of any of Examples 9-10, wherein the node was selected by the one or more nodes of the routing pool.

In Example 12, the subject matter of any of Examples 9-11, wherein the node was selected by an organizer of the routing graph.

In Example 13, the subject matter of any of Examples 4-12, wherein the operations comprise: receiving a notification that the node is selected as a routing node for another routing pool to which the node belongs; and responding to the notification with a rejection of the selection in response to a determination that performance of the routing node will degrade beyond a threshold.

In Example 14, the subject matter of any of Examples 2-13, wherein the node is not in the routing pool, and wherein the node maintains a local cache of nodes, the local cache including respective addresses and DHT IDs for nodes stored in the local cache.

In Example 15, the subject matter of Example 14, wherein the result includes a set of nodes from the local cache, the set of nodes selected based on a distance from the DHT ID in the query.

In Example 16, the subject matter of any of Examples 14-15, wherein the operations comprise: sorting nodes in the local cache based on distance to the DHT ID in the query; selecting a set of nodes from the local cache to minimize the distance to the DHT ID in the query; forwarding the query to the set of nodes; and extracting the routing node address from a response to the query from the set of nodes; and constructing the result to include the routing node address.

In Example 17, the subject matter of any of Examples 14-16, wherein the local cache is maintained via a DHT discovery procedure, the DHT discovery procedure including a local search for nodes in the routing pool, and a branch search for nodes in other routing pools corresponding to other vertices of the routing graph.

In Example 18, the subject matter of any of Examples 14-17, wherein the operations comprise continually checking to determine whether the routing node is operational.

In Example 19, the subject matter of Example 18, wherein continually checking to determine whether the routing node is operational includes a transfer of state from the routing node to the node, wherein the state includes data of a current operational state of routing activities on the routing node to enable recovery from the routing node in case of failure.

In Example 20, the subject matter of Example 19, wherein the state is subset of all of the current operational state of routing activities on the routing node.

In Example 21, the subject matter of any of Examples 18-20, wherein an organizer of the routing graph determined the subset transferred to the node.

In Example 22, the subject matter of Example 21, wherein a parent node of the routing node determined the subset transferred to the node.

In Example 23, the subject matter of any of Examples 18-22, wherein continually checking to determine whether the routing node is operational includes participating in a heartbeat confirmation with the routing node.

In Example 24, the subject matter of any of Examples 18-23, wherein the operations comprise initiating routing node recovery in response to a failure of the checking.

In Example 25, the subject matter of Example 24, wherein routing node recovery includes initiating an election procedure with other nodes in the routing pool.

In Example 26, the subject matter of any of Examples 24-25, wherein routing node recovery includes alerting an organizer of the routing graph that the routing node failed.

In Example 27, the subject matter of any of Examples 1-26, wherein the routing graph implements a tree in which client devices directly connect to routing nodes in routing pools that correspond to leaf vertices when the client devices attach to the routing graph.

In Example 28, the subject matter of Example 27, wherein routing nodes in routing pools that correspond to non-leaf routing pools route for other routing nodes.

In Example 29, the subject matter of any of Examples 27-28, wherein the root of the tree is a server node that does not belong to a routing pool.

In Example 30, the subject matter of Example 29, wherein the server node is an organizer of the routing graph, the organizer defining operating parameters of the routing graph.

In Example 31, the subject matter of any of Examples 29-30, wherein the operations comprise: receiving an expansion command from the organizer when the node is the routing node and the routing pool corresponds to a leaf vertex; dividing child connections into a number of additional routing pools as defined by the organizer; adding connections to additional routing nodes selected for the additional routing pools; and dropping the child connections to complete transition of the routing pool to a non-leaf vertex of the tree.

In Example 32, the subject matter of Example 31, wherein the operations comprise: receiving a contraction command from the organizer when the routing pool is a non-leaf vertex; notifying child routing node connections to terminate; and accept direct client device connections as child connections to transition the routing pool to a leaf vertex.

In Example 33, the subject matter of any of Examples 27-32, wherein the tree is a balanced tree, and wherein DHT IDs for routing pools are based on a row and column of a corresponding vertex in the tree.

In Example 34, the subject matter of Example 33, wherein the DHT ID is Key(J), where: Key(I,J)=DHTHash(ServiceKey+AtLeastMaximumTreeSize+J); J=routing pool index in a tree layer; ServiceKey=an identifier unique to a service enabled by the routing graph; and AtLeastMaximumTreeSize is a value that is greater than or equal to the number of devices in support by the tree.

In Example 35, the subject matter of Example 34, wherein the AtLeastMaximumTreeSize value is a ServiceSeed.

In Example 36, the subject matter of Example 35, wherein the service is a topic family.

In Example 37, the subject matter of Example 36, wherein the ServiceSeed differentiates between different providers of the topic family.

In Example 38, the subject matter of any of Examples 27-37, wherein the query is generated by a client device to attach to the routing node, the DHT ID selected randomly from DHT IDs of routing pools that correspond to leaf vertices of the tree.

In Example 39, the subject matter of any of Examples 1-38, wherein the routing graph corresponds to a set of services of a publish-and-subscribe (pub-sub) framework, and wherein DHT IDs are computed from topic names in the set of services.

In Example 40, the subject matter of Example 39, wherein the routing node services client nodes, and wherein the routing node serves as a broker for the pub-sub framework for clients serviced by the routing node.

In Example 41, the subject matter of Example 40, wherein the routing pool corresponds to topic names in the set of services, and wherein the client nodes attached to the routing node of the routing pool by virtue of a subscription to a topic name to which the routing pool corresponds.

In Example 42, the subject matter of any of Examples 40-41, wherein a repository of subscriptions for the routing pool is maintained, the subscriptions based on client device subscriptions.

In Example 43, the subject matter of Example 42, wherein the repository of subscriptions is maintained at an organizer of the routing graph.

In Example 44, the subject matter of any of Examples 40-43 wherein the operations comprise: receiving a publish message for a topic name; obtaining a route to a second broker node to which a subscribing device is possibly attached; and transmitting the publish message to the second broker node for delivery to the subscribing device.

In Example 45, the subject matter of Example 44, wherein the publish message originated from a client device, and wherein obtaining the route includes querying an organizer of the routing graph for a routing pool to which the subscribing device is attached; obtaining a second routing node for the routing pool to which the subscribing device is attached; and routing the publish message to the second routing node.

In Example 46, the subject matter of any of Examples 44-45, wherein obtaining the route includes calculating a routing pool DHT ID to which the subscribing device is attached from topic name specified in the publish message; locating a second routing node for the routing pool to which the subscribing device is attached using the calculated routing pool DHT ID; and routing the publish message to the second routing node.

In Example 47, the subject matter of Example 46, wherein locating the second routing node includes performing a DHT search for the second routing node using the calculated routing pool DHT ID.

In Example 48, the subject matter of any of Examples 46-47, wherein calculating the routing pool DHT ID to which the subscribing device is attached includes: calculating respective routing pool DHT IDs for the topic name using a set of hashes defined for the routing graph; obtaining respective routing nodes for routing pools with the respective routing pool DHT IDs; and routing the publish message to a respective routing node.

In Example 49, the subject matter of Example 48, wherein calculating the respective routing pool DHT IDs for the topic name using the set of hashes includes calculating, obtaining a route, and routing the publish message for each hash until a positive response to routing the publish message is received, refraining from calculating any additional results once the positive response is received.

In Example 50, the subject matter of any of Examples 40-49, wherein the operations comprise: receiving a publish message for a topic name from a client device; and transmitting the message to the organizer through the parent connection.

Example 51 is a method for dynamic routing, the method performed by a node, the method comprising: receiving, at a node, a distributed hash table (DHT) query for a routing pool, the query including a DHT identifier (ID) for the routing pool, the routing pool being a vertex in a routing graph, the routing pool including one or more nodes based on a distance between the DHT ID and respective DHT IDs of the nodes; and responding to the query with a result, the result corresponding to a network address for a routing node of the routing pool.

In Example 52, the subject matter of Example 51, wherein responding to the query includes determining whether the node is in the routing pool.

In Example 53, the subject matter of Example 52, wherein the node is in the routing pool, and wherein the result includes the address for the routing node taken from a local store of the node.

In Example 54, the subject matter of Example 53, wherein the node is the routing node for the routing pool, the node maintaining a parent connection and a set of child connections.

In Example 55, the subject matter of Example 54, comprising receiving an attachment request from a client device that initiated the query.

In Example 56, the subject matter of Example 55, comprising refusing the attachment request in response to a size of the set of child connections being beyond a threshold.

In Example 57, the subject matter of any of Examples 55-56, comprising adding the client device to the set of child connections.

In Example 58, the subject matter of Example 57, comprising notifying an organizer of the routing graph that the client device is attached to the node.

In Example 59, the subject matter of any of Examples 54-58, wherein the node was selected to be the routing node from the one or more nodes of the routing pool based on a performance metric.

In Example 60, the subject matter of Example 59, wherein the performance metric includes at least one of a connectivity metric, security metric, power consumption metric, compute metric, storage metric, or maximum open connections.

In Example 61, the subject matter of any of Examples 59-60, wherein the node was selected by the one or more nodes of the routing pool.

In Example 62, the subject matter of any of Examples 59-61, wherein the node was selected by an organizer of the routing graph.

In Example 63, the subject matter of any of Examples 54-62, comprising: receiving a notification that the node is selected as a routing node for another routing pool to which the node belongs; and responding to the notification with a rejection of the selection in response to a determination that performance of the routing node will degrade beyond a threshold.

In Example 64, the subject matter of any of Examples 52-63, wherein the node is not in the routing pool, and wherein the node maintains a local cache of nodes, the local cache including respective addresses and DHT IDs for nodes stored in the local cache.

In Example 65, the subject matter of Example 64, wherein the result includes a set of nodes from the local cache, the set of nodes selected based on a distance from the DHT ID in the query.

In Example 66, the subject matter of any of Examples 64-65, comprising: sorting nodes in the local cache based on distance to the DHT ID in the query; selecting a set of nodes from the local cache to minimize the distance to the DHT ID in the query; forwarding the query to the set of nodes; and extracting the routing node address from a response to the query from the set of nodes; and constructing the result to include the routing node address.

In Example 67, the subject matter of any of Examples 64-66, wherein the local cache is maintained via a DHT discovery procedure, the DHT discovery procedure including a local search for nodes in the routing pool, and a branch search for nodes in other routing pools corresponding to other vertices of the routing graph.

In Example 68, the subject matter of any of Examples 64-67, comprising continually checking to determine whether the routing node is operational.

In Example 69, the subject matter of Example 68, wherein continually checking to determine whether the routing node is operational includes a transfer of state from the routing node to the node, wherein the state includes data of a current operational state of routing activities on the routing node to enable recovery from the routing node in case of failure.

In Example 70, the subject matter of Example 69, wherein the state is subset of all of the current operational state of routing activities on the routing node.

In Example 71, the subject matter of any of Examples 68-70, wherein an organizer of the routing graph determined the subset transferred to the node.

In Example 72, the subject matter of Example 71, wherein a parent node of the routing node determined the subset transferred to the node.

In Example 73, the subject matter of any of Examples 68-72, wherein continually checking to determine whether the routing node is operational includes participating in a heartbeat confirmation with the routing node.

In Example 74, the subject matter of any of Examples 68-73, comprising initiating routing node recovery in response to a failure of the checking.

In Example 75, the subject matter of Example 74, wherein routing node recovery includes initiating an election procedure with other nodes in the routing pool.

In Example 76, the subject matter of any of Examples 74-75, wherein routing node recovery includes alerting an organizer of the routing graph that the routing node failed.

In Example 77, the subject matter of any of Examples 51-76, wherein the routing graph implements a tree in which client devices directly connect to routing nodes in routing pools that correspond to leaf vertices when the client devices attach to the routing graph.

In Example 78, the subject matter of Example 77, wherein routing nodes in routing pools that correspond to non-leaf routing pools route for other routing nodes.

In Example 79, the subject matter of any of Examples 77-78, wherein the root of the tree is a server node that does not belong to a routing pool.

In Example 80, the subject matter of Example 79, wherein the server node is an organizer of the routing graph, the organizer defining operating parameters of the routing graph.

In Example 81, the subject matter of any of Examples 79-80, comprising: receiving an expansion command from the organizer when the node is the routing node and the routing pool corresponds to a leaf vertex; dividing child connections into a number of additional routing pools as defined by the organizer; adding connections to additional routing nodes selected for the additional routing pools; and dropping the child connections to complete transition of the routing pool to a non-leaf vertex of the tree.

In Example 82, the subject matter of Example 81, comprising: receiving a contraction command from the organizer when the routing pool is a non-leaf vertex; notifying child routing node connections to terminate; and accept direct client device connections as child connections to transition the routing pool to a leaf vertex.

In Example 83, the subject matter of any of Examples 77-82, wherein the tree is a balanced tree, and wherein DHT IDs for routing pools are based on a row and column of a corresponding vertex in the tree.

In Example 84, the subject matter of Example 83, wherein the DHT ID is Key(J), where: Key(J)=DHTHash(ServiceKey+AtLeastMaximumTreeSize+J); J=routing pool index in a tree layer; ServiceKey=an identifier unique to a service enabled by the routing graph; and AtLeastMaximumTreeSize is a value that is greater than or equal to the number of devices in support by the tree.

In Example 85, the subject matter of Example 84, wherein the AtLeastMaximumTreeSize value is a ServiceSeed.

In Example 86, the subject matter of Example 85, wherein the service is a topic family.

In Example 87, the subject matter of Example 86, wherein the ServiceSeed differentiates between different providers of the topic family.

In Example 88, the subject matter of any of Examples 77-87, wherein the query is generated by a client device to attach to the routing node, the DHT ID selected randomly from DHT IDs of routing pools that correspond to leaf vertices of the tree.

In Example 89, the subject matter of any of Examples 51-88, wherein the routing graph corresponds to a set of services of a publish-and-subscribe (pub-sub) framework, and wherein DHT IDs are computed from topic names in the set of services.

In Example 90, the subject matter of Example 89, wherein the routing node services client nodes, and wherein the routing node serves as a broker for the pub-sub framework for clients serviced by the routing node.

In Example 91, the subject matter of Example 90, wherein the routing pool corresponds to topic names in the set of services, and wherein the client nodes attached to the routing node of the routing pool by virtue of a subscription to a topic name to which the routing pool corresponds.

In Example 92, the subject matter of any of Examples 90-91, wherein a repository of subscriptions for the routing pool is maintained, the subscriptions based on client device subscriptions.

In Example 93, the subject matter of Example 92, wherein the repository of subscriptions is maintained at an organizer of the routing graph.

In Example 94, the subject matter of any of Examples 90-93 comprising: receiving a publish message for a topic name; obtaining a route to a second broker node to which a subscribing device is possibly attached; and transmitting the publish message to the second broker node for delivery to the subscribing device.

In Example 95, the subject matter of Example 94, wherein the publish message originated from a client device, and wherein obtaining the route includes querying an organizer of the routing graph for a routing pool to which the subscribing device is attached; obtaining a second routing node for the routing pool to which the subscribing device is attached; and routing the publish message to the second routing node.

In Example 96, the subject matter of any of Examples 94-95, wherein obtaining the route includes calculating a routing pool DHT ID to which the subscribing device is attached from topic name specified in the publish message; locating a second routing node for the routing pool to which the subscribing device is attached using the calculated routing pool DHT ID; and routing the publish message to the second routing node.

In Example 97, the subject matter of Example 96, wherein locating the second routing node includes performing a DHT search for the second routing node using the calculated routing pool DHT ID.

In Example 98, the subject matter of any of Examples 96-97, wherein calculating the routing pool DHT ID to which the subscribing device is attached includes: calculating respective routing pool DHT IDs for the topic name using a set of hashes defined for the routing graph; obtaining respective routing nodes for routing pools with the respective routing pool DHT IDs; and routing the publish message to a respective routing node.

In Example 99, the subject matter of Example 98, wherein calculating the respective routing pool DHT IDs for the topic name using the set of hashes includes calculating, obtaining a route, and routing the publish message for each hash until a positive response to routing the publish message is received, refraining from calculating any additional results once the positive response is received.

In Example 100, the subject matter of any of Examples 90-99, comprising: receiving a publish message for a topic name from a client device; and transmitting the message to the organizer through the parent connection.

Example 101 is a machine-readable medium including instructions for dynamic routing, the machine-readable medium performed by a node, the instructions, when executed by processing circuitry, cause the processing circuitry to perform operations comprising: receiving, at a node, a distributed hash table (DHT) query for a routing pool, the query including a DHT identifier (ID) for the routing pool, the routing pool being a vertex in a routing graph, the routing pool including one or more nodes based on a distance between the DHT ID and respective DHT IDs of the nodes; and responding to the query with a result, the result corresponding to a network address for a routing node of the routing pool.

In Example 102, the subject matter of Example 101, wherein responding to the query includes determining whether the node is in the routing pool.

In Example 103, the subject matter of Example 102, wherein the node is in the routing pool, and wherein the result includes the address for the routing node taken from a local store of the node.

In Example 104, the subject matter of Example 103, wherein the node is the routing node for the routing pool, the node maintaining a parent connection and a set of child connections.

In Example 105, the subject matter of Example 104, wherein the operations comprise receiving an attachment request from a client device that initiated the query.

In Example 106, the subject matter of Example 105, wherein the operations comprise refusing the attachment request in response to a size of the set of child connections being beyond a threshold.

In Example 107, the subject matter of any of Examples 105-106, wherein the operations comprise adding the client device to the set of child connections.

In Example 108, the subject matter of Example 107, wherein the operations comprise notifying an organizer of the routing graph that the client device is attached to the node.

In Example 109, the subject matter of any of Examples 104-108, wherein the node was selected to be the routing node from the one or more nodes of the routing pool based on a performance metric.

In Example 110, the subject matter of Example 109, wherein the performance metric includes at least one of a connectivity metric, security metric, power consumption metric, compute metric, storage metric, or maximum open connections.

In Example 111, the subject matter of any of Examples 109-110, wherein the node was selected by the one or more nodes of the routing pool.

In Example 112, the subject matter of any of Examples 109-111, wherein the node was selected by an organizer of the routing graph.

In Example 113, the subject matter of any of Examples 104-112, wherein the operations comprise: receiving a notification that the node is selected as a routing node for another routing pool to which the node belongs; and responding to the notification with a rejection of the selection in response to a determination that performance of the routing node will degrade beyond a threshold.

In Example 114, the subject matter of any of Examples 102-113, wherein the node is not in the routing pool, and wherein the node maintains a local cache of nodes, the local cache including respective addresses and DHT IDs for nodes stored in the local cache.

In Example 115, the subject matter of Example 114, wherein the result includes a set of nodes from the local cache, the set of nodes selected based on a distance from the DHT ID in the query.

In Example 116, the subject matter of any of Examples 114-115, wherein the operations comprise: sorting nodes in the local cache based on distance to the DHT ID in the query; selecting a set of nodes from the local cache to minimize the distance to the DHT ID in the query; forwarding the query to the set of nodes; and extracting the routing node address from a response to the query from the set of nodes; and constructing the result to include the routing node address.

In Example 117, the subject matter of any of Examples 114-116, wherein the local cache is maintained via a DHT discovery procedure, the DHT discovery procedure including a local search for nodes in the routing pool, and a branch search for nodes in other routing pools corresponding to other vertices of the routing graph.

In Example 118, the subject matter of any of Examples 114-117, wherein the operations comprise continually checking to determine whether the routing node is operational.

In Example 119, the subject matter of Example 118, wherein continually checking to determine whether the routing node is operational includes a transfer of state from the routing node to the node, wherein the state includes data of a current operational state of routing activities on the routing node to enable recovery from the routing node in case of failure.

In Example 120, the subject matter of Example 119, wherein the state is subset of all of the current operational state of routing activities on the routing node.

In Example 121, the subject matter of any of Examples 118-120, wherein an organizer of the routing graph determined the subset transferred to the node.

In Example 122, the subject matter of Example 121, wherein a parent node of the routing node determined the subset transferred to the node.

In Example 123, the subject matter of any of Examples 118-122, wherein continually checking to determine whether the routing node is operational includes participating in a heartbeat confirmation with the routing node.

In Example 124, the subject matter of any of Examples 118-123, wherein the operations comprise initiating routing node recovery in response to a failure of the checking.

In Example 125, the subject matter of Example 124, wherein routing node recovery includes initiating an election procedure with other nodes in the routing pool.

In Example 126, the subject matter of any of Examples 124-125, wherein routing node recovery includes alerting an organizer of the routing graph that the routing node failed.

In Example 127, the subject matter of any of Examples 101-126, wherein the routing graph implements a tree in which client devices directly connect to routing nodes in routing pools that correspond to leaf vertices when the client devices attach to the routing graph.

In Example 128, the subject matter of Example 127, wherein routing nodes in routing pools that correspond to non-leaf routing pools route for other routing nodes.

In Example 129, the subject matter of any of Examples 127-128, wherein the root of the tree is a server node that does not belong to a routing pool.

In Example 130, the subject matter of Example 129, wherein the server node is an organizer of the routing graph, the organizer defining operating parameters of the routing graph.

In Example 131, the subject matter of any of Examples 129-130, wherein the operations comprise: receiving an expansion command from the organizer when the node is the routing node and the routing pool corresponds to a leaf vertex; dividing child connections into a number of additional routing pools as defined by the organizer; adding connections to additional routing nodes selected for the additional routing pools; and dropping the child connections to complete transition of the routing pool to a non-leaf vertex of the tree.

In Example 132, the subject matter of Example 131, wherein the operations comprise: receiving a contraction command from the organizer when the routing pool is a non-leaf vertex; notifying child routing node connections to terminate; and accept direct client device connections as child connections to transition the routing pool to a leaf vertex.

In Example 133, the subject matter of any of Examples 127-132, wherein the tree is a balanced tree, and wherein DHT IDs for routing pools are based on a row and column of a corresponding vertex in the tree.

In Example 134, the subject matter of Example 133, wherein the DHT ID is Key(J), where: Key(J)=DHTHash (ServiceKey+AtLeastMaximumTreeSize+J); J=routing pool index in a tree layer; ServiceKey=an identifier unique to a service enabled by the routing graph; and AtLeastMaximumTreeSize is a value that is greater than or equal to the number of devices in support by the tree.

In Example 135, the subject matter of Example 134, wherein the AtLeastMaximumTreeSize value is a Service Seed.

In Example 136, the subject matter of Example 135, wherein the service is a topic family.

In Example 137, the subject matter of Example 136, wherein the ServiceSeed differentiates between different providers of the topic family.

In Example 138, the subject matter of any of Examples 127-137, wherein the query is generated by a client device to attach to the routing node, the DHT ID selected randomly from DHT IDs of routing pools that correspond to leaf vertices of the tree.

In Example 139, the subject matter of any of Examples 101-138, wherein the routing graph corresponds to a set of services of a publish-and-subscribe (pub-sub) framework, and wherein DHT IDs are computed from topic names in the set of services.

In Example 140, the subject matter of Example 139, wherein the routing node services client nodes, and wherein the routing node serves as a broker for the pub-sub framework for clients serviced by the routing node.

In Example 141, the subject matter of Example 140, wherein the routing pool corresponds to topic names in the set of services, and wherein the client nodes attached to the routing node of the routing pool by virtue of a subscription to a topic name to which the routing pool corresponds.

In Example 142, the subject matter of any of Examples 140-141, wherein a repository of subscriptions for the routing pool is maintained, the subscriptions based on client device subscriptions.

In Example 143, the subject matter of Example 142, wherein the repository of subscriptions is maintained at an organizer of the routing graph.

In Example 144, the subject matter of any of Examples 140-143 wherein the operations comprise: receiving a publish message for a topic name; obtaining a route to a second broker node to which a subscribing device is possibly attached; and transmitting the publish message to the second broker node for delivery to the subscribing device.

In Example 145, the subject matter of Example 144, wherein the publish message originated from a client device, and wherein obtaining the route includes querying an organizer of the routing graph for a routing pool to which the subscribing device is attached; obtaining a second routing node for the routing pool to which the subscribing device is attached; and routing the publish message to the second routing node.

In Example 146, the subject matter of any of Examples 144-145, wherein obtaining the route includes calculating a routing pool DHT ID to which the subscribing device is attached from topic name specified in the publish message; locating a second routing node for the routing pool to which the subscribing device is attached using the calculated routing pool DHT ID; and routing the publish message to the second routing node.

In Example 147, the subject matter of Example 146, wherein locating the second routing node includes performing a DHT search for the second routing node using the calculated routing pool DHT ID.

In Example 148, the subject matter of any of Examples 146-147, wherein calculating the routing pool DHT ID to which the subscribing device is attached includes: calculating respective routing pool DHT IDs for the topic name using a set of hashes defined for the routing graph; obtaining respective routing nodes for routing pools with the respective routing pool DHT IDs; and routing the publish message to a respective routing node.

In Example 149, the subject matter of Example 148, wherein calculating the respective routing pool DHT IDs for the topic name using the set of hashes includes calculating, obtaining a route, and routing the publish message for each hash until a positive response to routing the publish message is received, refraining from calculating any additional results once the positive response is received.

In Example 150, the subject matter of any of Examples 140-149, wherein the operations comprise: receiving a publish message for a topic name from a client device; and transmitting the message to the organizer through the parent connection.

Example 151 is a client device to attach to a dynamic routing network, the client device comprising: a memory including instructions; and processing circuitry that, when in operation, is configured by the instructions to perform operations comprising: obtaining operating parameters of a routing graph; calculating, using the operating parameters, a DHT identifier (ID) for a vertex of the routing graph, the vertex being a routing pool containing one or more nodes; performing a DHT search for the DHT ID to locate a node in the routing pool to return an address for a routing node of the routing pool; and attaching to the routing node.

In Example 152, the subject matter of Example 151, wherein obtaining the parameters of the routing graph includes querying an organizer of the routing graph for the parameters.

In Example 153, the subject matter of any of Examples 151-152, wherein the routing graph is organized as a balanced tree, wherein client devices attach to routing nodes in routing pools that correspond to leaf vertices of the tree, wherein the parameters of the routing graph include a height of the tree, and wherein the height of the tree is used to calculate DHT IDs for leaf vertices of the tree.

In Example 154, the subject matter of Example 153, wherein calculating the DHT ID includes randomly selecting a leaf vertex, and wherein attaching to the routing node includes notifying the organizer to which routing pool the client device attached.

In Example 155, the subject matter of any of Examples 153-154, wherein the routing graph corresponds to a set of services in a publish-and-subscribe (pub-sub) framework, wherein topic names within the set of services are transformed into DHT IDs, wherein the client device has a DHT ID computed from a topic name to which the client device will subscribe, and wherein calculating the DHT ID includes selecting a routing pool with a DHT ID that is closest to the client device DHT ID.

In Example 156, the subject matter of any of Examples 151-155, wherein the operations comprise: calculating a second DHT ID for a second routing pool; searching the routing graph for a node in a second routing pool that corresponds to the second DHT ID; receiving a second routing node address in response to the searching; and attaching to the second routing node.

In Example 157, the subject matter of Example 156, wherein calculating the second DHT ID includes: establishing a first path from the client device to a destination device through the first routing node; establishing a second path from the client device to the destination device through a prospective routing node in a prospective routing pool corresponding to a prospective DHT ID;

and selecting the prospective DHT ID as the second DHT ID when the first path does not overlap with the second path.

In Example 158, the subject matter of any of Examples 151-157, wherein the operations comprise subscribing to a second topic name, including: computing a second client device DHT ID for itself from the second topic name; and attaching to a second routing pool with a DHT ID that is closest to the second client device DHT ID.

Example 159 is a method to attach to a dynamic routing network, the method performed by a client device, the method comprising: obtaining operating parameters of a routing graph; calculating, using the operating parameters, a DHT identifier (ID) for a vertex of the routing graph, the vertex being a routing pool containing one or more nodes; performing a DHT search for the DHT ID to locate a node in the routing pool to return an address for a routing node of the routing pool; and attaching to the routing node.

In Example 160, the subject matter of Example 159, wherein obtaining the parameters of the routing graph includes querying an organizer of the routing graph for the parameters.

In Example 161, the subject matter of any of Examples 159-160, wherein the routing graph is organized as a balanced tree, wherein client devices attach to routing nodes in routing pools that correspond to leaf vertices of the tree, wherein the parameters of the routing graph include a height of the tree, and wherein the height of the tree is used to calculate DHT IDs for leaf vertices of the tree.

In Example 162, the subject matter of Example 161, wherein calculating the DHT ID includes randomly selecting a leaf vertex, and wherein attaching to the routing node includes notifying the organizer to which routing pool the client device attached.

In Example 163, the subject matter of any of Examples 161-162, wherein the routing graph corresponds to a set of services in a publish-and-subscribe (pub-sub) framework, wherein topic names within the set of services are transformed into DHT IDs, wherein the client device has a DHT ID computed from a topic name to which the client device will subscribe, and wherein calculating the DHT ID includes selecting a routing pool with a DHT ID that is closest to the client device DHT ID.

In Example 164, the subject matter of any of Examples 159-163, comprising: calculating a second DHT ID for a second routing pool; searching the routing graph for a node in a second routing pool that corresponds to the second DHT ID; receiving a second routing node address in response to the searching; and attaching to the second routing node.

In Example 165, the subject matter of Example 164, wherein calculating the second DHT ID includes: establishing a first path from the client device to a destination device through the first routing node; establishing a second path from the client device to the destination device through a prospective routing node in a prospective routing pool corresponding to a prospective DHT ID; and selecting the prospective DHT ID as the second DHT ID when the first path does not overlap with the second path.

In Example 166, the subject matter of any of Examples 159-165, comprising subscribing to a second topic name, including: computing a second client device DHT ID for itself from the second topic name; and attaching to a second routing pool with a DHT ID that is closest to the second client device DHT ID.

Example 167 is a machine-readable medium including instructions for a client device to attach to a dynamic routing network, the instructions, when executed by processing circuitry, cause the processing circuitry to perform operations comprising: obtaining operating parameters of a routing graph; calculating, using the operating parameters, a DHT identifier (ID) for a vertex of the routing graph, the vertex being a routing pool containing one or more nodes; performing a DHT search for the DHT ID to locate a node in the routing pool to return an address for a routing node of the routing pool; and attaching to the routing node.

In Example 168, the subject matter of Example 167, wherein obtaining the parameters of the routing graph includes querying an organizer of the routing graph for the parameters.

In Example 169, the subject matter of any of Examples 167-168, wherein the routing graph is organized as a balanced tree, wherein client devices attach to routing nodes in routing pools that correspond to leaf vertices of the tree, wherein the parameters of the routing graph include a height of the tree, and wherein the height of the tree is used to calculate DHT IDs for leaf vertices of the tree.

In Example 170, the subject matter of Example 169, wherein calculating the DHT ID includes randomly selecting a leaf vertex, and wherein attaching to the routing node includes notifying the organizer to which routing pool the client device attached.

In Example 171, the subject matter of any of Examples 169-170, wherein the routing graph corresponds to a set of services in a publish-and-subscribe (pub-sub) framework, wherein topic names within the set of services are transformed into DHT IDs, wherein the client device has a DHT ID computed from a topic name to which the client device will subscribe, and wherein calculating the DHT ID includes selecting a routing pool with a DHT ID that is closest to the client device DHT ID.

In Example 172, the subject matter of any of Examples 167-171, wherein the operations comprise: calculating a second DHT ID for a second routing pool; searching the routing graph for a node in a second routing pool that corresponds to the second DHT ID; receiving a second routing node address in response to the searching; and attaching to the second routing node.

In Example 173, the subject matter of Example 172, wherein calculating the second DHT ID includes: establishing a first path from the client device to a destination device through the first routing node; establishing a second path from the client device to the destination device through a prospective routing node in a prospective routing pool corresponding to a prospective DHT ID; and selecting the prospective DHT ID as the second DHT ID when the first path does not overlap with the second path.

In Example 174, the subject matter of any of Examples 167-173, wherein the operations comprise subscribing to a second topic name, including: computing a second client device DHT ID for itself from the second topic name; and attaching to a second routing pool with a DHT ID that is closest to the second client device DHT ID.

Example 175 is a server to organize dynamic routing network by a server, the server comprising: a memory including instructions; and processing circuitry that, when in operation, is configured by the instructions to perform operations comprising: defining a number of routing pools based on a number of devices, each routing pool including a distributed hash table (DHT) identifier (ID); allocating devices into the routing pools based on a distance of DHT IDs of the attached devices and respective DHT IDs of the routing pools until a cardinality parameter of the routing pools is met; and maintaining connections to routing nodes in the routing pools, at least one of which is in each of the routing pools.

In Example 176, the subject matter of Example 175, wherein the operations comprise causing the devices to be notified as to which routing pool the attached devices are allocated.

In Example 177, the subject matter of any of Examples 175-176, wherein the operations comprise selecting an attached device in a routing pool to be the routing node for the routing pool.

In Example 178, the subject matter of any of Examples 175-177, wherein the operations comprise: obtaining information that an increase in attached devices is approaching a threshold; defining new routing pools to maintain a maximum open connection metric; promulgating new routing pool affiliations of devices to the devices; opening connections to new routing nodes in the new routing pools; and dropping connections to the routing nodes in the routing pools.

In Example 179, the subject matter of any of Examples 175-178, wherein the operations comprise maintaining a repository of publish-subscribe (pub-sub) subscriptions of client devices attaching to the routing graph.

In Example 180, the subject matter of Example 179, wherein maintaining the repository of pub-sub subscriptions includes receiving notification of a subscription from a client device.

In Example 181, the subject matter of any of Examples 179-180, wherein the operations comprise: receiving a publication message to a topic name; and routing the publication message to subscribed client devices.

In Example 182, the subject matter of Example 181, wherein the operations comprise maintaining a route to the client devices that is used to route the publication message to the subscribed client devices.

In Example 183, the subject matter of Example 182, wherein maintaining the route includes maintaining only a DHT ID of a routing pool to which the client device is attached.

In Example 184, the subject matter of Example 183, wherein the operations comprise: receiving the DHT ID of the routing pool to which the client device is attached in response to the client device attaching to a routing node of the routing pool.

In Example 185, the subject matter of any of Examples 181-184, wherein routing the publication message to the subscribed client devices includes: calculating a routing pool DHT ID from the topic name; and routing the publication message to a routing node that corresponds to the routing pool of the routing pool DHT ID.

In Example 186, the subject matter of any of Examples 175-185, wherein the operations comprise continually checking to determine whether the routing node is operational.

In Example 187, the subject matter of Example 186, wherein continually checking to determine whether the routing node is operational includes a transfer of state from the routing node, wherein the state includes data of a current operational state of routing activities on the routing node to enable recovery from the routing node in case of failure.

In Example 188, the subject matter of Example 187, wherein the state is subset of all of the current operation state of routing activities on the routing node.

In Example 189, the subject matter of any of Examples 186-188, wherein continually checking to determine whether the routing node is operational includes participating in a heartbeat confirmation with the routing node.

In Example 190, the subject matter of any of Examples 175-189, wherein the operations comprise assigning one or more nodes in a routing pool to continually check to determine whether the routing node is operational.

In Example 191, the subject matter of any of Examples 175-190, wherein the operations comprise assigning one or more nodes in a routing pool to maintain a copy of routing state for the routing node.

Example 192 is a method to organize dynamic routing network, the method performed by a server, the method comprising: defining a number of routing pools based on a number of devices, each routing pool including a distributed hash table (DHT) identifier (ID); allocating devices into the routing pools based on a distance of DHT IDs of the attached devices and respective DHT IDs of the routing pools until a cardinality parameter of the routing pools is met; and maintaining connections to routing nodes in the routing pools, at least one of which is in each of the routing pools.

In Example 193, the subject matter of Example 192, comprising causing the devices to be notified as to which routing pool the attached devices are allocated.

In Example 194, the subject matter of any of Examples 192-193, comprising selecting an attached device in a routing pool to be the routing node for the routing pool.

In Example 195, the subject matter of any of Examples 192-194, comprising: obtaining information that an increase in attached devices is approaching a threshold; defining new routing pools to maintain a maximum open connection metric; promulgating new routing pool affiliations of devices to the devices; opening connections to new routing nodes in the new routing pools; and dropping connections to the routing nodes in the routing pools.

In Example 196, the subject matter of any of Examples 192-195, comprising maintaining a repository of publish-subscribe (pub-sub) subscriptions of client devices attaching to the routing graph.

In Example 197, the subject matter of Example 196, wherein maintaining the repository of pub-sub subscriptions includes receiving notification of a subscription from a client device.

In Example 198, the subject matter of any of Examples 196-197, comprising: receiving a publication message to a topic name; and routing the publication message to subscribed client devices.

In Example 199, the subject matter of Example 198, comprising maintaining a route to the client devices that is used to route the publication message to the subscribed client devices.

In Example 200, the subject matter of Example 199, wherein maintaining the route includes maintaining only a DHT ID of a routing pool to which the client device is attached.

In Example 201, the subject matter of Example 200, comprising: receiving the DHT ID of the routing pool to which the client device is attached in response to the client device attaching to a routing node of the routing pool.

In Example 202, the subject matter of any of Examples 198-201, wherein routing the publication message to the subscribed client devices includes: calculating a routing pool DHT ID from the topic name; and routing the publication message to a routing node that corresponds to the routing pool of the routing pool DHT ID.

In Example 203, the subject matter of any of Examples 192-202, comprising continually checking to determine whether the routing node is operational.

In Example 204, the subject matter of Example 203, wherein continually checking to determine whether the routing node is operational includes a transfer of state from the routing node, wherein the state includes data of a current operational state of routing activities on the routing node to enable recovery from the routing node in case of failure.

In Example 205, the subject matter of Example 204, wherein the state is subset of all of the current operation state of routing activities on the routing node.

In Example 206, the subject matter of any of Examples 203-205, wherein continually checking to determine whether the routing node is operational includes participating in a heartbeat confirmation with the routing node.

In Example 207, the subject matter of any of Examples 192-206, comprising assigning one or more nodes in a routing pool to continually check to determine whether the routing node is operational.

In Example 208, the subject matter of any of Examples 192-207, comprising assigning one or more nodes in a routing pool to maintain a copy of routing state for the routing node.

Example 209 is a machine-readable medium including instructions to organize dynamic routing network by a server, the instructions, when executed by processing circuitry, cause the processing circuitry to perform operations comprising: defining a number of routing pools based on a number of devices, each routing pool including a distributed hash table (DHT) identifier (ID); allocating devices into the routing pools based on a distance of DHT IDs of the attached devices and respective DHT IDs of the routing pools until a cardinality parameter of the routing pools is met; and maintaining connections to routing nodes in the routing pools, at least one of which is in each of the routing pools.

In Example 210, the subject matter of Example 209, wherein the operations comprise causing the devices to be notified as to which routing pool the attached devices are allocated.

In Example 211, the subject matter of any of Examples 209-210, wherein the operations comprise selecting an attached device in a routing pool to be the routing node for the routing pool.

In Example 212, the subject matter of any of Examples 209-211, wherein the operations comprise: obtaining information that an increase in attached devices is approaching a threshold; defining new routing pools to maintain a maximum open connection metric; promulgating new routing pool affiliations of devices to the devices; opening connections to new routing nodes in the new routing pools; and dropping connections to the routing nodes in the routing pools.

In Example 213, the subject matter of any of Examples 209-212, wherein the operations comprise maintaining a repository of publish-subscribe (pub-sub) subscriptions of client devices attaching to the routing graph.

In Example 214, the subject matter of Example 213, wherein maintaining the repository of pub-sub subscriptions includes receiving notification of a subscription from a client device.

In Example 215, the subject matter of any of Examples 213-214, wherein the operations comprise: receiving a publication message to a topic name; and routing the publication message to subscribed client devices.

In Example 216, the subject matter of Example 215, wherein the operations comprise maintaining a route to the client devices that is used to route the publication message to the subscribed client devices.

In Example 217, the subject matter of Example 216, wherein maintaining the route includes maintaining only a DHT ID of a routing pool to which the client device is attached.

In Example 218, the subject matter of Example 217, wherein the operations comprise: receiving the DHT ID of the routing pool to which the client device is attached in response to the client device attaching to a routing node of the routing pool.

In Example 219, the subject matter of any of Examples 215-218, wherein routing the publication message to the subscribed client devices includes: calculating a routing pool DHT ID from the topic name; and routing the publication message to a routing node that corresponds to the routing pool of the routing pool DHT ID.

In Example 220, the subject matter of any of Examples 209-219, wherein the operations comprise continually checking to determine whether the routing node is operational.

In Example 221, the subject matter of Example 220, wherein continually checking to determine whether the routing node is operational includes a transfer of state from the routing node, wherein the state includes data of a current operational state of routing activities on the routing node to enable recovery from the routing node in case of failure.

In Example 222, the subject matter of Example 221, wherein the state is subset of all of the current operation state of routing activities on the routing node.

In Example 223, the subject matter of any of Examples 220-222, wherein continually checking to determine whether the routing node is operational includes participating in a heartbeat confirmation with the routing node.

In Example 224, the subject matter of any of Examples 209-223, wherein the operations comprise assigning one or more nodes in a routing pool to continually check to determine whether the routing node is operational.

In Example 225, the subject matter of any of Examples 209-224, wherein the operations comprise assigning one or more nodes in a routing pool to maintain a copy of routing state for the routing node.

Example 226 is a device for routing in a publish-subscribe (pub-sub) network, the device comprising: a memory including instructions; and processing circuitry that, when in operation, is configured by the instructions to perform operations comprising: creating an overlay to the pub-sub network, the overlay having a structure in which child connections to a node are limited by a threshold; and defining a set of nodes in the overlay as connection nodes, a connection node including a device that hosts a nano-broker for the pub-sub network to which client devices may attach, the nano-broker servicing less than all topics in the pub-sub network, the connection nodes directly calculable by a client device based on the structure of the overlay.

In Example 227, the subject matter of Example 226, wherein nodes in the overlay that are not connection nodes include a routing table for topics.

In Example 228, the subject matter of any of Examples 226-227, wherein a server of the pub-sub network creates the overlay.

In Example 229, the subject matter of Example 228, wherein the server is not part of the overlay.

In Example 230, the subject matter of any of Examples 228-229, wherein the server maintains next-hop routes to connection nodes.

In Example 231, the subject matter of any of Examples 226-230, wherein the overlay is based on a topic structure of the pub-sub-network.

In Example 232, the subject matter of Example 231, wherein the connection nodes are directly calculable by the client device given a topic family or a topic identifier.

In Example 233, the subject matter of any of Examples 231-232, wherein the connection nodes are directly calculable by the client device using only the topic family and the topic identifier.

In Example 234, the subject matter of any of Examples 232-233, wherein the topic identifier is unique to the client device.

In Example 235, the subject matter of Example 234, wherein the topic identifier is a serial number of the client device.

In Example 236, the subject matter of any of Examples 226-235, wherein the operation comprises: detecting that growth in child connections are approaching the threshold; and growing the overlay by contacting leader nodes in overlay groups to select new leader nodes and establish new overlay groups.

Example 237 is a method for routing in a publish-subscribe (pub-sub) network, the method comprising: creating an overlay to the pub-sub network, the overlay having a structure in which child connections to a node are limited by a threshold; and defining a set of nodes in the overlay as connection nodes, a connection node including a device that hosts a nano-broker for the pub-sub network to which client devices may attach, the nano-broker servicing less than all topics in the pub-sub network, the connection nodes directly calculable by a client device based on the structure of the overlay.

In Example 238, the subject matter of Example 237, wherein nodes in the overlay that are not connection nodes include a routing table for topics.

In Example 239, the subject matter of any of Examples 237-238, wherein a server of the pub-sub network creates the overlay.

In Example 240, the subject matter of Example 239, wherein the server is not part of the overlay.

In Example 241, the subject matter of any of Examples 239-240, wherein the server maintains next-hop routes to connection nodes.

In Example 242, the subject matter of any of Examples 237-241, wherein the overlay is based on a topic structure of the pub-sub-network.

In Example 243, the subject matter of Example 242, wherein the connection nodes are directly calculable by the client device given a topic family or a topic identifier.

In Example 244, the subject matter of any of Examples 242-243, wherein the connection nodes are directly calculable by the client device using only the topic family and the topic identifier.

In Example 245, the subject matter of any of Examples 243-244, wherein the topic identifier is unique to the client device.

In Example 246, the subject matter of Example 245, wherein the topic identifier is a serial number of the client device.

In Example 247, the subject matter of any of Examples 237-246, comprising: detecting that growth in child connections are approaching the threshold; and growing the overlay by contacting leader nodes in overlay groups to select new leader nodes and establish new overlay groups.

Example 248 is a machine-readable medium including instructions for routing in a publish-subscribe (pub-sub) network, the instructions, when executed by processing circuitry, cause the processing circuitry to perform operations comprising: creating an overlay to the pub-sub network, the overlay having a structure in which child connections to a node are limited by a threshold; and defining a set of nodes in the overlay as connection nodes, a connection node including a device that hosts a nano-broker for the pub-sub network to which client devices may attach, the nano-broker servicing less than all topics in the pub-sub network, the connection nodes directly calculable by a client device based on the structure of the overlay.

In Example 249, the subject matter of Example 248, wherein nodes in the overlay that are not connection nodes include a routing table for topics.

In Example 250, the subject matter of any of Examples 248-249, wherein a server of the pub-sub network creates the overlay.

In Example 251, the subject matter of Example 250, wherein the server is not part of the overlay.

In Example 252, the subject matter of any of Examples 250-251, wherein the server maintains next-hop routes to connection nodes.

In Example 253, the subject matter of any of Examples 248-252, wherein the overlay is based on a topic structure of the pub-sub-network.

In Example 254, the subject matter of Example 253, wherein the connection nodes are directly calculable by the client device given a topic family or a topic identifier.

In Example 255, the subject matter of any of Examples 253-254, wherein the connection nodes are directly calculable by the client device using only the topic family and the topic identifier.

In Example 256, the subject matter of any of Examples 254-255, wherein the topic identifier is unique to the client device.

In Example 257, the subject matter of Example 256, wherein the topic identifier is a serial number of the client device.

In Example 258, the subject matter of any of Examples 248-257, wherein the operations comprise: detecting that growth in child connections are approaching the threshold; and growing the overlay by contacting leader nodes in overlay groups to select new leader nodes and establish new overlay groups.

Example 259 is a device attaching to a pub-sub network, the device comprising: a memory including instructions; and processing circuitry that, when in operation, is configured by the instructions to perform operations comprising: obtaining input parameters, the input parameters including a topic name and a topic identifier for a topic in a pub-sub network, the pub-sub network including a hierarchical overlay with a server at a top of the hierarchy and leaf nodes at a bottom of the hierarchy, the leaf nodes hosting leaf brokers for the pub-sub network; calculating a leaf broker that hosts the topic using the input parameters and a structure of the hierarchical overlay; and connecting to the leaf broker to subscribe to the topic.

In Example 260, the subject matter of Example 259, wherein the input parameters consist of the topic name and the topic identifier, wherein both the topic name and the topic identifier are stored in the server.

In Example 261, the subject matter of any of Examples 259-260, wherein the topic identifier is a unique identifier of the client device.

In Example 262, the subject matter of any of Examples 259-261, wherein the device has a record of a subset of w leaf brokers, respective records of the w leaf brokers including a network address and an overlay identifier.

In Example 263, the subject matter of Example 262, wherein the device calculates the leaf broker by hashing the input parameters to locate an overlay identifier in the record of w leaf brokers and connects to the leaf broker using a corresponding address in the record of w leaf brokers.

In Example 264, the subject matter of Example 263, wherein hashing the input parameters includes applying modulo w to a result of the hashing to locate the overlay identifier.

In Example 265, the subject matter of any of Examples 263-264, wherein the leaf broker rejects the connection, and wherein the client device calculates a second leaf broker using a different hash function for the hashing.

In Example 266, the subject matter of Example 265, wherein hash functions used to calculate leaf brokers are stored in both the server and the client device.

In Example 267, the subject matter of any of Examples 265-266, wherein the second hash is performed on a result of the first hash.

In Example 268, the subject matter of any of Examples 265-267, wherein the operations comprise notifying the server when a leaf broker calculation failed to result in a connection to a leaf broker.

In Example 269, the subject matter of any of Examples 259-268, wherein the operation comprise: calculating a second leaf broker that has a second path to the server that does not share a link with a first path to the server of the leaf broker; and connecting to the second leaf broker while connected to the leaf broker.

In Example 270, the subject matter of Example 269, wherein calculating the second leaf broker includes adding a value p to a number of leaves of each sub-hierarchy of the overlay, where p is not equal to a number of sub-hierarchies of the overlay, nor to an integer multiple thereof.

Example 271 is a method for a client device attaching to a pub-sub network, the method comprising: obtaining input parameters, the input parameters including a topic name and a topic identifier for a topic in a pub-sub network, the pub-sub network including a hierarchical overlay with a server at a top of the hierarchy and leaf nodes at a bottom of the hierarchy, the leaf nodes hosting leaf brokers for the pub-sub network; calculating a leaf broker that hosts the topic using the input parameters and a structure of the hierarchical overlay; and connecting to the leaf broker to subscribe to the topic.

In Example 272, the subject matter of Example 271, wherein the input parameters consist of the topic name and the topic identifier, wherein both the topic name and the topic identifier are stored in the server.

In Example 273, the subject matter of any of Examples 271-272, wherein the topic identifier is a unique identifier of the client device.

In Example 274, the subject matter of any of Examples 271-273, wherein the device has a record of a subset of w leaf brokers, respective records of the w leaf brokers including a network address and an overlay identifier.

In Example 275, the subject matter of Example 274, wherein the client device calculates the leaf broker by hashing the input parameters to locate an overlay identifier in the record of w leaf brokers and connects to the leaf broker using a corresponding address in the record of w leaf brokers.

In Example 276, the subject matter of Example 275, wherein hashing the input parameters includes applying modulo w to a result of the hashing to locate the overlay identifier.

In Example 277, the subject matter of any of Examples 275-276, wherein the leaf broker rejects the connection, and wherein the client device calculates a second leaf broker using a different hash function for the hashing.

In Example 278, the subject matter of Example 277, wherein hash functions used to calculate leaf brokers are stored in both the server and the client device.

In Example 279, the subject matter of any of Examples 277-278, wherein the second hash is performed on a result of the first hash.

In Example 280, the subject matter of any of Examples 277-279, comprising notifying the server when a leaf broker calculation failed to result in a connection to a leaf broker.

In Example 281, the subject matter of any of Examples 271-280, comprising: calculating a second leaf broker that has a second path to the server that does not share a link with a first path to the server of the leaf broker; and connecting to the second leaf broker while connected to the leaf broker.

In Example 282, the subject matter of Example 281, wherein calculating the second leaf broker includes adding a value p to a number of leaves of each sub-hierarchy of the overlay, where p is not equal to a number of sub-hierarchies of the overlay, nor to an integer multiple thereof.

Example 283 is a machine-readable medium including instructions for a client device attaching to a pub-sub network, the instructions, when executed by processing circuitry, cause the processing circuitry to perform operations comprising: obtaining input parameters, the input parameters including a topic name and a topic identifier for a topic in a pub-sub network, the pub-sub network including a hierarchical overlay with a server at a top of the hierarchy and leaf nodes at a bottom of the hierarchy, the leaf nodes hosting leaf brokers for the pub-sub network; calculating a leaf broker that hosts the topic using the input parameters and a structure of the hierarchical overlay; and connecting to the leaf broker to subscribe to the topic.

In Example 284, the subject matter of Example 283, wherein the input parameters consist of the topic name and the topic identifier, wherein both the topic name and the topic identifier are stored in the server.

In Example 285, the subject matter of any of Examples 283-284, wherein the topic identifier is a unique identifier of the client device.

In Example 286, the subject matter of any of Examples 283-285, wherein the device has a record of a subset of w leaf brokers, respective records of the w leaf brokers including a network address and an overlay identifier.

In Example 287, the subject matter of Example 286, wherein the client device calculates the leaf broker by hashing the input parameters to locate an overlay identifier in the record of w leaf brokers and connects to the leaf broker using a corresponding address in the record of w leaf brokers.

In Example 288, the subject matter of Example 287, wherein hashing the input parameters includes applying modulo w to a result of the hashing to locate the overlay identifier.

In Example 289, the subject matter of any of Examples 287-288, wherein the leaf broker rejects the connection, and wherein the client device calculates a second leaf broker using a different hash function for the hashing.

In Example 290, the subject matter of Example 289, wherein hash functions used to calculate leaf brokers are stored in both the server and the client device.

In Example 291, the subject matter of any of Examples 289-290, wherein the second hash is performed on a result of the first hash.

In Example 292, the subject matter of any of Examples 289-291, wherein the operations comprise notifying the server when a leaf broker calculation failed to result in a connection to a leaf broker.

In Example 293, the subject matter of any of Examples 283-292, wherein the operations comprise: calculating a second leaf broker that has a second path to the server that does not share a link with a first path to the server of the leaf broker; and connecting to the second leaf broker while connected to the leaf broker.

In Example 294, the subject matter of Example 293, wherein calculating the second leaf broker includes adding a value p to a number of leaves of each sub-hierarchy of the overlay, where p is not equal to a number of sub-hierarchies of the overlay, nor to an integer multiple thereof.

Example 295 is at least one machine-readable medium including instructions that, when executed by processing circuitry, cause the processing circuitry to perform operations to implement of any of Examples 1-294.

Example 296 is an apparatus comprising means to implement of any of Examples 1-294.

Example 297 is a system to implement of any of Examples 1-294.

Example 298 is a method to implement of any of Examples 1-294.

The above detailed description includes references to the accompanying drawings, which form a part of the detailed description. The drawings show, by way of illustration, specific embodiments that may be practiced. These embodiments are also referred to herein as "examples."

Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

In addition, any priority document(s) of this application is/are hereby incorporated herein by reference in its/their entirety.

What is claimed is:

1. A non-transitory machine-readable medium including instructions for dynamic routing, the machine-readable medium performed by a node, the instructions, when executed by processing circuitry, cause the processing circuitry to perform operations comprising:
receiving, at a node, a distributed hash table (DHT) query for a routing pool, the DHT query including a DHT identifier (ID) for the routing pool, the routing pool being a vertex in a routing graph, the routing pool including one or more nodes based on a distance between the DHT ID and respective DHT IDs of the one or more nodes; and
responding to the DHT query with a result, the result corresponding to a network address for a routing node of the routing pool, wherein responding to the DHT query includes:
determining that the node is not in the routing pool, and wherein the node maintains a local cache of nodes, the local cache including respective addresses and DHT IDs for nodes stored in the local cache;
sorting nodes in the local cache based on distance to the DHT ID in the DHT query;
selecting a set of nodes from the local cache to minimize the distance to the DHT ID in the DHT query;
forwarding the DHT query to the set of nodes;
extracting an address for the routing node from a response to the DHT query from the set of nodes; and
constructing the result to include the address for the routing node.

2. The non-transitory machine-readable medium of claim 1, wherein the result includes a set of nodes from the local cache, the set of nodes selected based on a distance from the DHT ID in the DHT query.

3. The non-transitory machine-readable medium of claim 1, wherein the local cache is maintained via a DHT discovery procedure, the DHT discovery procedure including a local search for nodes in the routing pool, and a branch search for nodes in other routing pools corresponding to other vertices of the routing graph.

4. The non-transitory machine-readable medium of claim 1, wherein the routing graph implements a tree in which client devices directly connect to routing nodes in routing pools that correspond to leaf vertices when the client devices attach to the routing graph.

5. The non-transitory machine-readable medium of claim 4, wherein the tree is a balanced tree, and wherein DHT IDs for routing pools are based on a row and column of a corresponding vertex in the tree.

6. The non-transitory machine-readable medium of claim 5, wherein the DHT ID is Key(J), where:

Key(I,J)=DHTHash(ServiceKey+AtLeastMaximumTreeSize+J);

J=routing pool index in a tree layer;
ServiceKey=an identifier unique to a service enabled by the routing graph; and
AtLeastMaximumTreeSize is a value that is greater than or equal to a number of devices supported by the tree.

7. The non-transitory machine-readable medium of claim 6, wherein the AtLeastMaximumTreeSize value is a ServiceSeed.

8. The non-transitory machine-readable medium of claim 7, wherein the service is a topic family.

9. The non-transitory machine-readable medium of claim 4, wherein the DHT query is generated by a client device to attach to the routing node, the DHT ID selected randomly from DHT IDs of routing pools that correspond to leaf vertices of the tree.

10. The non-transitory machine-readable medium of claim 1, wherein the routing graph corresponds to a set of services of a publish-and-subscribe (pub-sub) framework, and wherein DHT IDs are computed from topic names in the set of services.

11. The non-transitory machine-readable medium of claim 10, wherein the routing node services client nodes, and wherein the routing node serves as a broker for the pub-sub framework for clients serviced by the routing node.

12. The non-transitory machine-readable medium of claim 11 wherein the operations comprise:
receiving a publish message for a topic name;
obtaining a route to a second broker node to which a subscribing device is possibly attached; and
transmitting the publish message to the second broker node for delivery to the subscribing device.

13. The non-transitory machine-readable medium of claim 12, wherein the publish message originated from a client device, and wherein obtaining the route includes querying an organizer of the routing graph for a routing pool to which the subscribing device is attached;
obtaining a second routing node for the routing pool to which the subscribing device is attached; and
routing the publish message to the second routing node.

14. The non-transitory machine-readable medium of claim 12, wherein obtaining the route includes calculating a routing pool DHT ID to which the subscribing device is attached from topic name specified in the publish message;
locating a second routing node for the routing pool to which the subscribing device is attached using the calculated routing pool DHT ID; and
routing the publish message to the second routing node.

15. The non-transitory machine-readable medium of claim 14, wherein locating the second routing node includes performing a DHT search for the second routing node using the calculated routing pool DHT ID.

16. The non-transitory machine-readable medium of claim 14, wherein calculating the routing pool DHT ID to which the subscribing device is attached includes:
calculating respective routing pool DHT IDs for the topic name using a set of hashes defined for the routing graph;
obtaining respective routing nodes for routing pools with the respective routing pool DHT IDs; and
routing the publish message to a respective routing node.

17. The non-transitory machine-readable medium of claim 16, wherein calculating the respective routing pool DHT IDs for the topic name using the set of hashes includes calculating, obtaining a route, and routing the publish message for each hash until a positive response to routing the publish message is received, refraining from calculating any additional results once the positive response is received.

18. A device for dynamic routing, the device performed by a node, the device wherein the operations comprise:
a memory including instructions; and
processing circuitry that, when in operation, is configured by the instructions to perform operations wherein the operations comprise:
receiving, at a node, a distributed hash table (DHT) query for a routing pool, the DHT query including a DHT identifier (ID) for the routing pool, the routing pool being a vertex in a routing graph, the routing pool including one or more nodes based on a distance between the DHT ID and respective DHT IDs of the one or more nodes; and
responding to the query with a result, the result corresponding to a network address for a routing node of the routing pool, wherein responding to the DHT query includes:
determining that the node is not in the routing pool, and wherein the node maintains a local cache of nodes, the local cache including respective addresses and DHT IDs for nodes stored in the local cache;
sorting nodes in the local cache based on distance to the DHT ID in the DHT query;
selecting a set of nodes from the local cache to minimize the distance to the DHT ID in the DHT query;
forwarding the DHT query to the set of nodes;
extracting an address for the routing node from a response to the DHT query from the set of nodes; and
constructing the result to include the address for the routing node.

19. The device of claim 18, wherein the result includes a set of nodes from the local cache, the set of nodes selected based on a distance from the DHT ID in the DHT query.

20. The device of claim 18, wherein the local cache is maintained via a DHT discovery procedure, the DHT discovery procedure including a local search for nodes in the routing pool, and a branch search for nodes in other routing pools corresponding to other vertices of the routing graph.

21. The device of claim 18, wherein the routing graph implements a tree in which client devices directly connect to routing nodes in routing pools that correspond to leaf vertices when the client devices attach to the routing graph.

22. The device of claim 21, wherein the tree is a balanced tree, and wherein DHT IDs for routing pools are based on a row and column of a corresponding vertex in the tree.

23. The device of claim 22, wherein the DHT ID is Key(J), where:

Key($I,J$)=DHTHash(ServiceKey+AtLeastMaximumTreeSize+$J$);

J=routing pool index in a tree layer;
ServiceKey=an identifier unique to a service enabled by the routing graph; and
AtLeastMaximumTreeSize is a value that is greater than or equal to a number of devices supported by the tree.

24. The device of claim 23, wherein the AtLeastMaximumTreeSize value is a ServiceSeed.

25. The device of claim 24, wherein the service is a topic family.

26. The device of claim 25, wherein the ServiceSeed differentiates between different providers of the topic family.

27. The device of claim 21, wherein the DHT query is generated by a client device to attach to the routing node, the DHT ID selected randomly from DHT IDs of routing pools that correspond to leaf vertices of the tree.

28. The device of claim 18, wherein the routing graph corresponds to a set of services of a publish-and-subscribe (pub-sub) framework, and wherein DHT IDs are computed from topic names in the set of services.

29. The device of claim 28, wherein the routing node services client nodes, and wherein the routing node serves as a broker for the pub-sub framework for clients serviced by the routing node.

30. The device of claim 29 wherein the operations comprise:
receiving a publish message for a topic name;
obtaining a route to a second broker node to which a subscribing device is possibly attached; and
transmitting the publish message to the second broker node for delivery to the subscribing device.

31. The device of claim 30, wherein the publish message originated from a client device, and wherein obtaining the route includes querying an organizer of the routing graph for a routing pool to which the subscribing device is attached;
obtaining a second routing node for the routing pool to which the subscribing device is attached; and
routing the publish message to the second routing node.

32. The device of claim 30, wherein obtaining the route includes calculating a routing pool DHT ID to which the subscribing device is attached from topic name specified in the publish message;
- locating a second routing node for the routing pool to which the subscribing device is attached using the calculated routing pool DHT ID; and
- routing the publish message to the second routing node.

33. The device of claim 32, wherein locating the second routing node includes performing a DHT search for the second routing node using the calculated routing pool DHT ID.

34. The device of claim 32, wherein calculating the routing pool DHT ID to which the subscribing device is attached includes:
- calculating respective routing pool DHT IDs for the topic name using a set of hashes defined for the routing graph;
- obtaining respective routing nodes for routing pools with the respective routing pool DHT IDs; and
- routing the publish message to a respective routing node.

35. The device of claim 34, wherein calculating the respective routing pool DHT IDs for the topic name using the set of hashes includes calculating, obtaining a route, and routing the publish message for each hash until a positive response to routing the publish message is received, refraining from calculating any additional results once the positive response is received.

36. A method for dynamic routing, the method performed by a node, the method comprising:
- receiving, at a node, a distributed hash table (DHT) query for a routing pool, the DHT query including a DHT identifier (ID) for the routing pool, the routing pool being a vertex in a routing graph, the routing pool including one or more nodes based on a distance between the DHT ID and respective DHT IDs of the one or more nodes; and
- responding to the query with a result, the result corresponding to a network address for a routing node of the routing pool, wherein responding to the DHT query includes:
  - determining that the node is not in the routing pool, and wherein the node maintains a local cache of nodes, the local cache including respective addresses and DHT IDs for nodes stored in the local cache;
  - sorting nodes in the local cache based on distance to the DHT ID in the DHT query;
  - selecting a set of nodes from the local cache to minimize the distance to the DHT ID in the DHT query;
  - forwarding the DHT query to the set of nodes;
  - extracting an address for the routing node from a response to the DHT query from the set of nodes; and
  - constructing the result to include the address for the routing node.

37. The method of claim 36, wherein the result includes a set of nodes from the local cache, the set of nodes selected based on a distance from the DHT ID in the DHT query.

38. The method of claim 36, wherein the local cache is maintained via a DHT discovery procedure, the DHT discovery procedure including a local search for nodes in the routing pool, and a branch search for nodes in other routing pools corresponding to other vertices of the routing graph.

39. The method of claim 36, wherein the routing graph implements a tree in which client devices directly connect to routing nodes in routing pools that correspond to leaf vertices when the client devices attach to the routing graph.

40. The method of claim 39, wherein the tree is a balanced tree, and wherein DHT IDs for routing pools are based on a row and column of a corresponding vertex in the tree.

41. The method of claim 40, wherein the DHT ID is Key(J), where:

Key(I,J)=DHTHash(ServiceKey+AtLeastMaximumTreeSize+J);

J=routing pool index in a tree layer;
ServiceKey=an identifier unique to a service enabled by the routing graph; and
AtLeastMaximumTreeSize is a value that is greater than or equal to a number of devices supported by the tree.

42. The method of claim 41, wherein the AtLeastMaximumTreeSize value is a ServiceSeed.

43. The method of claim 42, wherein the service is a topic family.

44. The method of claim 39, wherein the DHT query is generated by a client device to attach to the routing node, the DHT ID selected randomly from DHT IDs of routing pools that correspond to leaf vertices of the tree.

45. The method of claim 36, wherein the routing graph corresponds to a set of services of a publish-and-subscribe (pub-sub) framework, and wherein DHT IDs are computed from topic names in the set of services.

46. The method of claim 45, wherein the routing node services client nodes, and wherein the routing node serves as a broker for the pub-sub framework for clients serviced by the routing node.

47. The method of claim 46 comprising:
- receiving a publish message for a topic name;
- obtaining a route to a second broker node to which a subscribing device is possibly attached; and
- transmitting the publish message to the second broker node for delivery to the subscribing device.

48. The method of claim 47, wherein the publish message originated from a client device, and wherein obtaining the route includes querying an organizer of the routing graph for a routing pool to which the subscribing device is attached;
- obtaining a second routing node for the routing pool to which the subscribing device is attached; and
- routing the publish message to the second routing node.

49. The method of claim 47, wherein obtaining the route includes calculating a routing pool DHT ID to which the subscribing device is attached from topic name specified in the publish message;
- locating a second routing node for the routing pool to which the subscribing device is attached using the calculated routing pool DHT ID; and
- routing the publish message to the second routing node.

50. The method of claim 49, wherein locating the second routing node includes performing a DHT search for the second routing node using the calculated routing pool DHT ID.

51. The method of claim 49, wherein calculating the routing pool DHT ID to which the subscribing device is attached includes:
- calculating respective routing pool DHT IDs for the topic name using a set of hashes defined for the routing graph;
- obtaining respective routing nodes for routing pools with the respective routing pool DHT IDs; and
- routing the publish message to a respective routing node.

52. The method of claim 51, wherein calculating the respective routing pool DHT IDs for the topic name using the set of hashes includes calculating, obtaining a route, and routing the publish message for each hash until a positive response to routing the publish message is received, refraining from calculating any additional results once the positive response is received.

\* \* \* \* \*